United States Patent

Miwa et al.

[11] Patent Number: 5,561,445
[45] Date of Patent: Oct. 1, 1996

[54] THREE-DIMENSIONAL MOVEMENT SPECIFYING APPARATUS AND METHOD AND OBSERVATIONAL POSITION AND ORIENTATION CHANGING APPARATUS

[75] Inventors: Michio Miwa, Tokyo; Toru Kawaguchi, Chiba-ken, both of Japan

[73] Assignee: Matsushita Electric Industrial Co., Ltd., Osaka, Japan

[21] Appl. No.: 345,456

[22] Filed: Nov. 21, 1994

Related U.S. Application Data

[63] Continuation-in-part of Ser. No. 147,263, Nov. 5, 1993, abandoned.

[30] Foreign Application Priority Data

| Nov. 9, 1992 | [JP] | Japan | 4-298295 |
| Jun. 4, 1993 | [JP] | Japan | 5-134405 |
| Jun. 4, 1993 | [JP] | Japan | 5-134503 |
| Jul. 30, 1993 | [JP] | Japan | 5-189973 |

[51] Int. Cl.$^6$ .................................................. G09G 5/08
[52] U.S. Cl. ............................................ 345/163; 345/167
[58] Field of Search ........................... 345/163, 164, 345/167, 157, 156

[56] References Cited

U.S. PATENT DOCUMENTS

| 3,643,148 | 2/1972 | Brown et al. | |
| 4,933,670 | 6/1990 | Wislocki | 345/167 |
| 5,095,303 | 3/1992 | Clark et al. | 345/164 |
| 5,262,777 | 11/1993 | Low et al. | |

*Primary Examiner*—Richard Hjerpe
*Assistant Examiner*—Regina Liang
*Attorney, Agent, or Firm*—Lowe, Price, LeBlanc & Becker

[57] ABSTRACT

A three-dimensional movement specifying apparatus consists of a track ball member, an annular ring, a first sensor for detecting the rotation of the track ball member about an X-axis, a second sensor for detecting the rotation of the track ball member about a Y-axis, a third sensor for detecting the rotation of the annular ring about a Z-axis, a secondary ball member rolling on an X-Y plane, a fourth sensor for detecting the rolling of the secondary ball member along the X-axis, a fifth sensor for detecting the rolling of the secondary ball member along the Y-axis, a central processing unit for controlling movement of a plane representing a three-dimensional position and orientation of an object according to the rotations and the rolling, and a displaying unit for displaying the plane and the object moved with the plane. The track ball member is rotated to place both a starting position of the object and a target position of the object on the plane, the secondary ball member is rolled to move straight the object placed at the starting position to the target position, and the track ball member and the annular ring are rotated to move the object to a target orientation. Therefore, the object is smoothly moved from a starting position and orientation to a target position and orientation.

9 Claims, 34 Drawing Sheets

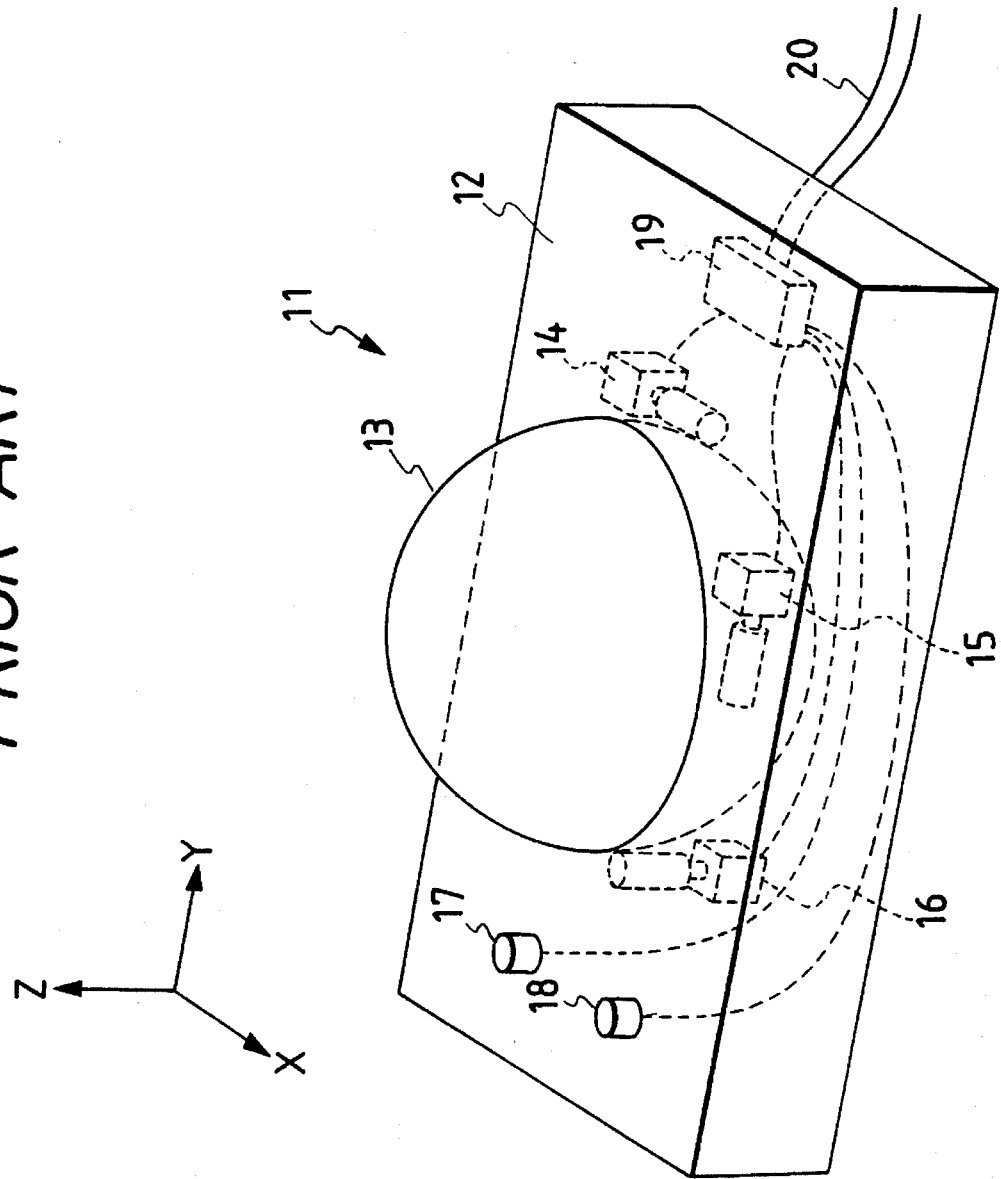

FIG. 48
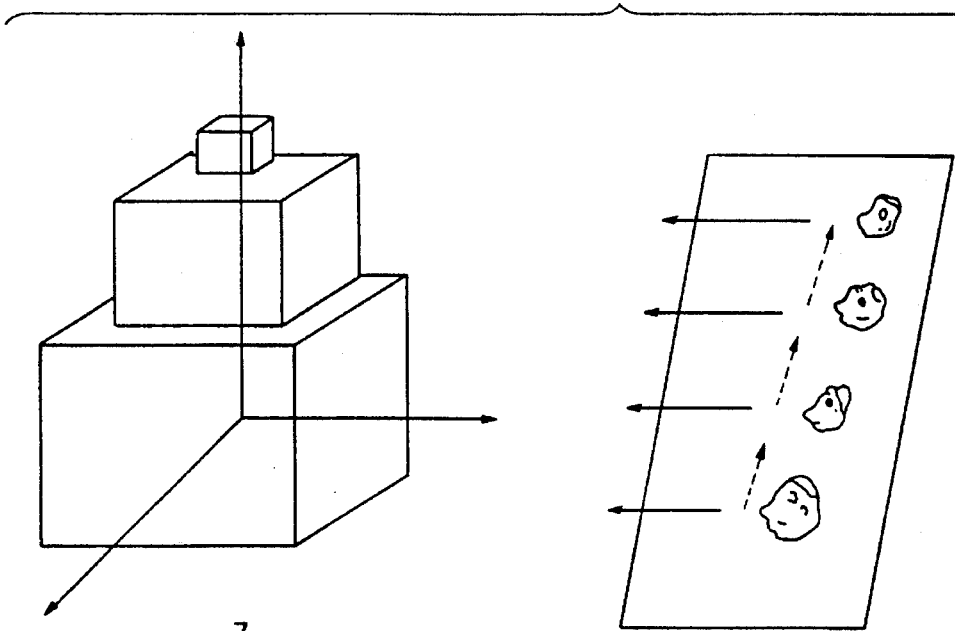
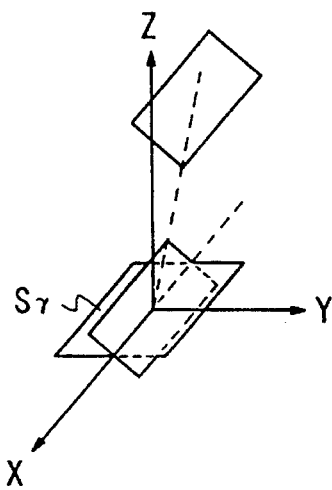
FIG. 51
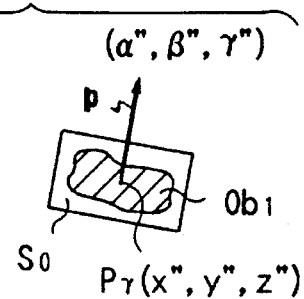
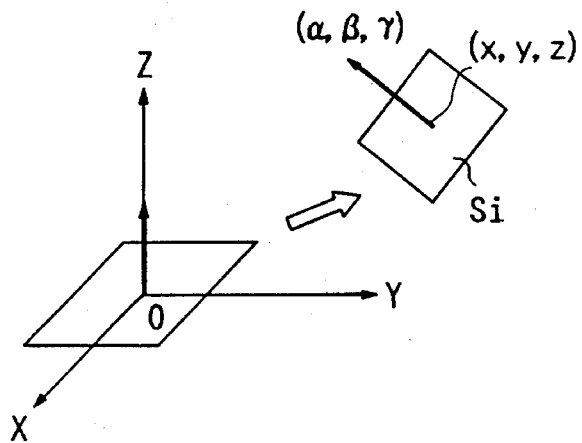

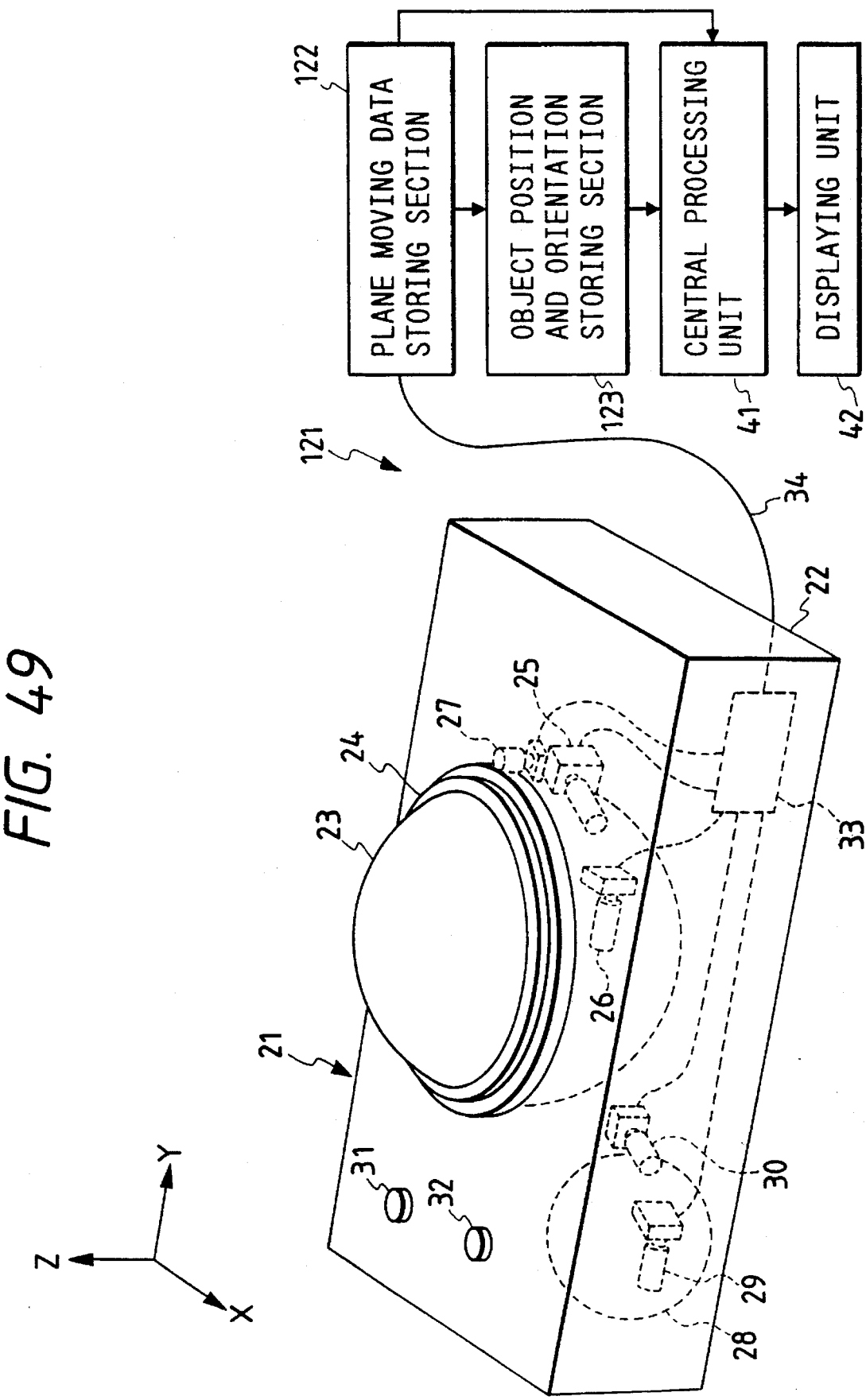

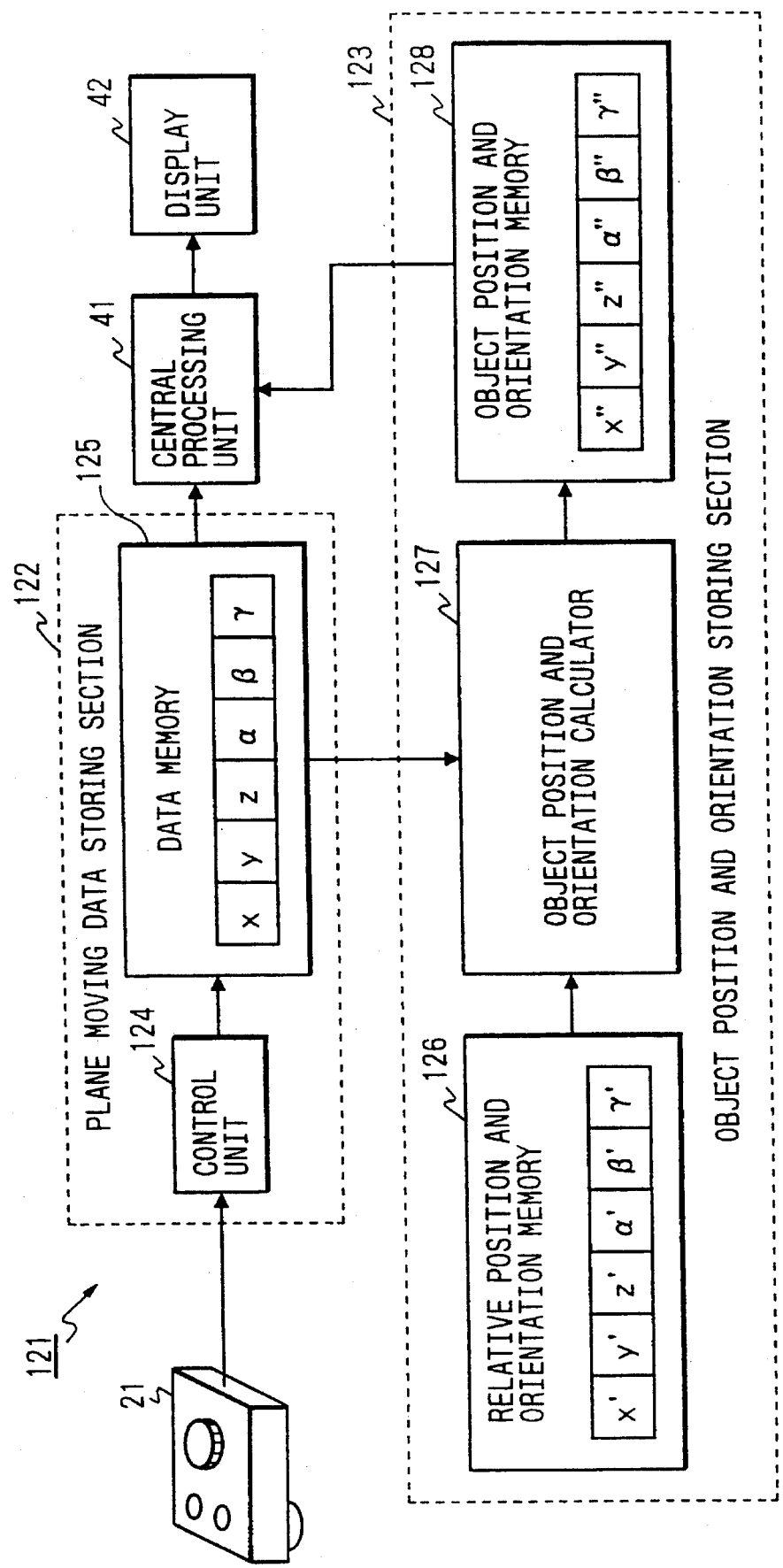

THREE-DIMENSIONAL MOVEMENT SPECIFYING APPARATUS AND METHOD AND OBSERVATIONAL POSITION AND ORIENTATION CHANGING APPARATUS

BACKGROUND OF THE INVENTION

1. Field of the Invention

The present invention is a continuation-in-part application of application Ser. No. 08/147,263 filed Nov. 5, 1993, abandoned (Title: THREE-DIMENSIONAL MOVEMENT SPECIFYING APPARATUS AND OBSERVATIONAL POSITION AND ORIENTATION CHANGING APPARATUS).

The present invention relates to a three-dimensional movement specifying apparatus and method in which movement of an object is specified to perform translation movement and rotational movement for the object in a three-dimensional space for purposes of design or drawing of the object in a computer aided design field or a computer graphics field. Also, the present invention relates to an observational position and orientation changing apparatus in which an observational position and an observational orientation for the observation of the object are changed in a three-dimensional space to design or draw the object in the computer aided design field or the computer graphics field.

2. Description of the Related Art

Because picture processing in a computer system has been recently improved, a three-dimensional picture can be easily processed. For example, position and orientation of the three-dimensional picture can be easily indicated in a displaying unit, so that translation movement and rotational movement for a three-dimensional picture is required to arbitrarily draw or design the picture. Therefore, various three-dimensional movement specifying apparatuses in which movement of a three-dimensional picture is specified to perform translation movement and rotational movement for a three-dimensional picture have been proposed. Also, a three-dimensional picture displayed in a displaying unit is required to be observed from various positions and orientations to draw or design the picture. Therefore, various observational position and orientation changing apparatuses in which an observational position and an observational orientation for the observation of the three-dimensional picture are changed have been proposed.

2.1. PREVIOUSLY PROPOSED ART

A previously proposed three-dimensional movement specifying apparatus is described.

Initially, how to designate position and orientation of an object in a three-dimensional space is described with reference to FIG. 1.

FIG. 1 shows position and orientation of an object in a three-dimensional space.

As shown in FIG. 1, position and orientation of a reference point Pr in an object (or a picture) can be designated by a position (x, y, z) of the reference point Pr in the three-dimensional space, an orientation ($\alpha$, $\beta$) of a reference line Lr passing through the reference point Pr, and a rotational angle $\gamma$ about the reference line Lr. In cases where a line obtained by projecting the reference line Lr on the Y-Z plane is defined as a first projecting line $Lp_1$ and another line obtained by projecting the reference line Lr on the X-Z plane is defined as a second projecting line $Lp_2$, the angle $\alpha$ is defined as an inclination angle of the first projecting line $Lp_1$ to the Z-axis, and the angle $\beta$ is defined as an inclination angle of the second projecting line $Lp_2$ to the Z-axis. Therefore, when translation movement and/or rotational movement of the object is specified to move the object displayed in a displaying unit, the position (x, y, z) and the orientation ($\alpha$, $\beta$, $\gamma$) of the object are changed.

FIG. 2 is a diagonal perspective view of a conventional three-dimensional movement specifying apparatus.

As shown in FIG. 2, a conventional three-dimensional movement specifying apparatus 11 is provided with a box type of casing 12, a ball member 13 rotatably arranged in the casing 12, a first rotary sensor 14 rotating with rotation of the ball member 13 about an X-axis, a second rotary sensor 15 rotating with rotation of the ball member 13 about a Y-axis, and a third rotary sensor 16 rotating with rotation of the ball member 13 about a Z-axis. A degree of rotational movement of the ball member 13 about the X-axis is detected in the first rotary sensor 14, a degree of rotational movement of the ball member 13 about the Y-axis is detected in the second rotary sensor 15, and a degree of rotational movement of the ball member 13 about the Z-axis is detected in the third rotary sensor 16.

The apparatus 11 is furthermore provided with a translation mode designating button 17 for designating a translation mode in which the rotation of the ball member 13 indicates a translation movement, a rotation mode designating button 18 for designating a rotation mode in which the rotation of the ball member 13 indicates a rotational movement, a control unit 19 for receiving a first signal indicating the degree of rotational movement of the ball member 13 about the X-axis from the first rotary sensor 14, a second signal indicating the degree of rotational movement of the ball member 13 about the Y-axis from the second rotary sensor 15, a third signal indicating the degree of rotational movement of the ball member 13 about the Z-axis from the third rotary sensor 16, a translation mode signal from the translation mode designating button 17, and a rotation mode signal from the rotation mode designating button 18.

In the above configuration, in cases where an operator pushes the translation mode designating button 17, it is judged in the control unit 19 that the rotation of the ball member 13 indicates the translation movement of an object in a three dimensional space. Therefore, when the ball member 13 is rotated by the operator, the degrees of rotational movement of the ball member 13 detected in the rotary sensors 14, 15 and 16 are informed the control unit 19. Thereafter, the degrees of rotational movement detected are transformed to degrees of translation movement (x, y, z) in the control unit 19. For example, as shown in FIG. 3, in cases where the ball member 13 is rotated by an angle of $\alpha_1$ about the X-axis to set a length of a circular arc Ac to $y_1$, it is judged in the control unit 19 that a component y of the translation movement along the Y-axis is equal to $y_1$. Thereafter, a transformation signal indicating the degrees of translation movement transformed is transferred to a computer through a signal line 20.

In contrast, in cases where the operator pushes the rotation mode designating button 18, it is judged in the control unit 19 that the rotation of the ball member 13 indicates the rotational movement of the object in the three dimensional space. Therefore, when the ball member 13 is rotated by the operator, the degrees of rotational movement of the ball member 13 detected in the rotary sensors 14, 15 and 16 are informed the control unit 19. Thereafter, the degrees of rotational movement detected are transformed to degrees of rotational movement ($\alpha$, $\beta$, $\gamma$) in the control unit 19. For example, as shown in FIG. 3, in cases where the ball member 13 is rotated by an angle of $\alpha_1$ about the X-axis, it is judged in the control unit 19 that a component $\alpha$ of the rotational movement about the X-axis is equal to $\alpha_1$. Thereafter, a rotation signal indicating the degrees of rotational movement transformed is transferred to the computer through the signal line 20.

Thereafter, the object displayed in a displaying unit is moved according to the transformation signal or the rotation signal.

2.2. ANOTHER PREVIOUSLY PROPOSED ART

A previously proposed observational position and orientation changing apparatus is described.

A conventional observational position and orientation changing apparatus is basically the same as the apparatus 11. Therefore, how to designate observational position and orientation for the observation of the object in a three-dimensional space is initially described with reference to FIG. 1.

As shown in FIG. 1, the observational position and orientation can be designated by a position (x, y, z) indicating the observation position in the three-dimensional space, an orientation ($\alpha$, $\beta$) of an observational vector passing through the observation position, and the rotational angle $\gamma$ about the observational vector. Therefore, an object displayed in a displaying unit can be observed from the observation position (x, y, z) at the orientation ($\alpha$, $\beta$) and the rotational angle $\gamma$.

When the observational position and orientation are specified with the apparatus 11, the position (x, y, z) and the orientation ($\alpha$, $\beta$, $\gamma$) are changed, so that the operator can observe the object from arbitrary position and orientation.

2.2. PROBLEMS TO BE SOLVED BY THE INVENTION

Problems to be solved in the conventional three-dimensional movement specifying apparatus 11 utilized to specify the translation movement and the rotational movement of the three-dimensional object are described.

When the operator intends to perform the translation movement to move the object displayed in the displaying unit by a predetermined distance, the operator is required to intuitively rotate the ball member 13 by a prescribed rotational angle. Therefore, because the operator cannot perform the translation movement for the ball member 13, there is a drawback that the object cannot be moved by the predetermined distance with high accuracy. Also, there is another drawback that a great deal of skill is required of the operator to specify the transformation movement of the object.

In addition, because the specification of the translation movement and the rotational movement is performed by rotating the same ball member 13, the translation mode and the rotation mode are required to be exchanged for each other by alternatively pushing the translation mode designating button 17 and the rotation mode designating button 18. Therefore, there is a drawback that the exchange of the translation mode for the rotation mode is troublesome. Also, because the translation movement and the rotational movement cannot be simultaneously specified with the apparatus 11, there is another drawback that the various movements of the object cannot be performed at high speed.

Next, problems to be solved in the conventional three-dimensional movement specifying apparatus 11 utilized to change the observational position and orientation for the three-dimensional object are described.

When the operator intends to perform the translation movement to change the observational position by a predetermined distance, the operator is required to intuitively rotate the ball member 13 by a prescribed rotational angle. Therefore, because the operator cannot perform the translation movement for the ball member 13, there is a drawback that the observational position cannot be moved by the predetermined distance with high accuracy. Also, there is another drawback that a great deal of skill is required of the operator to change the observational position.

In addition, because the change of the observational position and the change of the observational orientation are performed by rotating the same ball member 13, the translation mode and the rotation mode are required to be exchanged for each other by alternatively pushing the translation mode designating button 17 and the rotation mode designating button 18. Therefore, there is a drawback that the exchange of the translation mode for the rotation mode is troublesome. Also, because the translation movement and the rotational movement cannot be simultaneously specified with the apparatus there is another drawback that the change of the observational position and the change of the observational orientation cannot be performed at high speed.

SUMMARY OF THE INVENTION

A first object of the present invention is to provide, with due consideration to the drawbacks of such a conventional three-dimensional movement specifying apparatus, a three-dimensional movement specifying apparatus in which movement of an object displayed in a displaying unit is specified to smoothly perform translation movement and rotational movement in a three-dimensional space with high accuracy even though an operator is not skilful. Also, the first object is to provide a method for specifying movement of a three-dimensional object in a three-dimensional space by use of the three-dimensional movement specifying apparatus.

A second object of the present invention is to provide an observational position and orientation changing apparatus in which observational position and orientation are arbitrarily changed with high accuracy with a superior operational performance as if an operator flies around in a three-dimensional space even though an operator is not skillful.

The first object is achieved by the provision of a three-dimensional movement specifying apparatus for specifying translation movement and/or rotational movement of an object in a three-dimensional space to virtually move the object from a starting position and orientation ($x_0, y_0, z_0, \alpha_0, \beta_0, \gamma_0$) to a target position and orientation ($x_1, y_1, z_1, \alpha_1, \beta_1, \gamma_1$), comprising:

plane displaying means for displaying a plane representing a three-dimensional position (x,y,z) and an orientation ($\alpha, \beta, \gamma$) of an object, an X-Y-Z coordinate system in which the plane is placed on an X-Y plane and the object is placed at an original point being defined, a value $\alpha$ denoting a rotational angle about an X-axis of the coordinate system, a value $\beta$ denoting a rotational angle about a Y-axis of the coordinate system, a value $\gamma$ denoting a rotational angle about a Z-axis of the coordinate system, and the object and the coordinate system being moved with the plane;

first orientation specifying means having a track ball member for specifying a first rotational movement of the plane displayed by the plane displaying means about the X-axis and a second rotational movement of the plane about the Y-axis at one time by rotating the track ball member, the plane which represents a three-dimensional starting position $(x_0,y_0,z_0)$ and a starting orientation $(\alpha_0,\beta_0,\gamma_0)$ of the object being moved according to the first and second rotational movements to place both the three-dimensional starting position $(x_0,y_0,z_0)$ and a three-dimensional target position $(x_1,y_1,z_1)$ on the plane and being changed to the plane which represents the three-dimensional starting position $(x_0,y_0,z_0)$ and an intermediate orientation $(\alpha_2,\beta_2,\gamma_0)$ of the object, and an orientation $(\alpha_2,\beta_2)$ represented by the plane being further changed according to the first and second rotational movements to an orientation $(\alpha_1,\beta_1)$ represented by the plane by rotating the track ball member by angles of $\alpha_1-\alpha_2$ and $\beta_1-\beta_2$ about the X-axis and Y-axis;

position specifying means having a secondary ball member for specifying a first translation movement of the plane displayed by the plane displaying means along the X-axis and a second translation movement of the plane along the Y-axis at one time by rotating the secondary ball member straight, the plane which is determined in the first orientation specifying means and represents the three-dimensional starting position $(x_0,y_0,z_0)$ and the intermediate orientation $(\alpha_2,\beta_2,\gamma_0)$ of the object being moved according to the first translation movement and changed to the plane which represents the three-dimensional target position $(x_1,y_1,z_1)$ and the intermediate orientation $(\alpha_2,\beta_2,\gamma_0)$ of the object;

second orientation specifying means for specifying a third rotational movement of the plane displayed by the plane displaying means about the Z-axis, an orientation $\gamma_0$ represented by the plane being changed to an orientation $\gamma_1$ represented by the plane to change the plane which is determined in the position specifying means and represents the three-dimensional target position $(x_1,y_1,z_1)$ and the intermediate orientation $(\alpha_2,\beta_2,\gamma_0)$ of the object to the plane which represents the three-dimensional target position $(x_1,y_1,z_1)$ and a target orientation $(\alpha_1,\beta_1,\gamma_1)$ of the object in cooperation with the first orientation specifying means; and control means for controlling movement of the object to virtually move the object which is placed at the three-dimensional starting position $(x_0,y_0,z_0)$ and the starting orientation $(\alpha_0,\beta_0,\gamma_0)$ represented by the plane to the three-dimensional target position $(x_1,y_1,z_1)$ and the target orientation $(\alpha_1,\beta_1,\gamma_1)$ represented by the plane which is determined by specifying the first and second rotational movements, the first translation movement and the third rotational movement in the first orientation specifying means, the position specifying means and the second orientation specifying means.

In the above configuration, a three-dimensional position and an orientation of the object is represented by the plane displayed by the plane displaying means. The plane representing the three-dimensional starting position $(x_0,y_0,z_0)$ and the starting orientation $(\alpha_0,\beta_0,\gamma_0)$ of the object is moved by rotating the track ball member in the first orientation specifying means to place the three-dimensional target position $(x_1,y_1,z_1)$ on the plane. Therefore, the plane representing the three-dimensional starting position $(x_0,y_0,z_0)$ and the intermediate orientation $(\alpha_2,\beta_2,\gamma_0)$ of the object is determined, and the object is virtually moved from the starting position and orientation $(x_0,y_0,z_0,\alpha_0,\beta_0,\gamma_0)$ to an intermediate position and orientation $(x_0,y_0,z_0,\alpha_2,\beta_2,\gamma_0)$ under the control of the control means.

Thereafter, the plane representing the three-dimensional starting position $(x_0,y_0,z_0)$ and the intermediate orientation $(\alpha_2,\beta_2,\gamma_0)$ of the object is changed to the plane representing the three-dimensional target position $(x_1,y_1,z_1)$ and the intermediate orientation $(\alpha_2,\beta_2,\gamma_0)$ of the object by rotating the secondary ball member straight in the position specifying means. Therefore, the object is virtually moved from the intermediate position and orientation $(x_0,y_0,z_0,\alpha_2,\beta_2,\gamma_0)$ to another intermediate position and orientation $(x_1,y_1,z_1,\alpha_2,\beta_2,\gamma_0)$ under the control of the control means.

Thereafter, the plane representing the three-dimensional target position $(x_1,y_1,z_1)$ and the intermediate orientation $(\alpha_2,\beta_2,\gamma_0)$ of the object is changed to the plane representing the three-dimensional target position $(x_1,y_1,z_1)$ and the target orientation $(\alpha_1,\beta_1,\gamma_1)$ by rotating the track ball member in the first orientation specifying means and the secondary ball member in the position specifying means. Therefore, the object is virtually moved from the intermediate position and orientation $(x_1,y_1,z_1,\alpha_2,\beta_2,\gamma_0)$ to the target position and orientation $(x_1,y_1,z_1,\alpha_1,\beta_1,\gamma_1)$.

Accordingly, because the three-dimensional target position $(x_1,y_1,z_1)$ is placed on the plane representing the three-dimensional starting position $(x_0,y_0,z_0)$ and the intermediate orientation $(\alpha_2,\beta_2,\gamma_0)$ of the object by rotating the track ball member in the first orientation specifying means, the plane representing the three-dimensional starting position $(x_0,y_0,z_0)$ and the intermediate orientation $(\alpha_2,\beta_2,\gamma_0)$ of the object is smoothly changed at one time to the plane representing the three-dimensional target position $(x_1,y_1,z_1)$ and the intermediate orientation $(\alpha_2,\beta_2,\gamma_0)$ of the object by rotating the secondary ball member straight in the position specifying means. In other words, three position variables can be changed by moving the secondary ball member straight on a two-dimensional plane. Therefore, the moving operation of the object from the starting position and orientation $(x_0,y_0,z_0,\alpha_0,\beta_0,\gamma_0)$ to the target position and orientation $(x_1,y_1,z_1,\alpha_1,\beta_1,\gamma_1)$ can be simplified.

Also, the first object is achieved by the provision of a method for specifying translation movement and/or rotational movement of an object in a three-dimensional space to virtually move the object from a starting position and orientation $(x_0,y_0,z_0,\alpha_0,\beta_0,\gamma_0)$ to a target position and orientation $(x_1,y_1,z_1,\alpha_1,\beta_1,\gamma_1)$, comprising the steps of:

displaying a plane representing a three-dimensional starting position $(x_0,y_0,z_0)$ and a starting orientation $(\alpha_0,\beta_0,\gamma_0)$ of an object on a displaying unit of a three-dimensional movement specifying apparatus, the value $\alpha_0$ denoting a rotational angle about an X-axis of a starting coordinate system in which the plane is placed on an X-Y plane, the value $\beta_0$ denoting a rotational angle about a Y-axis of the starting coordinate system, the value $\gamma_0$ denoting a rotational angle about a Z-axis of the starting coordinate system, the three-dimensional starting position of the object being placed at an original point of the starting coordinate system on the plane, the starting orientation of the object agreeing with an orientation of the plane defined by an orientation of a line perpendicular to the plane, and the object being moved with the plane;

moving the plane about the X-axis and the Y-axis at one time in rotational movement by rotating a track ball member of the three-dimensional movement specifying apparatus to place the three-dimensional starting position $(x_0,y_0,z_0)$ and a three-dimensional target position $(x_1,y_1,z_1)$ on the plane, the plane representing the three-dimensional starting position $(x_0,y_0,z_0)$ and the intermediate orientation $(\alpha_2,\beta_2,\gamma_0)$ of the object, the value $\alpha_2$ denoting a rotational angle about an X-axis of a first intermediate coordinate system in which the plane is placed on an X-Y plane, the value $\beta_2$ denoting a rotational angle about a Y-axis of the first intermediate coordinate system, the value $\gamma_2$ denoting a rotational angle about a Z-axis of the first intermediate coordinate system, the three-dimensional starting position $(x_0,y_0,z_0)$ of the object being placed at an original point of the first intermediate coordinate system on the plane, and the intermediate orientation $(\alpha_2,\beta_2,\gamma_0)$ of the object agreeing with an orientation of the plane;

displaying the plane representing the three-dimensional starting position $(x_0,y_0,z_0)$ and the intermediate orientation $(\alpha_2,\beta_2,\gamma_0)$ of the object on the displaying unit;

moving the object from the starting position and orientation $(x_0,y_0,z_0,\alpha_0,\beta_0,\gamma_0)$ to a first intermediate position and orientation $(x_0,y_0,z_0,\alpha_2,\beta_2,\gamma_0)$ under control of a central processing unit of the three-dimensional movement specifying apparatus;

moving straight the plane along the X-axis and the Y-axis of the first intermediate coordinate system at one time in translation movement by rotating a secondary ball member of the three-dimensional movement specifying apparatus to place the object moved with the plane at the three-dimensional target position $(x_1,y_1,z_1)$, the plane representing the three-dimensional target position $(x_1,y_1,z_1)$ and the intermediate orientation $(\alpha_2,\beta_2,\gamma_0)$ of the object, the three-dimensional target position $(x_1,y_1,z_1)$ of the object being placed at an original point of a second intermediate coordinate system in which the plane is placed on an X-Y plane;

displaying the plane representing the three-dimensional target position $(x_1,y_1,z_1)$ and the intermediate orientation $(\alpha_2,\beta_2,\gamma_0)$ of the object on the displaying unit;

moving the object from the first intermediate position and orientation $(x_0,y_0,z_0,\alpha_2,\beta_2,\gamma_0)$ to a second intermediate position and orientation $(x_1,y_1,z_1,\alpha_2,\beta_2,\gamma_0)$ under control of the central processing unit;

moving the plane about an X-axis, a Y-axis and a Z-axis of the second intermediate coordinate system in rotational movement by rotating the track ball member and a ring of the three-dimensional movement specifying apparatus to change the intermediate orientation $(\alpha_2,\beta_2,\gamma_0)$ of the object to a target orientation $(\alpha_1,\beta_1,\gamma_1)$;

displaying the plane representing the three-dimensional target position $(x_1,y_1,z_1)$ and the target orientation $(\alpha_1,\beta_1,\gamma_1)$ of the object on the displaying unit; and moving the object from the second intermediate position and orientation $(x_1,y_1,z_1,\alpha_2,\beta_2,\gamma_0)$ to the target position and orientation $(x_1,y_1,z_1,\alpha_1,\beta_1,\gamma_1)$ under control of the central processing unit.

In the above steps, the plane representing the three-dimensional starting position $(x_0,y_0,z_0)$ and the starting orientation $(\alpha_0,\beta_0,\gamma_0)$ of the object is displayed and is moved about the X-axis and the Y-axis at one time in rotational movement by rotating the track ball member to place the three-dimensional starting position $(x_0,y_0,z_0)$ and a three-dimensional target position $(x_1,y_1,z_1)$ on the plane. Therefore, the plane represents the three-dimensional starting position $(x_0,y_0,z_0)$ and the intermediate orientation $(\alpha_2,\beta_2,\gamma_0)$ of the object.

Thereafter, the plane representing the three-dimensional starting position $(x_0,y_0,z_0)$ and the intermediate orientation $(\alpha_2,\beta_2,\gamma_0)$ is displayed, and the object is moved to a first intermediate position and orientation $(x_0,y_0,z_0,\alpha_2,\beta_2,\gamma_0)$.

Thereafter, the plane is moved straight along the X-axis and the Y-axis of the first intermediate coordinate system at one time in translation movement by rotating the secondary ball member to place the object at the three-dimensional target position $(x_1,y_1,z_1)$. Because the first intermediate coordinate system is formed to, place the three-dimensional target position $(x_1,y_1,z_1)$ on the plane, three position values $x_0,y_0$ and $z_0$ are changed to values $x_1,y_1$ and $z_1$ by moving the plane on the X-Y plane of the first intermediate coordinate system. Thereafter, the plane representing the three-dimensional target position $(x_1,y_1,z_1)$ and the intermediate orientation $(\alpha_2,\beta_2,\gamma_0)$ of the object is displayed, and the object is moved to the second intermediate position and orientation $(x_1,y_1,z_1,\alpha_2,\beta_2,\gamma_0)$.

Thereafter, the plane is moved about the X-axis and the Y-axis of the second intermediate coordinate system in rotational movement by rotating the track ball member, and the plane is moved about the Z-axis in rotational movement by rotating the ring. Therefore, the plane represents the target orientation $(\alpha_1,\beta_1,\gamma_1)$. Thereafter, the plane representing the three-dimensional target position $(x_1,y_1,z_1)$ and the target orientation $(\alpha_1,\beta_1,\gamma_1)$ is displayed, and the object is moved to the target position and orientation $(x_1,y_1,z_1,\alpha_1,\beta_1,\gamma_1)$.

Accordingly, because three position variables can be changed by moving straight the plane on a two-dimensional plane, the moving operation of the object from the starting position and orientation $(x_0,y_0,z_0,\alpha_0,\beta_0,\gamma_0)$ to the target position and orientation $(x_1,y_1,z_1,\alpha_1,\beta_1,\gamma_1)$ can be simplified.

The second object is achieved by the provision of an observational position and orientation changing apparatus for changing position and orientation of an observational eye observing an object in a three-dimensional space, comprising:

plane displaying means for displaying a plane representing a three-dimensional position $(x,y,z)$ and an orientation $(\alpha,\beta,\gamma)$ of an object, an X-Y-Z coordinate system in which the plane is placed on an X-Y plane and the object is placed at an original point being defined, a value $\alpha$ denoting a rotational angle about an X-axis of the coordinate system, a value $\beta$ denoting a rotational angle about a Y-axis of the coordinate system, a value $\gamma$ denoting a rotational angle about a Z-axis of the coordinate system, and the object and the coordinate system being moved with the plane;

first orientation specifying means having a track ball member for specifying a first rotational movement of the plane displayed by the plane displaying means about the X-axis and a second rotational movement of the plane about the Y-axis at one time by rotating the track ball member, the plane which represents a three-dimensional starting position $(x_0,y_0,z_0)$ and a starting orientation $(\alpha_0,\beta_0,\gamma_0)$ of the object being moved according to the first and second rotational movements to place both the three-dimensional starting position $(x_0,y_0,z_0)$ and a three-dimensional target position $(x_1,y_1,z_1)$ on the plane and being changed to the plane which represents the three-dimensional starting position $(x_0,y_0,z_0)$ and an intermediate orientation $(\alpha_2,\beta_2,\gamma_0)$ of the object, and an orientation $(\alpha_2,\beta_2)$ represented by the plane being further changed according to the first and second rotational movements to an orientation $(\alpha_1,\beta_1)$ represented by the plane by rotating the track ball member by angles of $\alpha_1-\alpha_2$ and $\beta_1-\beta_2$ about the X-axis and Y-axis;

position specifying means having a secondary ball member for specifying a first translation movement of the plane displayed by the plane displaying means along the X-axis and a second translation movement of the plane along the Y-axis at one time by rotating the secondary ball member straight, the plane which is determined in the first orientation specifying means and represents the three-dimensional starting position ($x_0, y_0, z_0$) and the intermediate orientation ($\alpha_2, \beta_2, \gamma_0$) of the object being moved according to the first translation movement and changed to the plane which represents the three-dimensional target position ($x_1, y_1, z_1$) and the intermediate orientation ($\alpha_2, \beta_2, \gamma_0$) of the object;

second orientation specifying means for specifying a third rotational movement of the plane displayed by the plane displaying means about the Z-axis, an orientation $\gamma_0$ represented by the plane being changed to an orientation $\gamma_1$ represented by the plane to change the plane which is determined in the position specifying means and represents the three-dimensional target position ($x_1, y_1, z_1$) and the intermediate orientation ($\alpha_2, \beta_2, \gamma_0$) of the object to the plane which represents the three-dimensional target position ($x_1, y_1, z_1$) and a target orientation ($\alpha_1, \beta_1, \gamma_1$) of the object in cooperation with the first orientation specifying means;

control means for controlling movement of the object to virtually move the object which is placed at the three-dimensional starting position ($x_0, y_0, z_0$) and the starting orientation ($\alpha_0, \beta_0, \gamma_0$) represented by the plane to the three-dimensional target position ($x_1, y_1, z_1$) and the target orientation ($\alpha_1, \beta_1, \gamma_1$) represented by the plane which is determined by specifying the first and second rotational movements, the first translation movement and the third rotational movement in the first orientation specifying means, the position specifying means and the second orientation specifying means;

object moving data storing means for storing pieces of moving data of the object consisting of degrees of the first, second and third rotational movements of the object specified in the first orientation specifying means and the second orientation specifying means and degrees of the first and second translation movements specified in the position specifying means, the moving data designating movements of the object;

relative position and orientation storing means for storing relative position and orientation between the object and the observational eye;

observational eye position and orientation calculating means for calculating a moved position and orientation of the observational eye moved with the object on condition that the relative position and orientation stored in the relative position and orientation storing means is maintained even though the object is moved according to the moving data stored in the object moving data storing means, the moved position and orientation of the observational eye being obtained by adding the relative position and orientation stored in the relative position and orientation storing means and the moving data stored in the object position and orientation storing means; and observational eye position and orientation storing means for storing the moved position and orientation of the observational eye calculated in the observational eye position and orientation calculating means, the observational eye being moved to the moved position and orientation stored in the observational eye position and orientation storing means.

In the above configuration, the observational eye is moved with the object while maintaining a relationship in position and orientation between the observational eye and the object to observe the object displayed in a displaying unit from a fixed position and orientation with the observational eye even though the object is moved to a moved position and orientation.

In detail, pieces of moving data of the object consisting of degrees of the first, second and third rotational movements and degrees of the first and second translation movements are stored in the object moving data storing means. Also, a relative position and orientation between the object and the observational eye is stored in advance in the relative position and orientation storing means.

Thereafter, the moved position and orientation of the observational eye is calculated by adding the relative position and orientation and the moving data in the observational eye position and orientation calculating means. Thereafter, the moved position and orientation of the observational eye calculated are stored in the observational eye position and orientation storing means.

Therefore, the object displayed in the displaying unit is moved according to the moving data stored in the object moving data storing means, and the observational eye is moved to the moved position and orientation by referring to the object moving data storing means.

Accordingly, the object can be observed from the fixed position and orientation with the observational eye even though the object is moved.

BRIEF DESCRIPTION OF THE DRAWINGS

The objects, features and advantages of the present invention will be apparent from the following description taken in conjunction with the accompanying drawings, in which:

FIG. 2 is a diagonal perspective view of a conventional three-dimensional movement specifying apparatus;

FIG. 15 shows an operation performed in the apparatus shown in FIG. 6 in cases where a secondary ball member rolls on;

FIG. 48 shows the movement of an observational eye $E_o$ on condition that the position and orientation of an object are fixed;

FIG. 49 is a constitutional view of a three-dimensional movement specifying apparatus according to a fourth embodiment of the present invention;

FIG. 50 is a block diagram of storing sections shown in FIG. 49; and

FIG. 51 shows a fixed relationship between an specifying plane and an object.

DETAIL DESCRIPTION OF THE PREFERRED EMBODIMENTS

Preferred embodiments of a three-dimensional movement specifying apparatus according to the present invention are described with reference to drawings.
(First Embodiment)

Various types of movement of an object are initially described for mathematical preparation with reference to FIGS. 4A to 4E.

FIGS. 4A to 4G respectively show translation movement or rotational movement of an object (or a picture).

A position of an object (or a picture) is generally designated by a reference point Pr of the object, and an orientation of the object is generally designated by a directional vector p of which a starting point is positioned at the reference point Pr. The rotational movement of the object can be mathematically performed by multiplying the directional vector p by a transformation affine matrix. For example, in cases where the reference point Pr is positioned at an original point 0(0, 0, 0) in a three-dimensional orthogonal coordinate system O-XYZ and the directional vector p is directed in the +Z axis direction, the directional vector p is formulated by an equation (1).

$$p = \begin{pmatrix} 0 \\ 0 \\ z \\ 1 \end{pmatrix} \quad (1)$$

Also, a transformation affine matrix $T\alpha$ for rotating the object by an angle of $\alpha$ about the X-axis is formulated by an equation (2).

$$T\alpha = \begin{pmatrix} 1 & 0 & 0 & 0 \\ 0 & \cos(\alpha) & \sin(\alpha) & 0 \\ 0 & -\sin(\alpha) & \cos(\alpha) & 0 \\ 0 & 0 & 0 & 1 \end{pmatrix} \quad (2)$$

Figure 1:
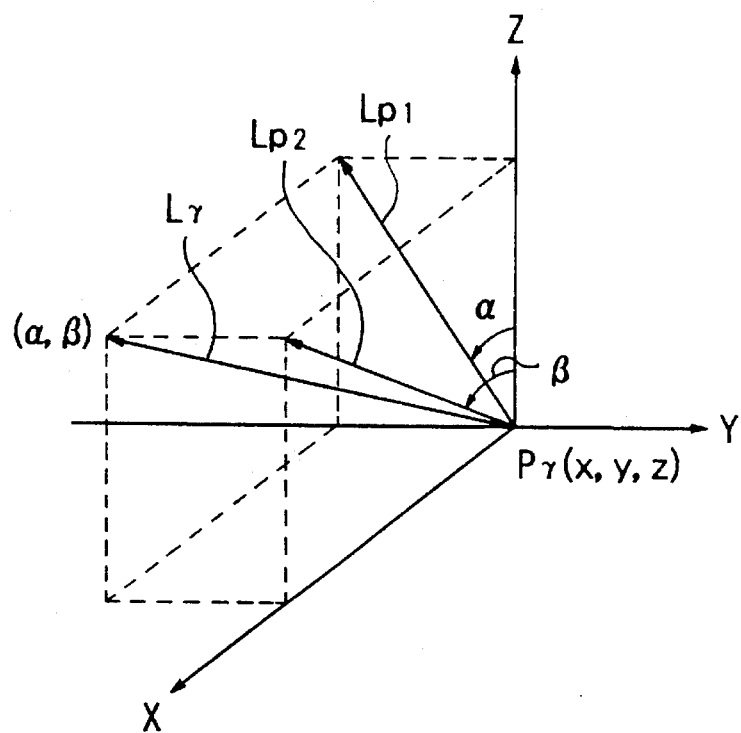
FIG. 1 shows position and orientation of an object in a three-dimensional space.
Figure 3:
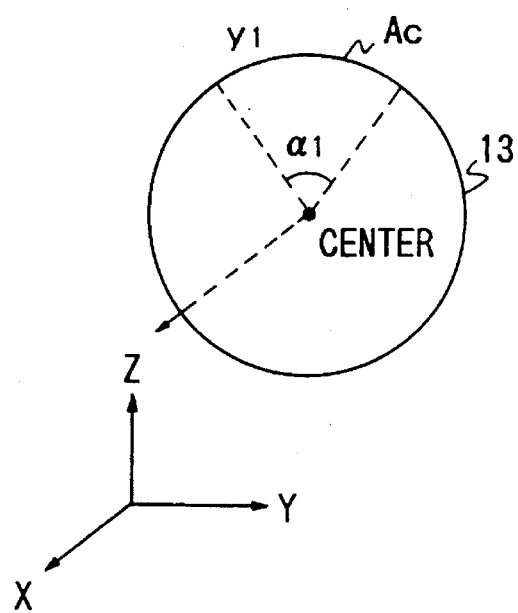
FIG. 3 shows rotation of a ball member shown in FIG. 2 about an X-axis, the rotation indicating a rotational movement $\alpha_1$ about the X-axis or a translation movement $y_1$ in a Y-axis.
Figure 4A:
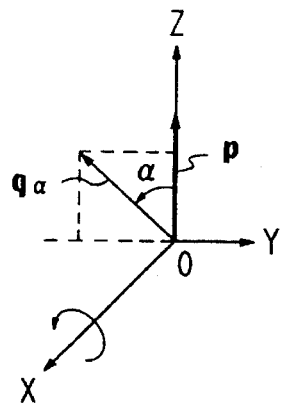
FIGS. 4A to 4G respectively show translation movement or rotational movement of an object.

Therefore, as shown in FIG. 4A, in cases where a rotated vector $q_\alpha$ is defined as a vector obtained by rotating the directional vector p by the angle of $\alpha$ about the X-axis, the rotated vector $q_\alpha$ is formulated by an equation (3).

$$q_\alpha = T\alpha * p \quad (3)$$

Also, a transformation affine matrix $T\beta$ for rotating the object by an angle of $\beta$ about the Y-axis is formulated by an equation (4).

$$T\beta = \begin{pmatrix} \cos(\beta) & 0 & -\sin(\beta) & 0 \\ 0 & 1 & 0 & 0 \\ \sin(\beta) & 0 & \cos(\beta) & 0 \\ 0 & 0 & 0 & 1 \end{pmatrix} \quad (4)$$

Figure 4B:
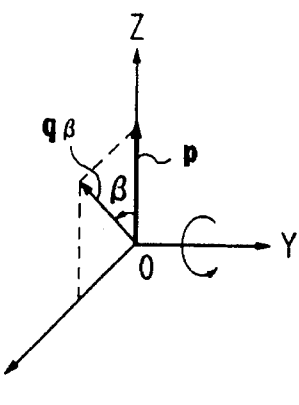

Therefore, as shown in FIG. 4B, in cases where a rotated vector $q_\beta$ is defined as a vector obtained by rotating the directional vector p by the angle of $\beta$ about the Y-axis, the rotated vector $q_\beta$ is formulated by an equation (5).

$$q_\beta = T\beta * p \quad (5)$$

Also, a transformation affine matrix $T\gamma$ for rotating the object by an angle of $\gamma$ about the Z-axis is formulated by an equation (6).

$$T\gamma = \begin{pmatrix} \cos(\gamma) & \sin(\gamma) & 0 & 0 \\ -\sin(\gamma) & \cos(\gamma) & 0 & 0 \\ 0 & 0 & 1 & 0 \\ 0 & 0 & 0 & 1 \end{pmatrix} \quad (6)$$

Figure 4C:
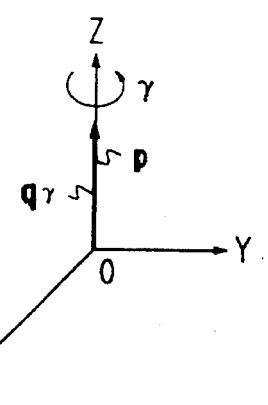

Therefore, as shown in FIG. 4C, in cases where a rotated vector $q_\gamma$ is defined as a vector obtained by rotating the directional vector p by the angle of $\gamma$ about the Z-axis, the rotated vector $q_\gamma$ is formulated by an equation (7).

$$q_\gamma = T\gamma * p \quad (7)$$

Figure 4D:
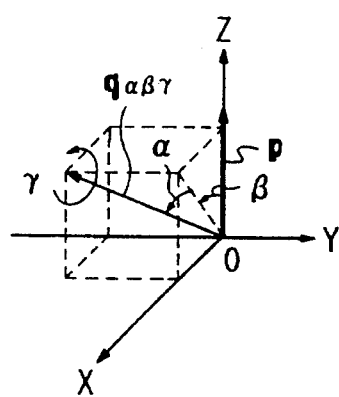

The equation (7) is utilized to spin the object. In other words, the rotation of a vector designating the rotation of the object about the Z-axis denotes rotation of the vector on its axis in the specification. Therefore, as shown in FIG. 4D, in cases where the directional vector p is spun and rotated about the X and Y-axes, the spun and rotated vector $q_{\alpha\beta\gamma}$ is formulated by an equation (8).

$$q_{\alpha\beta\gamma} = T\alpha * T\beta * T\gamma * p \quad (8)$$

Also, the translation movement of the object can be mathematically performed by multiplying the directional vector p by a transformation affine matrix. For example, in cases where the reference point Pr of the object is positioned at a point Pr (x, y, z) and the directional vector p is directed in a certain direction, the directional vector p is generally formulated by an equation (9).

$$p = \begin{pmatrix} x \\ y \\ z \\ 1 \end{pmatrix} \quad (9)$$

Also, a transformation affine matrix Tx for moving the object in parallel to the X-axis by a fixed distance $x_1$ is formulated by an equation (10).

$$Tx = \begin{pmatrix} 1 & 0 & 0 & x_1 \\ 0 & 1 & 0 & 0 \\ 0 & 0 & 1 & 0 \\ 0 & 0 & 0 & 1 \end{pmatrix} \quad (10)$$

Figure 4E:
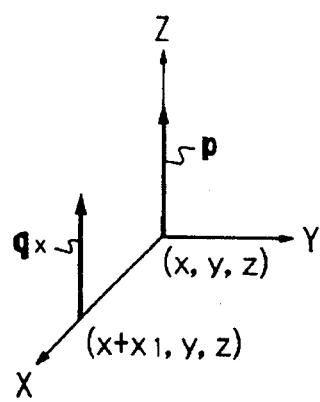

Therefore, as shown in FIG. 4E, in cases where a translation vector $q_x$ is defined as a vector obtained by moving the directional vector p in parallel to the X-axis, the translation vector $q_x$ is formulated by an equation (11).

$$q_x \times Tx * p \quad (11)$$

Also, a transformation affine matrix Ty for moving the object in parallel to the Y-axis by a fixed distance $y_1$ is formulated by an equation (12).

$$Ty = \begin{pmatrix} 1 & 0 & 0 & 0 \\ 0 & 1 & 0 & y_1 \\ 0 & 0 & 1 & 0 \\ 0 & 0 & 0 & 1 \end{pmatrix} \quad (12)$$

Figure 4F:
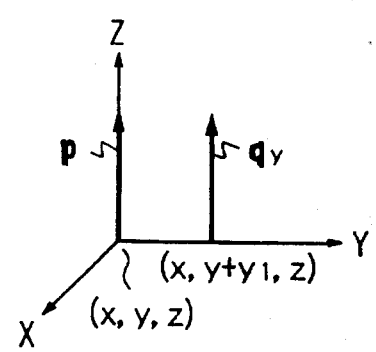

Therefore, as shown in FIG. 4F, in cases where a translation vector $q_y$ is defined as a vector obtained by moving the directional vector p in parallel to the Y-axis, the translation vector $q_y$ is formulated by an equation (13).

$$q_y = Ty * p \quad (13)$$

Also a transformation affine matrix Tz for moving the object in parallel to the Z-axis by a fixed distance $z_1$ is formulated by an equation (14).

$$Tz = \begin{pmatrix} 1 & 0 & 0 & 0 \\ 0 & 1 & 0 & 0 \\ 0 & 0 & 1 & z_1 \\ 0 & 0 & 0 & 1 \end{pmatrix} \quad (14)$$

Figure 4G:
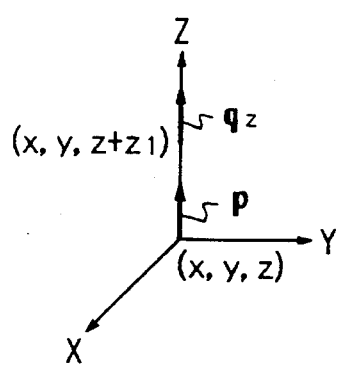

Therefore, as shown in FIG. 4G, in cases where a translation vector $q_z$ is defined as a vector obtained by moving the directional vector p in parallel to the Z-axis, the translation vector $q_z$ is formulated by an equation (15).

$$q_z = Tz * p \quad (15)$$

Figure 5:
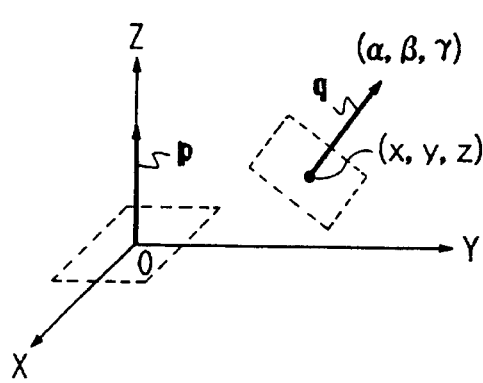
FIG. 5 shows a position and an orientation of an object performed various types of translation movement and rotational movement.

As shown in FIG. 5, in cases where a moved vector q is defined as a vector obtained by repeatedly performing the rotational movement about the X, Y and Z-axes for the directional vector p and the translation movement along the X, Y and Z-axes for the directional vector p, the moved vector q is formulated by an equation (16).

$$q = Tx * Ty * Tz * T\alpha * T\beta * T\gamma * p \tag{16}$$

Figure 6:
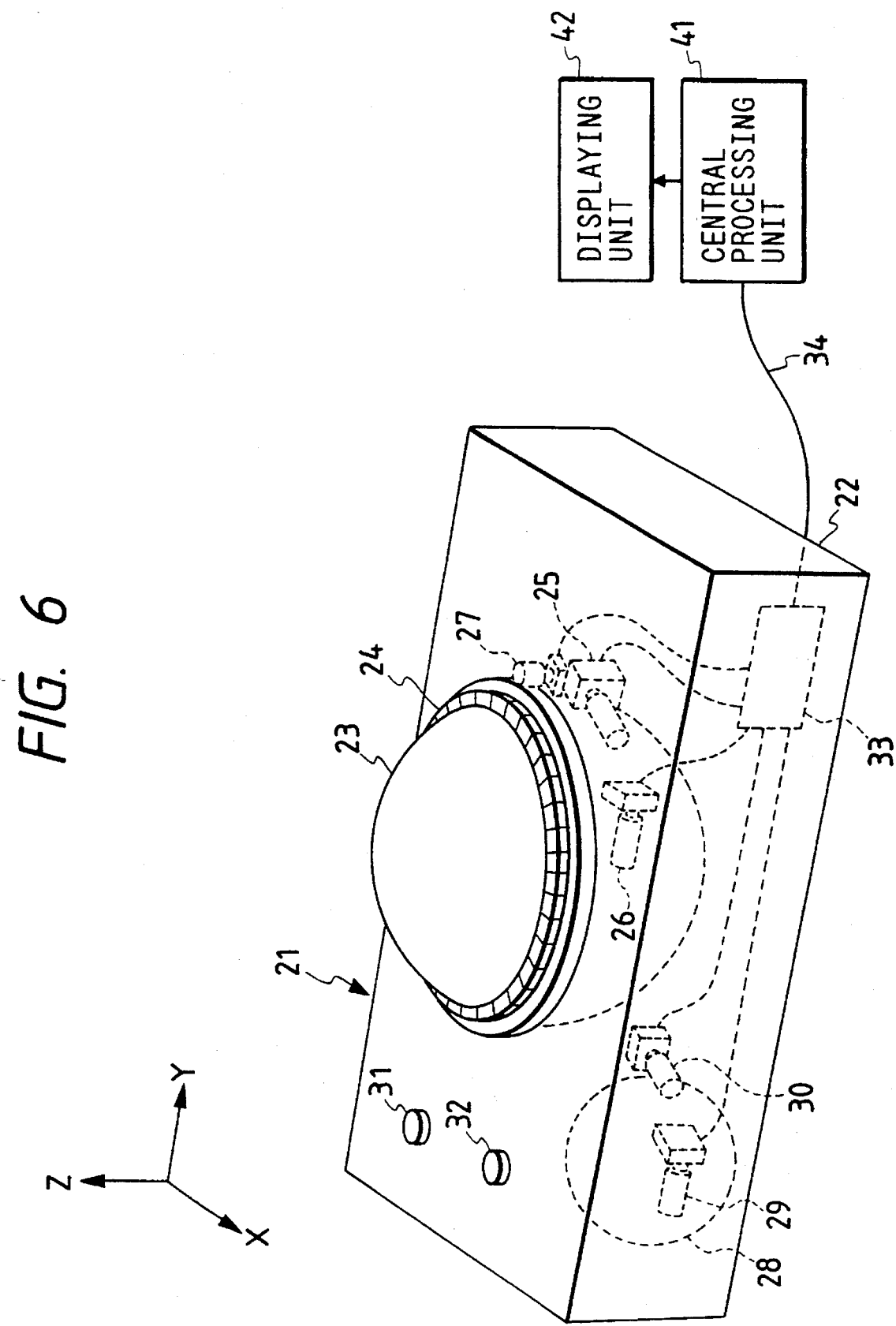
FIG. 6 is a diagonal perspective view of a three-dimensional movement specifying apparatus according to a first embodiment of the present invention.
Figure 7:
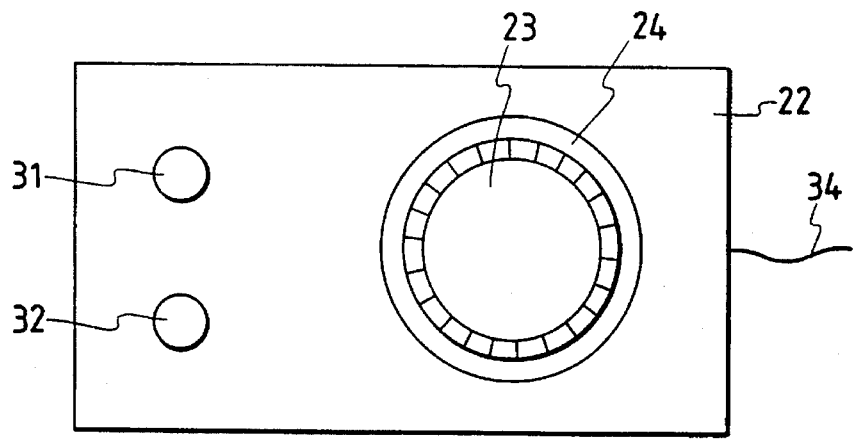
FIG. 7 is a top view of the apparatus shown in FIG. 6.
Figure 8:
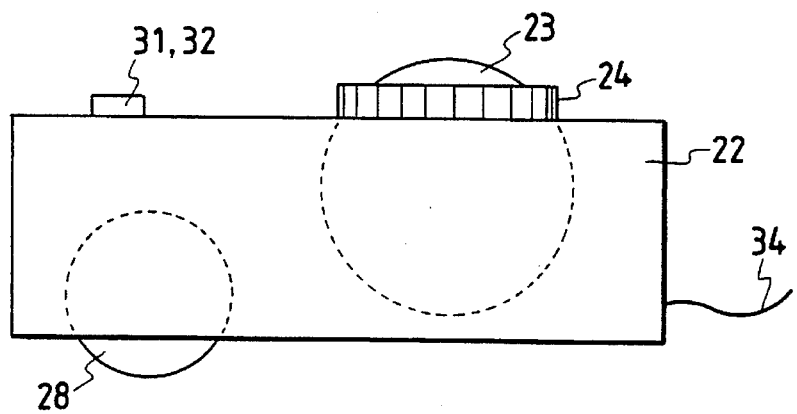
FIG. 8 is a side view of the apparatus shown in FIG. 6.
Figure 9:
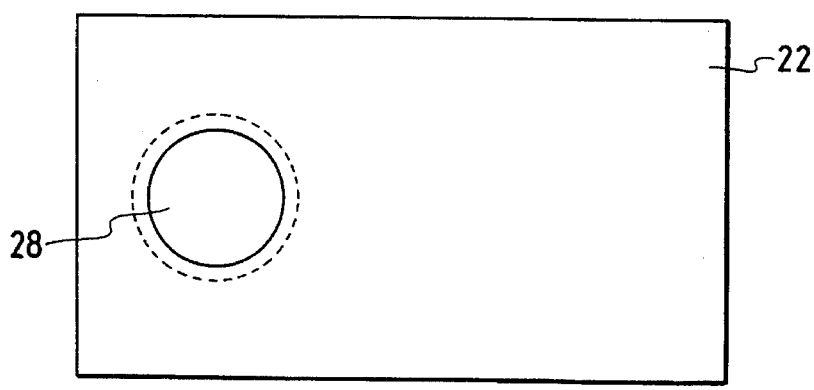
FIG. 9 is a bottom view of the apparatus shown in FIG. 6.
Figure 10:
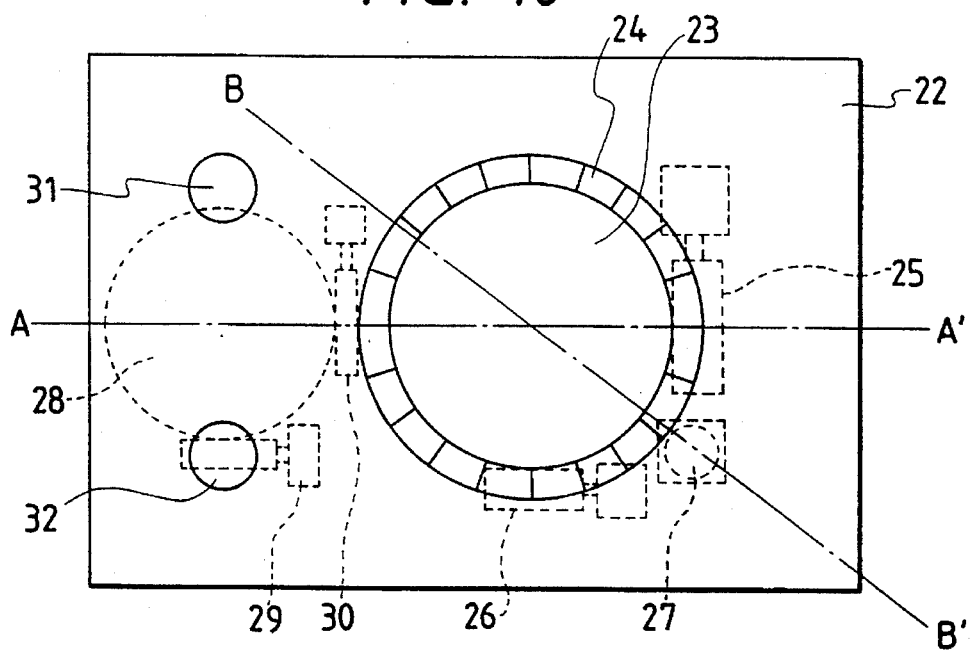
FIG. 10 is a perspective top view of the apparatus shown in FIG. 6.
Figure 11:
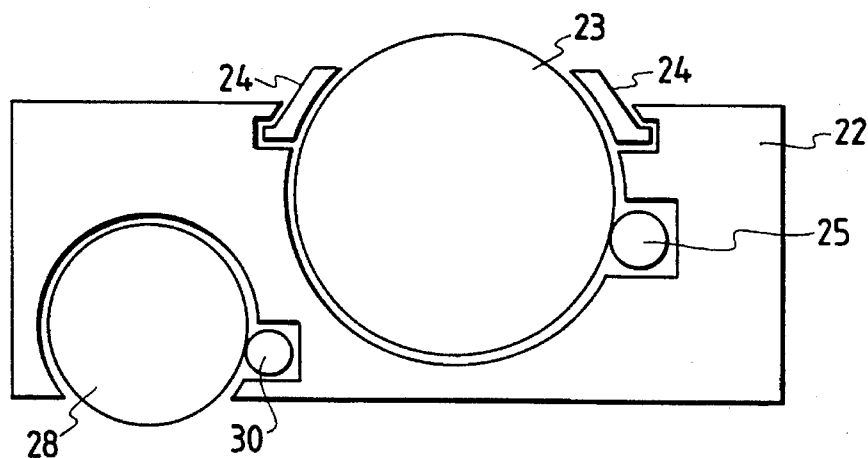
FIG. 11 is a sectional view taken along lines A–A' of FIG. 10.
Figure 12:
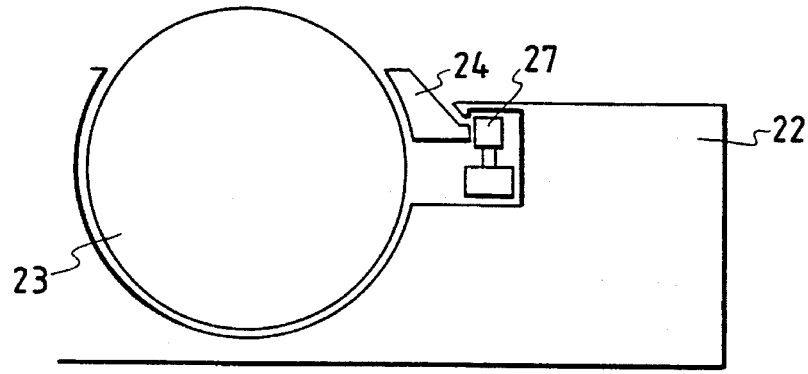
FIG. 12 is a sectional view taken along lines B–B' of FIG. 10.

FIG. 6 is a diagonal perspective view of a three-dimensional movement specifying apparatus according to a first embodiment of the present invention. FIG. 7 is a top view of the apparatus shown in FIG. 6. FIG. 8 is a side view of the apparatus shown in FIG. 6. FIG. 9 is a bottom view of the apparatus shown in FIG. 6. FIG. 10 is a perspective top view of the apparatus shown in FIG. 6. FIG. 11 is a sectional view taken along lines A–A' of FIG. 10. FIG. 12 is a sectional view taken along lines B–B' of FIG. 10.

As shown in FIGS. 6 to 12, a three-dimensional movement specifying apparatus 21 comprises a box type of casing 22, a track ball member 23 rotatably arranged in the casing 22, an annular ring 24 arranged around the periphery of the track ball member 23 for rotating about a Z-axis of an X-Y-Z coordinate system with an operator's finger, a first rotary sensor 25 rotating with rotation of the track ball member 23 about an X-axis of the X-Y-Z coordinate system, a second rotary sensor 26 rotating with rotation of the track ball member 23 about a Y-axis of the X-Y-Z coordinate system, a third rotary sensor 27 rotating with rotation of the annular ring 24 about the Z-axis, a secondary ball member 28 rolling on an X-Y plane (or a desk) of the X-Y-Z coordinate system with the movement of the casing 22, a fourth rotary sensor 29 rotating with the roll of the secondary ball member 28 along the X-axis for detecting the number of fourth rotations equivalent to a degree of translation movement along the X-axis, a fifth rotary sensor 30 rotating with the roll of the secondary ball member 28 along the Y-axis for detecting the number of fifth rotations equivalent to a degree of translation movement along the Y-axis, a first specifying button 31 for specifying translation movement in a +Z-axis direction, and a second specifying button 32 for specifying translation movement in a –Z-axis direction.

The upper portion of the track ball member 23 is projected from the casing 22 to rotate the track ball member 23 about the X and Y-axes with the operator's finger. The annular ring 24 is rotated by the operator. In this case, the rotation of the track ball member 23 and the rotation of the annular member 24 are independent of each other. The number of first rotations equivalent to a degree of a first rotational movement of the ball member 23 about the X-axis is detected by the first rotary sensor 25, the number of second rotations equivalent to a degree of a second rotational movement of the ball member 23 about the Y-axis is detected by the second rotary sensor 26, and the number of third rotations equivalent to a degree of a third rotational movement of the annular ring 24 about the Z-axis is detected by the third rotary sensor 27.

Therefore, a first orientation specifying means for specifying the first rotational movement about the X-axis and the second rotational movement about the Y-axis at one time is composed of the ball member 23, the first rotary sensor 25 and the second rotary sensor 26. Also, a second orientation specifying means for specifying the third rotational movement about the Z-axis is composed of the annular ring 24 and the third rotary sensor 27.

As shown in FIGS. 8, 9 and 11, the lower portion of the secondary ball member 28 is projected from the bottom side of the casing 22 so that the secondary ball member 28 is rotated with the translation movement of the casing 22 which is pushed by the operator's finger. The number of rotations equivalent to a degree of a first translation movement of the secondary ball member 28 along the X-axis is detected by the fourth rotary sensor 29, and the number of rotations equivalent to a degree of a second translation movement of the secondary ball member 28 along the Y-axis is detected by the fifth rotary sensor 30.

Therefore, a position specifying means for specifying the first translation movement along the X-axis and the second translation movement along the Y-axis is composed of the secondary ball member 28, the fourth rotary sensor 29 and the fifth rotary sensor 30.

The degree of the translation movement in the +Z-axis direction for the object is proportional to a continuing period of the operation in which the first specifying button 31 is pushed, and the degree of the translation movement in the –Z-axis direction for the object is proportional to a continuing period of the operation in which the second specifying button 32 is pushed.

The apparatus 21 furthermore comprises a control unit 33 for receiving a first signal indicating the degree of the rotational movement about the X-axis from the first rotary sensor 25, receiving a second signal indicating the degree of the rotational movement about the Y-axis from the second rotary sensor 26, receiving a third signal indicating the degree of the rotational movement about the Z-axis from the third rotary sensor 27, receiving a fourth signal indicating the degree of the translation movement along the X-axis from the fourth rotary sensor 29, receiving a fifth signal indicating the degree of the translation movement along the Y-axis from the fifth rotary sensor 30, receiving a first specifying signal indicating a degree of the translation movement in the +Z-axis direction from the first specifying button 31, receiving a second specifying signal indicating a degree of the translation movement in the –Z-axis direction from the second specifying button 32, and producing pieces of movement data from the signals, a data transferring code 34 for transferring the movement data produced in the control unit 33, a control processing unit 41 for controlling rotational movements and/or translation movements of a plane representing a three-dimensional position (x,y,z) and an orientation ($\alpha,\beta,\gamma$) of an object according to the movement data transferred through the data transferring code 34 to move an object with the plane, and a displaying unit 42 for displaying the plane under the control of the central processing unit 41. The plane displayed by the displaying unit 42 is placed on the X-Y plane of the X-Y-Z coordinate system, and the object is placed at an original point of the X-Y-Z coordinate system. Because the plane is moved according to the rotation of the ball member 23 and/or the secondary ball member 28, the object and the X-Y-Z coordinate system are moved with the plane. Therefore, the X,Y and Z axes relating to the rotational movements and translation movements of the plane vary each time the plane is moved.

In the above configuration, four types of basic operations performed by utilizing the apparatus 21 is described with reference to FIGS. 13 to 16.

Figure 13:
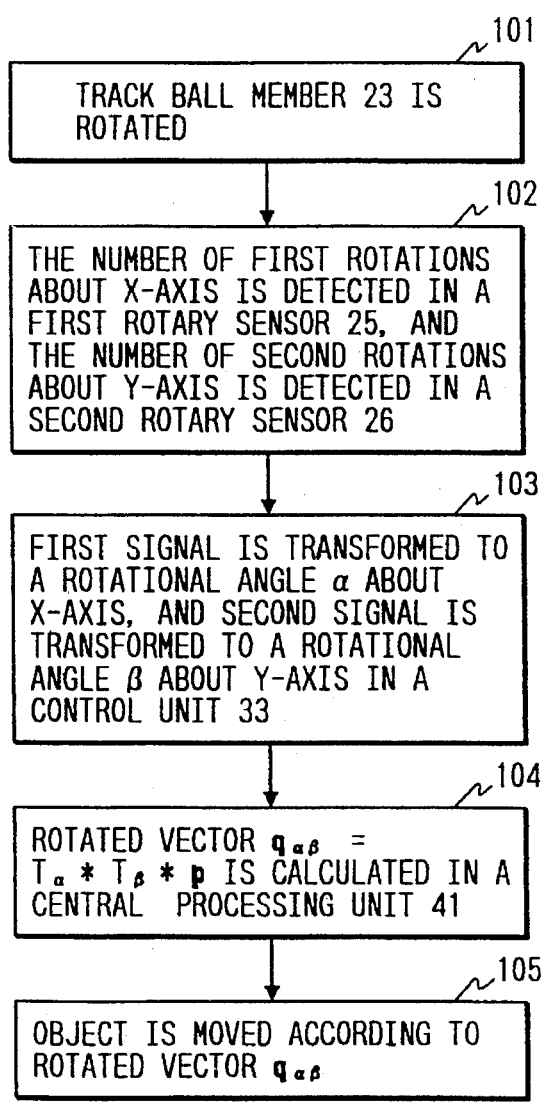
FIG. 13 shows an operation performed in the apparatus shown in FIG. 6 in cases where a main ball member is rotated.
Figure 17:
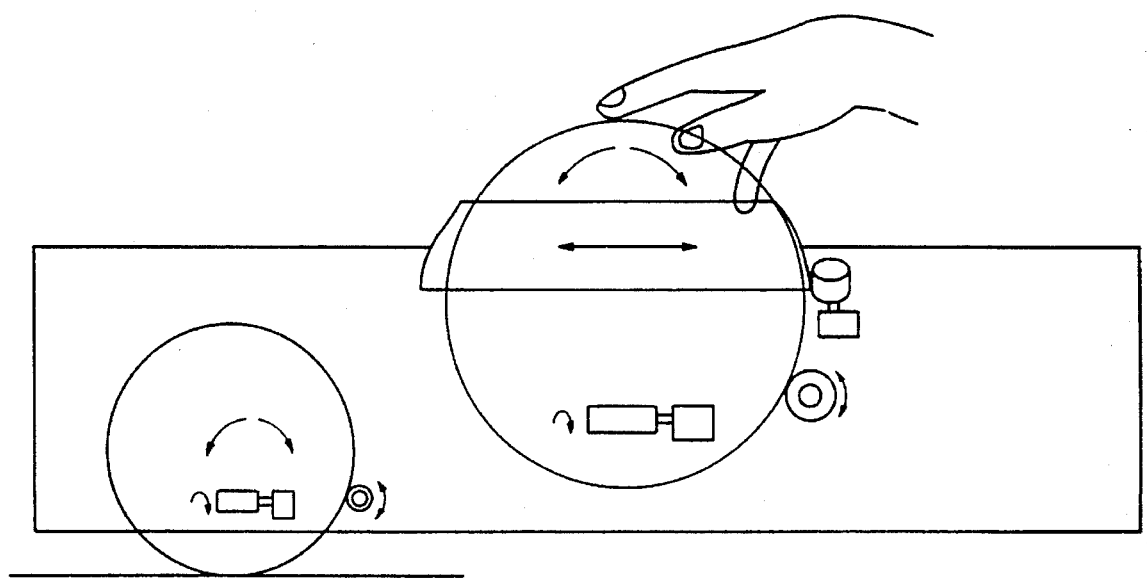
FIG. 17 shows the apparatus shown in FIG. 6 of which a main ball member is rotated by operator's fingers.

In a step 101 shown in FIG. 13, when the upper portion of the track ball member 23 is rotated by the operator as shown in FIG. 17 to specify rotational movement of a plane displayed by the displaying unit 42 about X and Y-axes, the first rotary sensor 25 is rotated with the rotation of the track ball member 23 about the X-axis, and the second rotary sensor 26 is rotated with the rotation of the track ball member 23 about the Y-axis. Therefore, in a step 102, the number of first rotations about the X-axis is detected in the first rotary sensor 25, and the number of second rotations about the Y-axis is detected in the second rotary sensor 26. Thereafter, the first and second signals indicating the number of first rotations and the number of second rotations are transferred to the control unit 33. In the control unit 33, the first signal is transformed to a rotational angle $\alpha$ of the track ball member 23 about the X-axis, and the second signal is transformed to a rotational angle $\beta$ of the track ball member 23 about the Y-axis (a step 103). Thereafter, the rotational angle $\alpha$ of the track ball member 23 about the X-axis and the rotational angle $\beta$ of the track ball member 23 about the Y-axis are transferred to the central processing unit 41 through the data transferring code 34. In the central processing unit 41, the transformation affine matrices $T\alpha$, $T\beta$ are calculated, and a rotated vector $q_{\alpha\beta}=T\alpha*T\beta*p$ is calculated (in a step 104). Thereafter, in a step 105, the plane of which the position and orientation are designated by the directional vector p and its starting point Pr is moved and changed to a moved plane of which the position and orientation are designated by the rotated vector $q_{\alpha\beta}$ and its starting point. The moved plane is displayed by the displaying unit 42, and an object moved with the moved plane is also displayed by the displaying unit 42 under the control of the central processing unit 41. Therefore, the object is virtually moved according to the rotated vector $q_{\alpha\beta}$.

Figure 14:
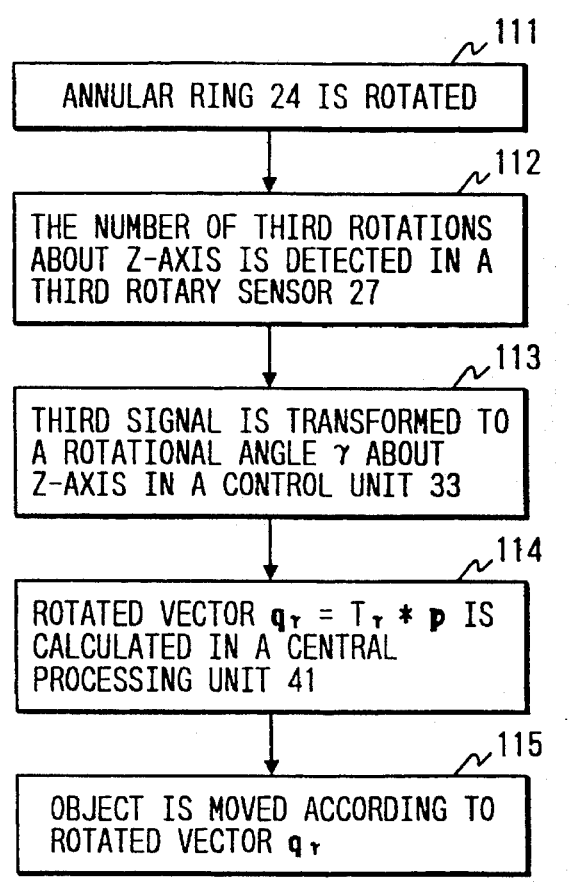
FIG. 14 shows an operation performed in the apparatus shown in FIG. 6 in cases where an annular ring is rotated.

Also, in a step 111 shown in FIG. 14, when the annular ring 24 is rotated by the operator to specify rotational movement of a plane displayed by the displaying unit 42 about the Z-axis, the third rotary sensor 27 is rotated with the rotation of the annular ring 24 about the Z-axis. Therefore, in a step 112, the number of third rotations about the Z-axis is detected in the third rotary sensor 27. Thereafter, the third signal indicating the number of third rotations is transferred to the control unit 33. In the control unit 33, the third signal is transformed to a rotational angle $\gamma$ of the annular ring 24 about the Z-axis in a step 113. Thereafter, the rotational angle $\gamma$ of the annular ring 24 about the Z-axis is transferred to the central processing unit 41 through the data transferring code 34. In the central processing unit 41, the transformation affine matrix $T\gamma$ is calculated, and a rotated vector $q_\gamma=T\gamma*p$ is calculated (in a step 114). Thereafter, in a step 115, the plane of which the position and orientation are designated by the directional vector p and its starting point Pr is moved and changed to a moved plane of which the position and the orientation are designated by the rotated vector $q_\gamma$ and its starting point. The moved plane is displayed by the displaying unit 42, and an object moved with the moved plane is also displayed by the displaying unit 42 under the control of the central processing unit 41. Therefore, the object is virtually moved according to the rotated vector $q_\gamma$.

Figure 15:
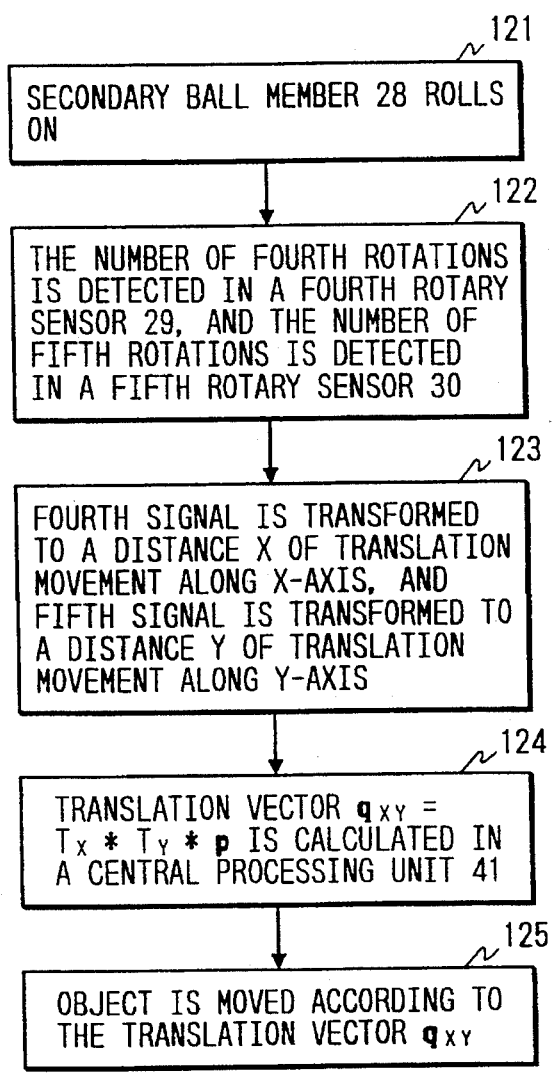

Also, when the casing 22 is slid on a desk to specify translation movement of a plane displayed by the displaying unit 42 along the X and Y-axes, the secondary ball member 28 rolls on in a step 121 shown in FIG. 15. Therefore, the fourth rotary sensor 29 is rotated with the roll of the secondary ball member 28 along the X-axis, and the fifth rotary sensor 30 is rotated with the roll of the secondary ball member 28 along the Y-axis. Therefore, in a step 122, the number of fourth rotations is detected in the fourth rotary sensor 29, and the number of fifth rotations is detected in the fifth rotary sensor 30. Thereafter, the fourth and fifth signals indicating the number of fourth rotations and the number of fifth rotations are transferred to the control unit 33. In the control unit 33, the fourth signal is transformed to a distance x of the translation movement along the X-axis, and the fifth signal is transformed to a distance y of the translation movement along the Y-axis (a step 123). Thereafter, the distance x of the translation movement along the X-axis and the distance y of the translation movement along the Y-axis are transferred to the central processing unit 41 through the data transferring code 34. In the central processing unit 41, the transformation affine matrices Tx, Ty are calculated, and a translation vector $q_{xy}=Tx*Ty*p$ is calculated (in a step 124). Thereafter, in a step 125, the plane of which the position and orientation are designated by the directional vector p and its starting point is moved and changed to a moved plane of which the position and orientation are designated by the translation vector $q_{xy}$ and its starting point. The moved plane is displayed by the displaying unit 42, and an object moved with the moved plane is also displayed by the displaying unit 42 under the control of the central processing unit 41. Therefore, the object is virtually moved according to the translation vector $q_{xy}$.

Figure 16:
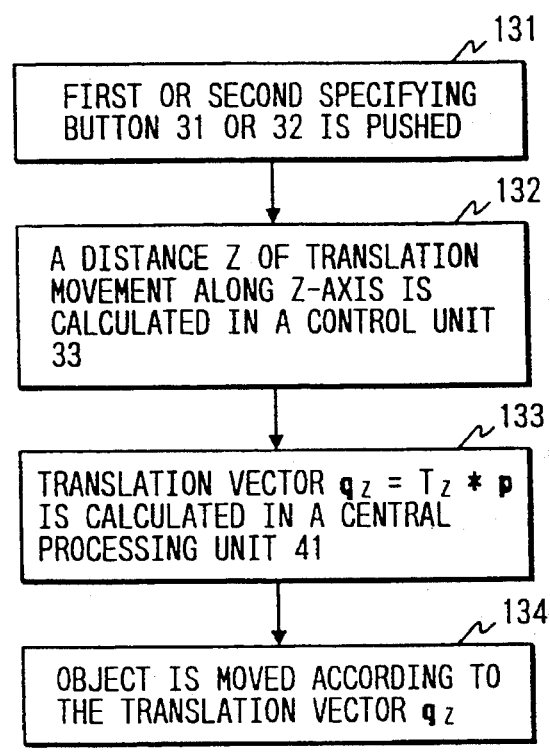
FIG. 16 shows an operation performed in the apparatus shown in FIG. 6 in cases where a first or second specifying button is pushed.

Also, when the first specifying button 31 or the second specifying button 32 is pushed in a step 131 shown in FIG. 16 to specify translation movement of a plane displayed by the displaying unit 42 along the Y-axis, the first or second specifying signal is transferred to the control unit 33. In the control unit 33, a continuing time of the first or second specifying signal is counted, and a distance z of the translation movement along the Z-axis which is proportional to the continuing time is calculated in a step 132. Thereafter, the distance z of the translation movement along the Z-axis is transferred to the central processing unit 41 through the data transferring code 34. In the central processing unit 41, the transformation affine matrix Tz is calculated, and a translation vector $q_z=Tz*p$ is calculated (a step 133). Thereafter, in a step 134, the plane of which the position and orientation are designated by the directional vector p and its starting point is moved and changed to a moved plane of which the position and the orientation are designated by the translation vector $q_z$ and its starting point. The moved plane is displayed by the displaying unit 42, and an object moved with the moved plane is also displayed by the displaying unit 42 under the control of the central processing unit 41. Therefore, the object is virtually moved according to the translation vector $q_z$.

FIGS. 18A to 18E respectively show the rotational movement or the translation movement of a plane positioned in a three-dimensional space.

As shown in FIGS. 18A to 18E, a plane $S_0$ representing a three-dimensional position and orientation of an object Ob1 (or a picture) displayed in the displaying unit 42 is oriented in a +z-axis direction before the movement of the plane $S_0$. A reference point Pr of the plane $S_0$ representing the position of the plane $S_0$ is positioned at an original point (0, 0, 0) of an O-XYZ coordinate system, and the orientation of the plane $S_0$ is designated by its normal line defined as directional vector $p(0, 0, z_0)$. Also, another plane $S_1$ representing a three-dimensional position and orientation of a moved object is defined as a plane obtained by performing the rotational movement or the translation movement for the plane $S_0$, and the orientation of the plane $S_1$ is designated by its normal line defined as a moved vector q.

Figure 18A:
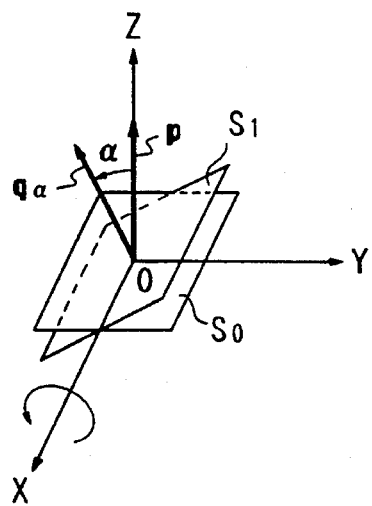
FIGS. 18A to 18E respectively show the rotational movement or the translation movement of a plane positioned in a three-dimensional space.
Figure 18B:
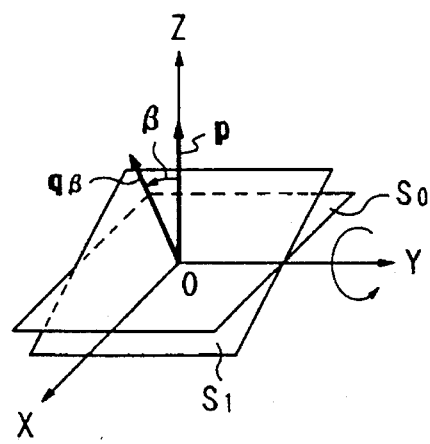
Figure 18C:
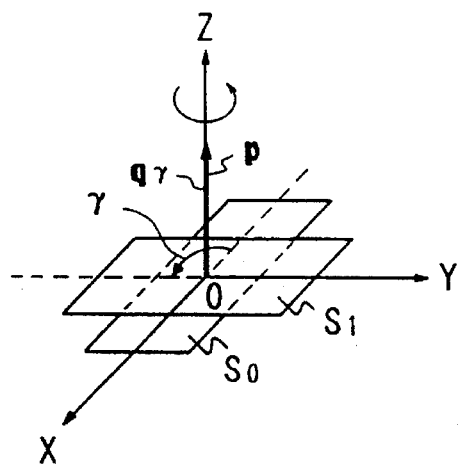
Figure 18E:
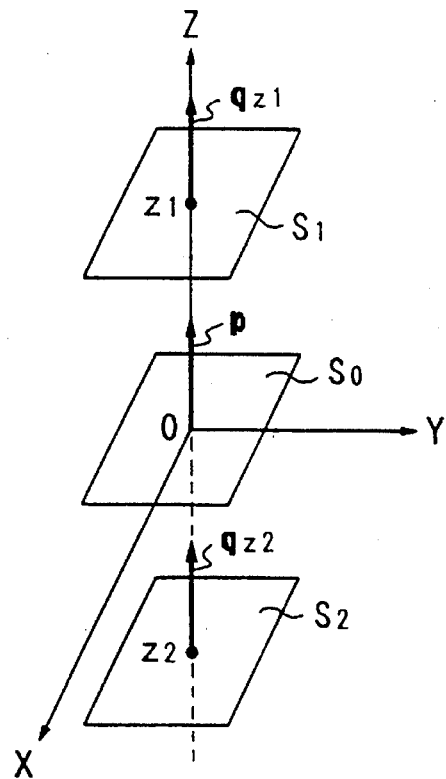
Figure 18D:
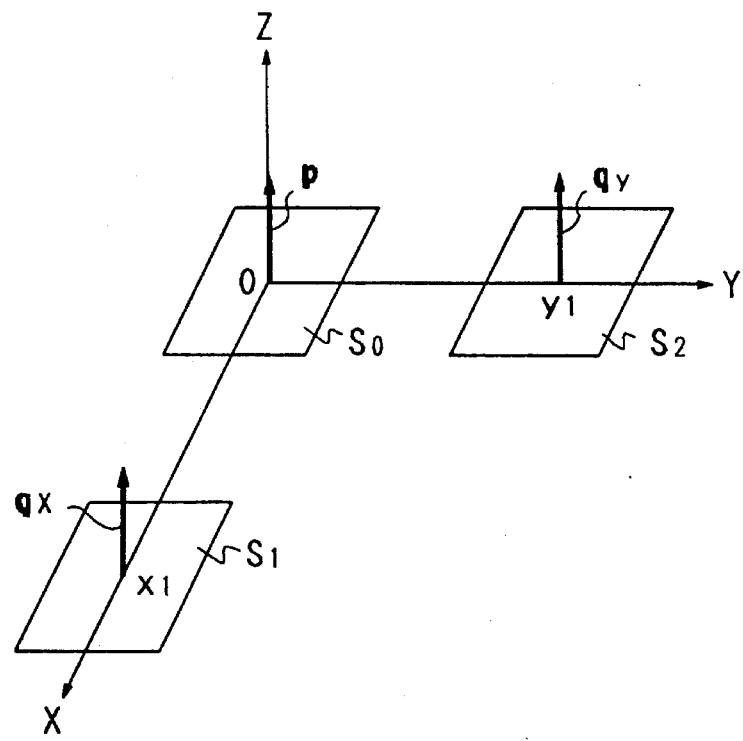

In cases where the track ball member 23 is rotated by an angle of $\alpha$ about the X-axis, the plane $S_0$ displayed in the displaying unit 42 is also rotated in the same manner and is changed to a plane $S_1$ having a rotated vector $q_\alpha$ as shown in FIG. 18A. In cases where the track ball member 23 is rotated by an angle of $\beta$ about the Y-axis, the plane $S_0$ displayed in the displaying unit 42 is also rotated in the same manner and is changed to a plane $S_1$ having a rotated vector $q_\beta$ as shown in FIG. 18B. In cases where the annular ring 24 is rotated by an angle of $\gamma$ about the Z-axis, the plane $S_0$ displayed in the displaying unit 42 is also rotated in the same manner and is changed to a plane $S_1$ having a rotated vector $q_\gamma$ as shown in FIG. 18C. In cases where the secondary ball member 28 rolls on an X-Y plane of the O-XYZ coordinate system by a distance $x_1$ along the X-axis, the plane $S_0$ displayed in the displaying unit 42 is moved in the same manner and is changed to a plane $S_1$ having a translation vector $q_x$ as shown in FIG. 18D. In cases where the secondary ball member 28 rolls on by a distance $y_1$ along the Y-axis, the plane $S_0$ displayed in the displaying unit 42 is moved in the same manner and is changed to a plane $S_2$ having a translation vector $q_y$ as shown in FIG. 18D. In cases where the first specifying button 31 is pushed, the plane $S_0$ displayed in the displaying unit 42 moves by a distance $z_1$ in the +Z-axis direction and is changed to a plane $S_1$ having a translation vector $q_{z1}$ as shown in FIG. 18E. In cases where the second specifying button 32 is pushed, the plane $S_0$ displayed in the displaying unit 42 moves by a distance $z_2$ in the −Z-axis direction and is changed to a plane $S_2$ having a translation vector $q_{z2}$ as shown in FIG. 18E.

Accordingly, the object moved with the plane displayed in the displaying unit 42 can be smoothly moved according to the rotational movement or the translation movement while the operator puts his fingers on the apparatus 21.

Also, in cases where the operator intends to perform the translation movement for the object, the translation movement can be performed by sliding the casing 22 on a desk without rotating the track ball member 23. Therefore, the operator can intuitively adjust a moving distance x or y of the casing 22 along the X or Y-axis, so that the translation movement of the object can be set to regular distances with high accuracy even though the operator is not sufficiently skilful.

Also, because the track ball member 23 and the annular ring 24 utilized for the rotational movement and the secondary ball member 28 utilized for the translation movement are arranged in the apparatus 21, the operator is not required to designate whether a type of movement performed for the object is the translation movement or the rotational movement. Accordingly, the movement of the object can be rapidly performed without any troublesomeness.

Also, because the operation of the track ball member 23 and the annular ring 24 utilized for the rotational movement is independent of that of the secondary ball member 28 utilized for the translation movement, the operator can rotate the track ball member 23 and/or the annular ring 24 while sliding the casing 22. Accordingly, the rotational movement and the translation movement can be simultaneously performed, so that the movement of the object can be efficiently performed.

An operation performed by use of the three-dimensional movement specifying apparatus 21 is described with reference to FIGS. 18F to 18J. In this operation, a plane on which an object Ob1 is placed is displayed by the displaying unit 42 to represent a position (x,y,z) and an orientation $(\alpha,\beta,\gamma)$ of the object Ob1. That is, the orientation $(\alpha,\beta,\gamma)$ of the object Ob1 agrees with an orientation of the plane defined by an orientation of a line perpendicular to the plane, and the position (x,y,z) of the object Ob1 agrees with an original point of a coordinate system relating to the plane in which a direction of a z-axis agrees with the orientation $(\alpha,\beta,\gamma)$ of the object Ob1. The object Ob1 is moved with the plane in rotational movement when the track ball member 23 is ratated, and the object Ob1 is moved with the plane in translation movement when the secondary ball member 28 is rotated. A value x denotes a distance in an X-axis of the coordinate system, a value y denotes a distance in a Y-axis of the coordinate system, a value z denotes a distance in a Z-axis of the coordinate system, a value $\alpha$ denotes a rotational angle about the X-axis of the coordinate system, a value $\beta$ denotes a rotational angle about the Y-axis of the coordinate system, and a value $\gamma$ denotes a rotational angle about the Z-axis of the coordinate system.

Figure 18F:
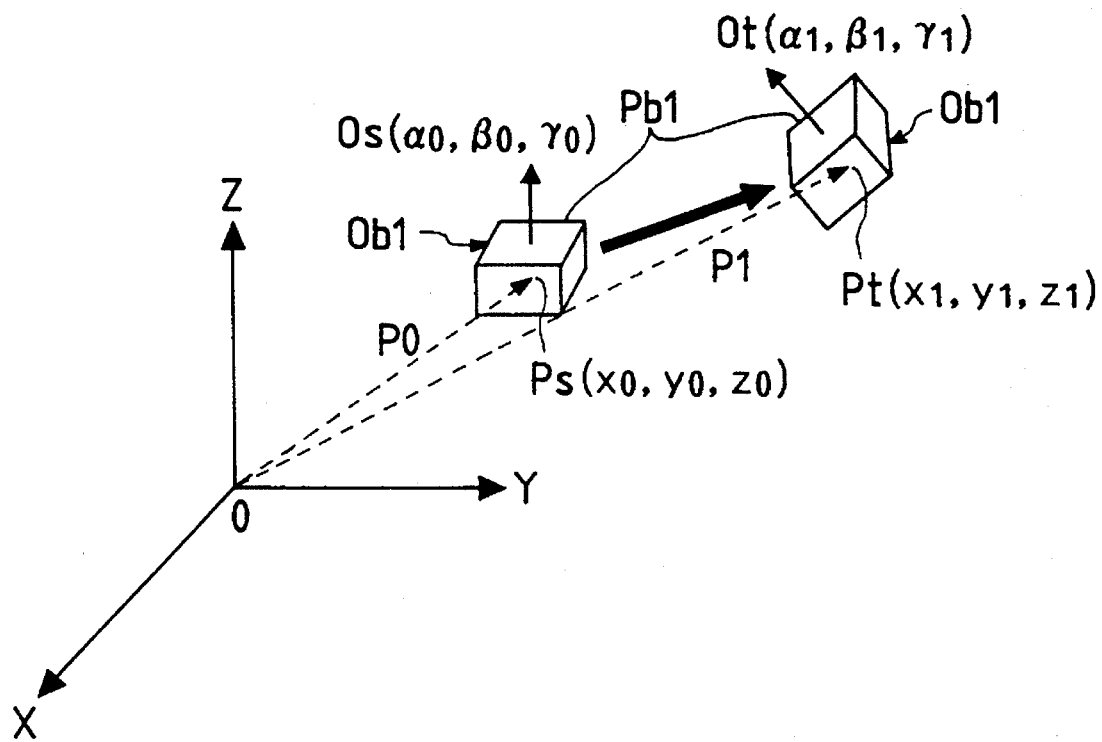
FIGS. 18F to 18J show an operation in which an object Ob1 which is placed at a position P0 designated by a starting position $Ps(x_0,y_0,z_0)$ and a starting orientation $(\alpha_0,\beta_0,\gamma_0)$ is moved to a target position P1 designated by a target position $Pt(x_1,y_1,z_1)$ and a target orientation $(\alpha_1,\beta_1,\gamma_1)$.
Figure 18G:
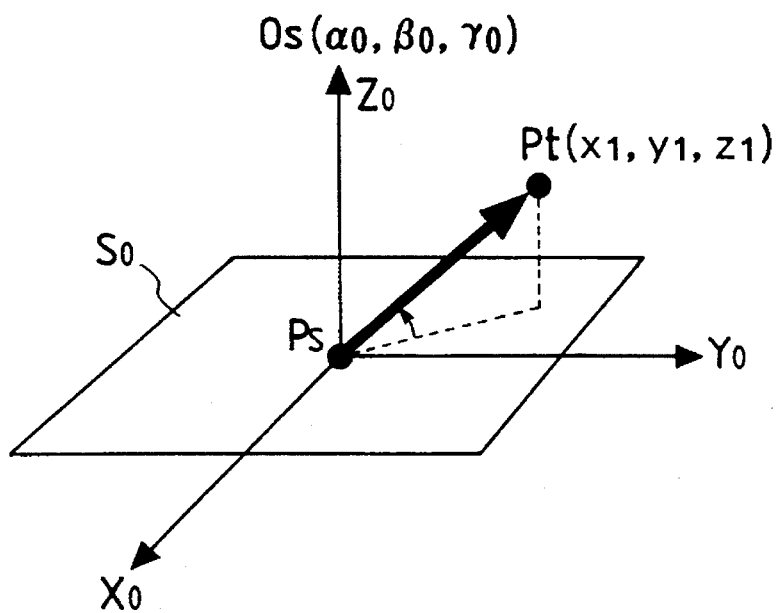

As shown in FIG. 18F, in cases where an operator intends to virtually move an object Ob1, of which a starting position and orientation P0 is designated by a starting position $Ps(x_0,y_0,z_0)$ and a starting orientation $Os(\alpha_0,\beta_0,\gamma_0)$, to a target position and orientation P1 designated by a target position $Pt(x_1,y_1,z_1)$ and a target orientation $Ot(\alpha_1,\beta_1,\gamma_1)$, a starting plane $S_0$ representing the starting position $Ps(x_0,y_0,z_0)$ and the starting orientation $Os(\alpha_0,\beta_0,\gamma_0)$ of the object Ob1 is displayed on the displaying unit 42 under the control of the central processing unit 41 as shown in FIG. 18G. In this case, the starting plane $S_0$ is placed on an $X_0$-$Y_0$ plane of an $X_0$-$Y_0$-$Z_0$ starting coordinate system relating to the starting plane $S_0$, the starting position $Ps(x_0,y_0,z_0)$ of the object Ob1 is placed at an original point of the $X_0$-$Y_0$-$Z_0$ starting coordinate system, and the starting orientation $Os(\alpha_0,\beta_0,\gamma_0)$ of the object Ob1 agrees with the direction of an $Z_0$-axis of the $X_0$-$Y_0$-$Z_0$ starting coordinate system. Therefore, assuming that the secondary ball member 28 is rolled on a desk by the operator, the object Ob1 is moved with the starting plane $S_0$ on the $X_0$-$Y_0$ plane as described with reference to FIG. 15. Also, assuming that the first or second specifying button 31 or 32 is pushed by the operator, the object Ob1 is moved with the starting plane $S_0$ along the $Z_0$-axis as described with reference to FIG. 16.

Figure 18H:
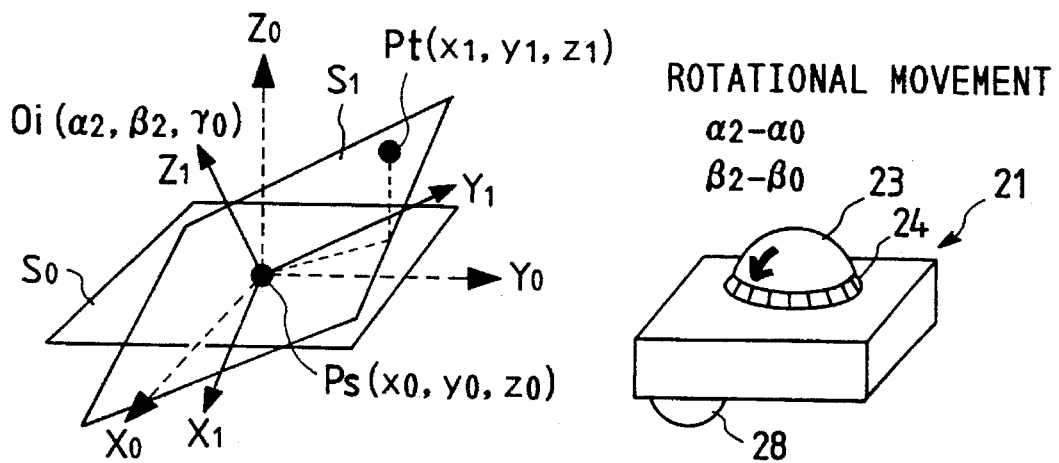

Thereafter, the operator initially rotates the track ball member 23 by an angle of $\alpha_2-\alpha_0$ about the $X_0$-axis and an angle of $\beta_2-\beta_0$ about the $Y_0$-axis to place the target position Pt on an inclined plane $S_1$ obtained by inclining the starting plane $S_0$ according to the rotation of the track ball member 23 while visually observing the starting plane $S_0$ and the target position Pt displayed by the displaying unit 42. Therefore, as shown in FIG. 18H, the starting orientation $Os(\alpha_0,\beta_0,\gamma_0)$ of the object Ob1 is changed to an intermediate orientation $Oi(\alpha_2,\beta_2,\gamma_0)$. The starting position $Ps(x_0,y_0,z_0)$ and the intermediate orientation $Oi(\alpha_2,\beta_2,\gamma_0)$ of the object is represented by the inclined plane $S_1$. In this case, the incline plane $S_1$ is placed on an $X_1$-$Y_1$ plane of an $X_1$-$Y_1$-$Z_1$ intermediate coordinate system in which a direction of a $Z_1$-axis agrees with the intermediate orientation $Oi(\alpha_2,\beta_2,\gamma_0)$ and the starting position $Ps(x_0,y_0,z_0)$ is placed at an original point.

Assuming that the secondary ball member 28 is rolled on a desk by the operator, the incline plane $S_1$ is moved with the object Ob1 on the $X_1$-$Y_1$ plane of the $X_1$-$Y_1$-$Z_1$ intermediate coordinate system as described with reference to FIG. 15. Therefore, the object Ob1 can be moved in the $Z_0$-axis direction without pushing the first or second specifying button 31 or 32. Also, assuming that the first or second specifying button 31 or 32 is pushed by the operator, the incline plane $S_1$ is moved with the object Ob1 along the $Z_1$-axis of the $X_1$-$Y_1$-$Z_1$ intermediate coordinate system as described with reference to FIG. 16.

Figure 18I:
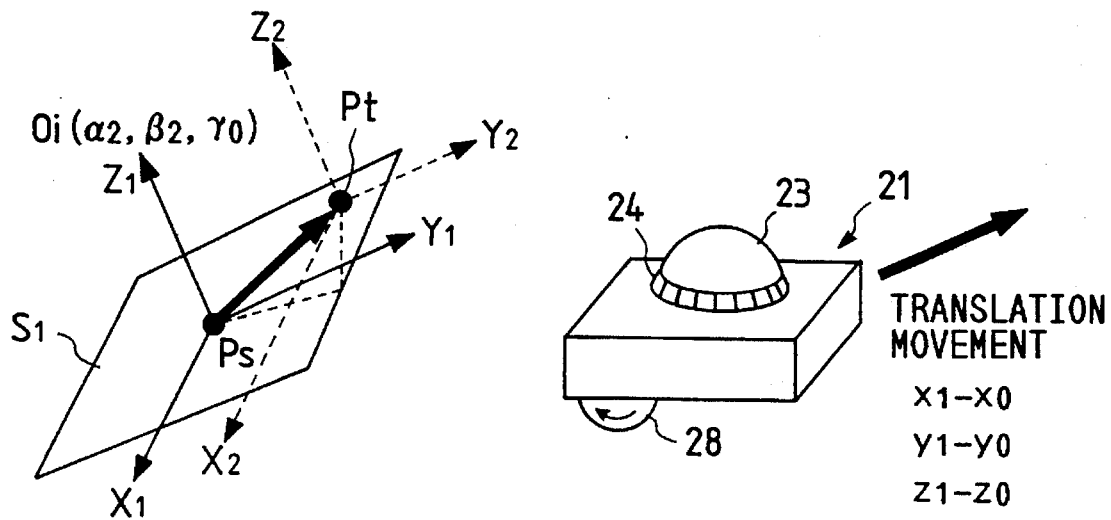

Thereafter, as shown in FIG. 18I, the operator rolls the secondary ball member 28 straight on a desk to move the incline plane $S_1$ on the $X_1$-$Y_1$ plane in translation movement for the purpose of moving the object OB1 from the starting position $Ps(x_0,y_0,z_0)$ to the target position $Pt(x_1,y_1,z_1)$ at one time as a logical necessity. In other words, the operator rolls the secondary ball member 28 straight to move the inclined plane $S_1$ by a distance $x_1-x_0$ along the $X_0$-axis of the starting coordinate system, a distance $y_1-y_0$ along the $Y_0$-axis of the starting coordinate system and a distance $z_1-z_0$ along the $Z_0$-axis of the starting coordinate system at one time without pushing either the first or second specifying buttons 31 or 32. In this case, an $X_2$-$Y_2$-$Z_2$ second intermediate coordinate system is defined to place the target position $Pt(x_1,y_1,z_1)$ of the object Ob1 at an original point of the $X_2$-$Y_2$-$Z_2$ second intermediate coordinate system and to direct the intermediate orientation $Oi(\alpha_2,\beta_2,\gamma_0)$ of the object Ob1 in a $Z_2$-axis of the $X_2$-$Y_2$-$Z_2$ second intermediate coordinate system.

Accordingly, the operator can easily roll the secondary ball member 28 straight on a desk by the distance $x_1-x_0$ along the $X_0$-axis, the distance $y_1-y_0$ along the $Y_0$-axis and a distance $z_1-z_0$ along the $Z_0$-axis to move the object Ob1 from the starting position $Ps(x_0,y_0,z_0)$ to the target position $Pt(x_1,y_1,z_1)$ without pushing the first or second specifying buttons 31 or 32.

Figure 18J:
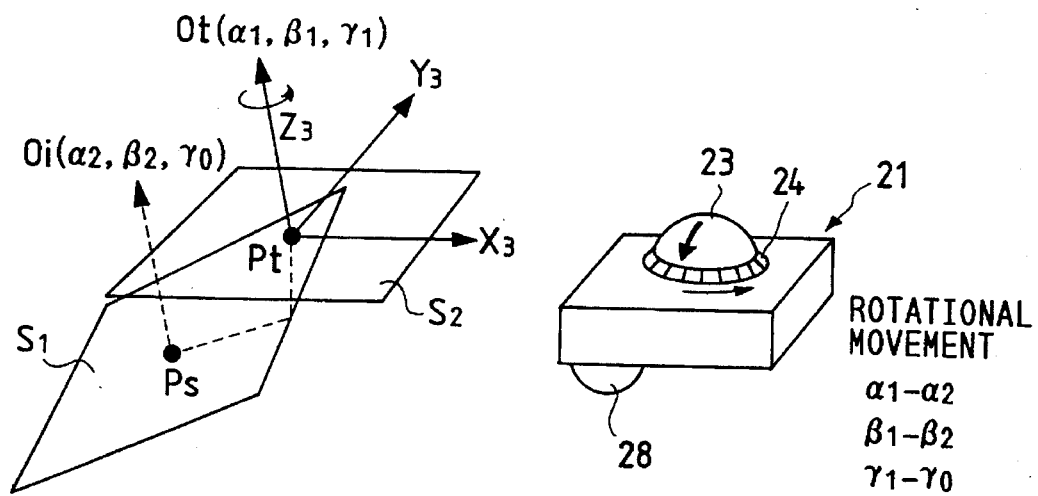

Thereafter, as shown in FIG. 18J, the operator rotates the track ball member 23 and the annular ring 24 by an angle of $\alpha_1-\alpha_2$ about the $X_2$-axis, an angle of $\beta_1-\beta_2$ about the $Y_2$-axis and an angle of $\gamma_1-\gamma_0$ about the $Z_2$-axis of the $X_2$-$Y_2$-$Z_2$ second intermediate coordinate system to obtain a target plane $S_2$ which is oriented in the target orientation $Ot(\alpha_1,\beta_1,\gamma_1)$. As a result, the object Ob1, which is placed at the starting position and orientation PO designated by the starting position $Ps(x_0,y_0,z_0)$ and the starting orientation $Os(\alpha_0,\beta_0,\gamma_0)$ is moved to the target position and orientation P1 designated by the target position $Pt(x_1,y_1,z_1)$ and the target orientation $Ot(\alpha_1,\beta_1,\gamma_1)$ under the control of the central processing unit 41.

Accordingly, the operator can operate the three-dimensional movement specifying apparatus 21 by simple hand movements to virtually move the object Ob1 in three dimensions without pushing the first or second specifying button 31 or 32.

In general, for example as shown in Clark (U.S. Pat. No. 5,095,303), in cases where an object designated by a starting position $(x_0,y_0,z_0)$ is moved to a target position $(x_1,y_1,z_1)$, three operations are separately required to change three variables x,y and z. Also, in cases where an object designated by a starting orientation $(\alpha_0,\beta_0,\gamma_0)$ is moved to a target orientation $(\alpha_1,\beta_1,\gamma_1)$, three operations are separately required to change three variables $\alpha,\beta$ and $\gamma$. Therefore, in cases where an object designated by a starting position and orientation $(x_0,y_0,z_0, \alpha_0,\beta_0,\gamma_0)$ is moved to a target position and orientation $(x_1,y_1,z_1,\alpha_1,\beta_1,\gamma_1)$, six operations are separately required to change six variables $x,y,z,\alpha,\beta$ and $\gamma$.

However, in the present invention, because the intermediate plane $S_1$ on which a starting position and orientation $(x_0,y_0,z_0,\alpha_0,\beta_0,\gamma_0)$ of the object Ob1 and a target position and orientation $(x_1,y_1,z_1,\alpha_1,\beta_1,\gamma_1)$ of the object Ob1 are placed is displayed by the displaying unit 42 under the control of the central processing unit 41, a starting position $(x_0,y_0,z_0)$ of the object Ob1 can be easily moved to a target position $(x_1,y_1,z_1)$ by merely performing a combined movement of a translation movement along an X-axis and another translation movement along a Y-axis. Therefore, three position variables x,y and z can be changed by changing two position variables. Also, because an operator rolls the secondary ball member 28 straight on a desk at one time to change three position variables x,y and z, three position variables x,y and z can be changed by substantially performing a single movement.

Also, in the present invention, because the orientation of the object Ob1 is set to a target orientation $(\alpha_1,\beta_1,\gamma_0)$ after the object Ob1 is placed at the target position $(x_1,y_1,z_1)$, a starting orientation $(\alpha_0,\beta_0,\gamma_0)$ of the object Ob1 can be easily changed to the target orientation $(\alpha_1,\beta_1,\gamma_0)$. Also, because two orientation variables $\alpha$ and $\beta$ are changed at one time by rotating the track ball member 23, two orientation variables $\alpha$ and $\beta$ can be changed by substantially performing a single movement.

In conclusion, in the present invention, six variables $x,y,z,\alpha,\beta$ and $\gamma$ can be changed by changing five variables and by substantially performing three movements shown in FIGS. 18H, 18I and 18J.

An operational example performed by use of the three-dimensional movement specifying apparatus 21 is described with reference to FIG. 18K.

Figure 18K:
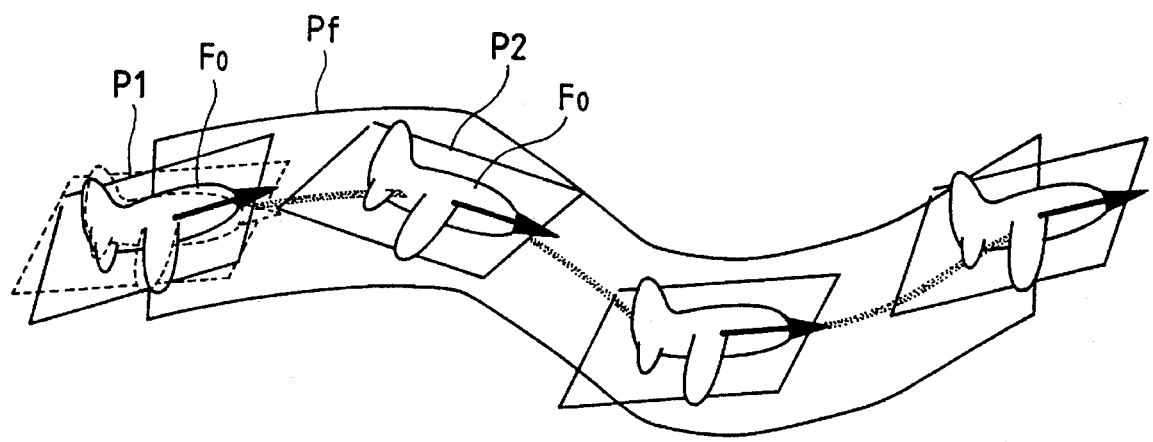
FIG. 18K shows a flying object of which movement is specified according to the operation shown in FIGS. 18F to 18J.

As shown in FIG. 18K, a flying object Fo passes along a twisted flying path Pf in a three-dimensional space, a position and orientation of the flying object Fo is gradually changed. In this case, assuming that position variables x,y and z and orientation variables $\alpha,\beta$ and $\gamma$ are separately determined, the operation for passing the flying object Fo along the twisted flying path Pf becomes troublesome. In contrast, in the present invention, the flying object Fo can be easily moved from a first position and orientation represented by a first plane P1 to a second position and orientation represented by a second plane P2 by performing three types of operations shown in FIGS. 18H to 18J. Therefore, the operation for passing the flying object Fo along the twisted flying path Pf can be easily performed.

Next, various modifications of the three-dimensional movement specifying apparatus 21 according to the first embodiment are described with reference to FIGS. 19 to 30.

Figure 19:
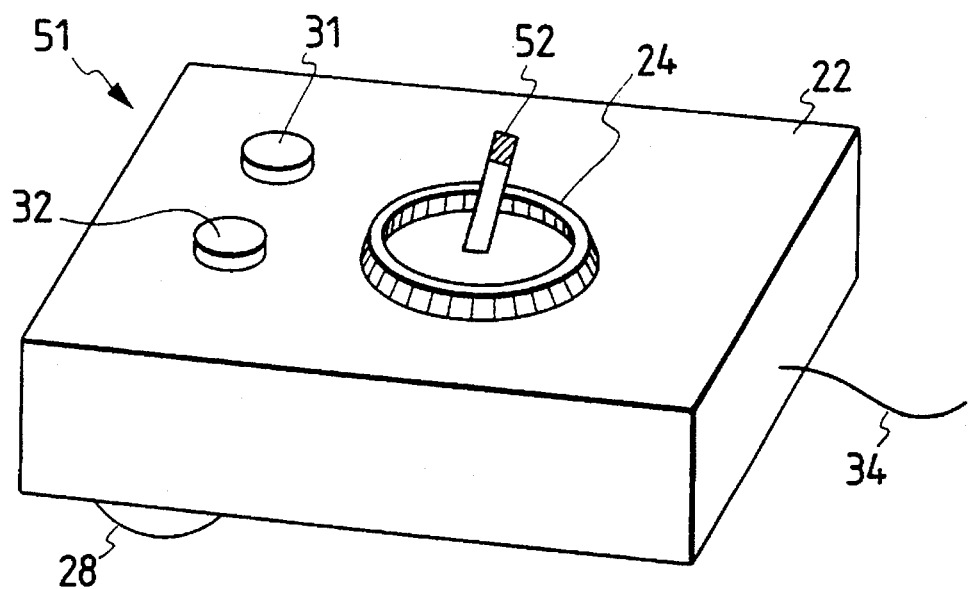
FIG. 19 is a diagonal view of a three-dimensional movement specifying apparatus according to a first modification of the first embodiment.

FIG. 19 is a diagonal view of a three-dimensional movement specifying apparatus according to a first modification of the first embodiment.

As shown in FIG. 19, a three-dimensional movement specifying apparatus 51 is manufactured by arranging a joy stick 52 in place of the track ball member 23 arranged in the apparatus 21. When the operator tilts the joy stick 52 along the X-axis, a picture or an object displayed in the displaying unit 42 is rotated about the Y-axis. Also, when the operator tilts the joy stick 52 along the Y-axis, the picture or the object is rotated about the X-axis.

Figure 20:
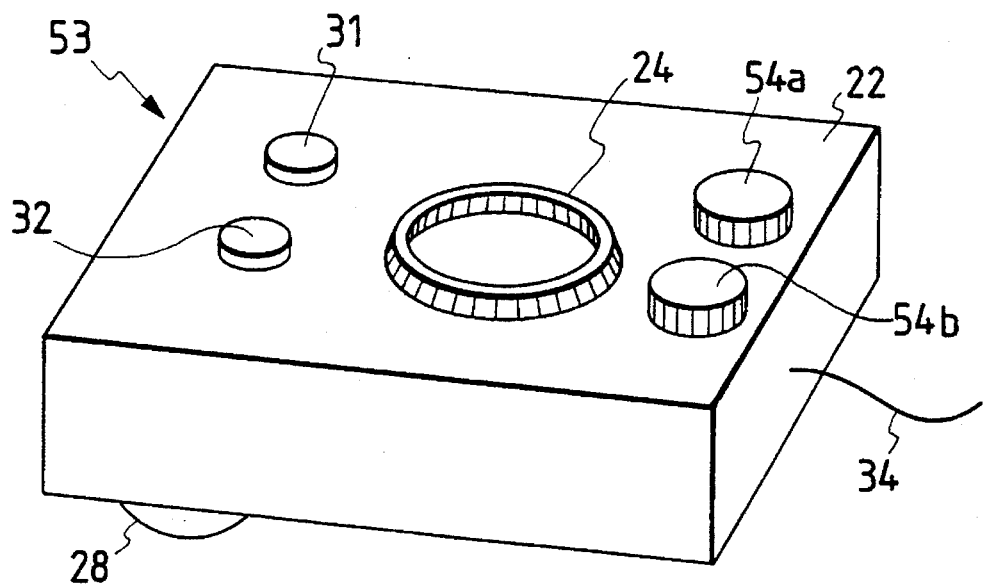
FIG. 20 is a diagonal view of a three-dimensional movement specifying apparatus according to a second modification of the first embodiment.

FIG. 20 is a diagonal view of a three-dimensional movement specifying apparatus according to a second modification of the first embodiment.

As shown in FIG. 20, a three-dimensional movement specifying apparatus 53 is manufactured by arranging a pair of dials 54a, 54b in place of the track ball member 23 arranged in the apparatus 21. When the operator rotates the dial 54a, a picture or an object displayed in the displaying unit 42 is rotated about the X-axis. Also, when the operator rotates the dial 54b, the picture or the object is rotated about the Y-axis.

Figure 21:
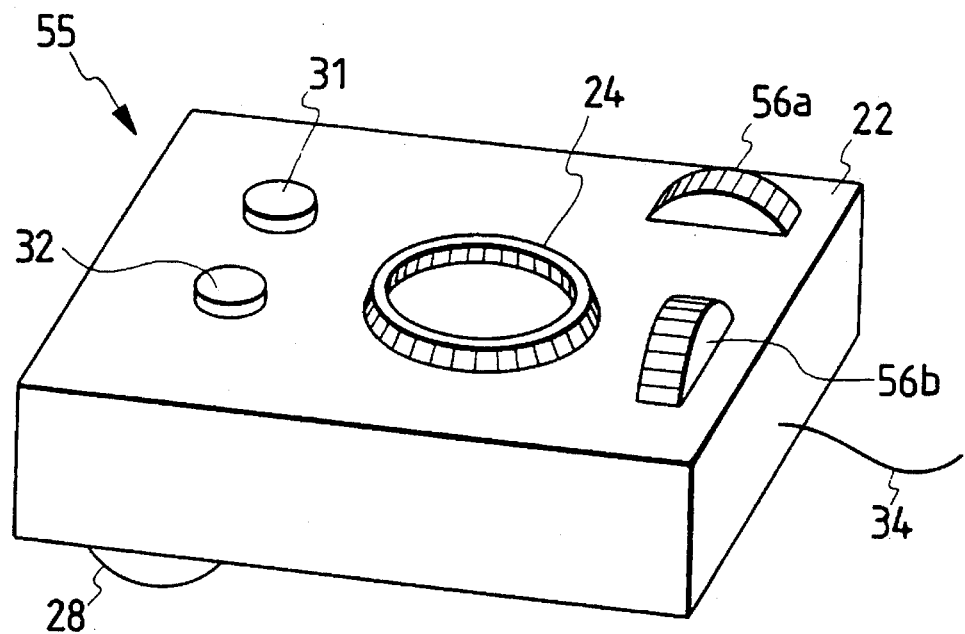
FIG. 21 is a diagonal view of a three-dimensional movement specifying apparatus according to a third modification of the first embodiment.

FIG. 21 is a diagonal view of a three-dimensional movement specifying apparatus according to a third modification of the first embodiment.

As shown in FIG. 21, a three-dimensional movement specifying apparatus 55 is manufactured by arranging a pair of sliders 56a, 56b in place of the track ball member 23 arranged in the apparatus 21. When the operator slides the slider 56a, a picture or an object displayed in the displaying unit 42 is rotated about the X-axis. Also, when the operator slides the slider 56b, the picture or the object is rotated about the Y-axis.

Figure 22:
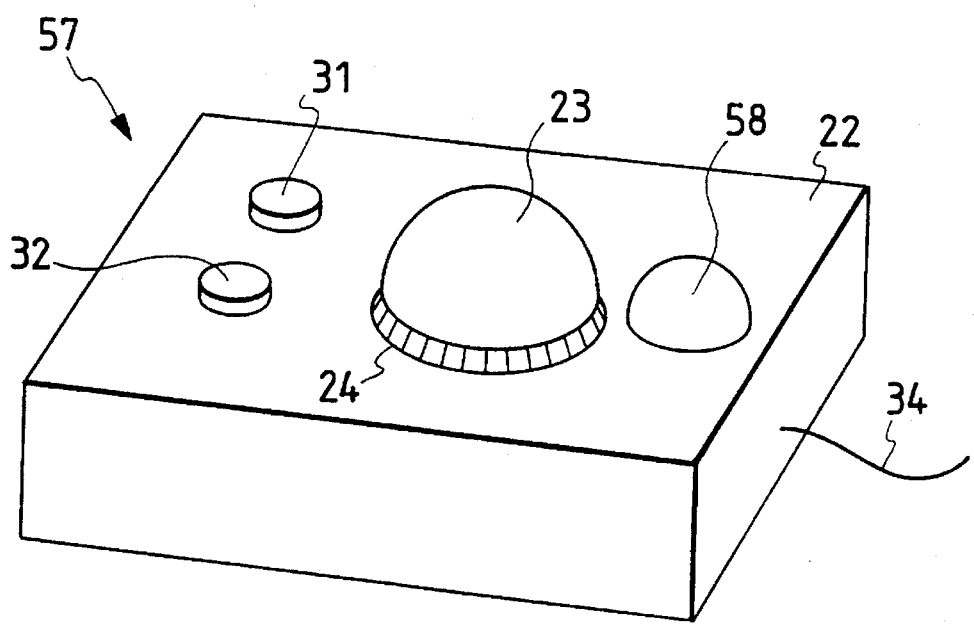
FIG. 22 is a diagonal view of a three-dimensional movement specifying apparatus according to a fourth modification of the first embodiment.

FIG. 22 is a diagonal view of a three-dimensional movement specifying apparatus according to a fourth modification of the first embodiment.

As shown in FIG. 22, a three-dimensional movement specifying apparatus 57 is manufactured by arranging a track ball 58 in place of the secondary ball member 28 arranged in the apparatus 21. When the operator rotates the track ball 58 about the X-axis, a picture or an object displayed in the displaying unit 42 is moved along the Y-axis. Also, when the operator rotates the track ball 58 about the Y-axis, the picture or the object is moved along the X-axis.

Figure 23:
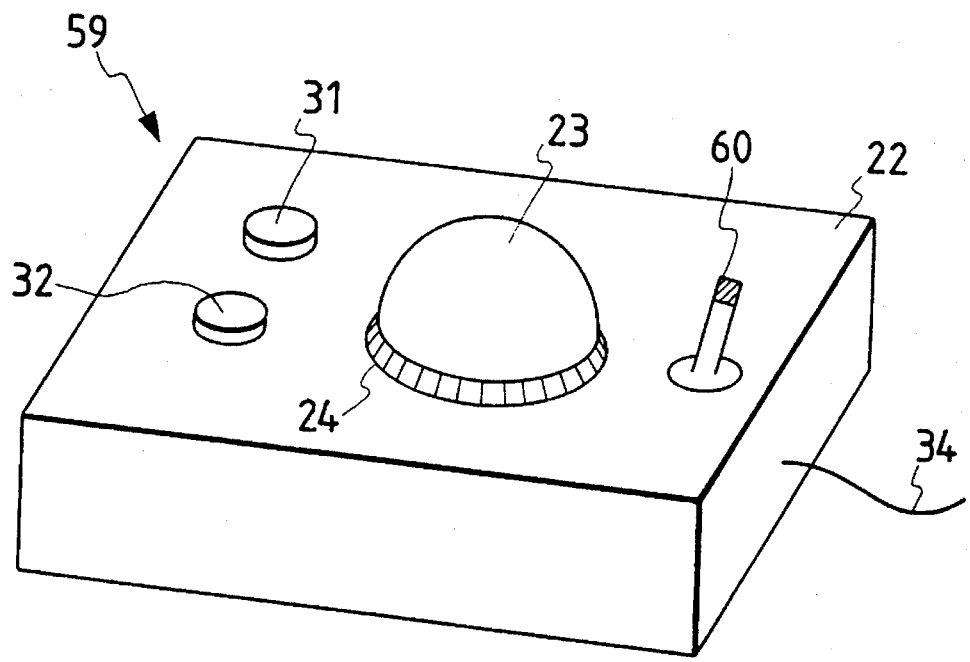
FIG. 23 is a diagonal view of a three-dimensional movement specifying apparatus according to a fifth modification of the first embodiment.

FIG. 23 is a diagonal view of a three-dimensional movement specifying apparatus according to a fifth modification of the first embodiment.

As shown in FIG. 23, a three-dimensional movement specifying apparatus 59 is manufactured by arranging a joy stick 60 in place of the secondary ball member 28 arranged in the apparatus 21. When the operator tilts the joy stick 60 along the X-axis, a picture or an object displayed in the displaying unit 42 is moved along the X-axis. Also, when the operator tilts the joy stick 60 along the Y-axis, the picture or the object is moved along the Y-axis.

Figure 24:
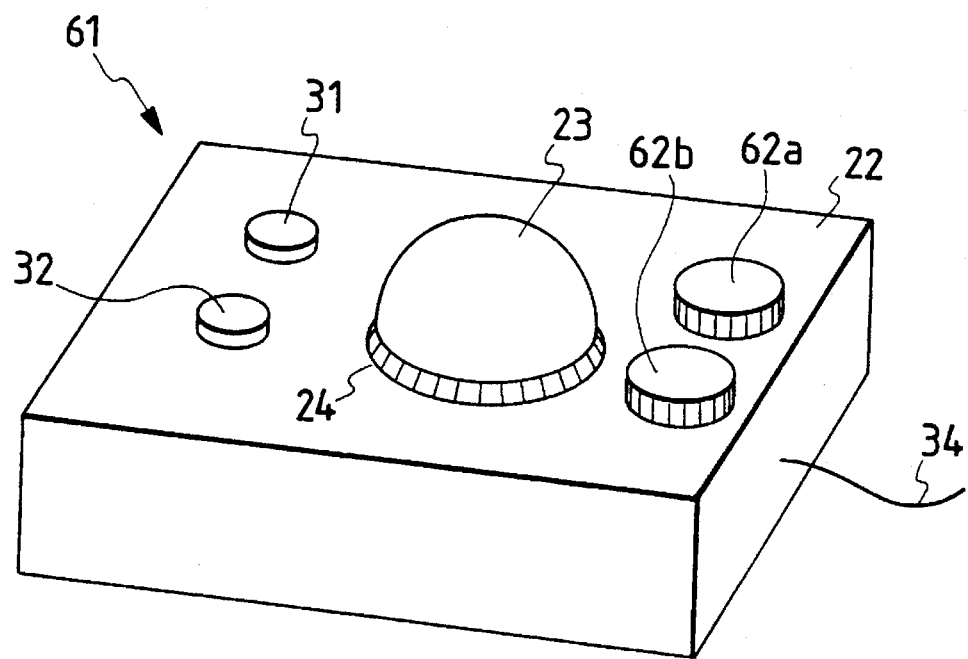
FIG. 24 is a diagonal view of a three-dimensional movement specifying apparatus according to a sixth modification of the first embodiment.

FIG. 24 is a diagonal view of a three-dimensional movement specifying apparatus according to a sixth modification of the first embodiment.

As shown in FIG. 24, a three-dimensional movement specifying apparatus 61 is manufactured by arranging a pair of dials 62a, 62b in place of the secondary ball member 28 arranged in the apparatus 21. When the operator rotates the dial 62a, a picture or an object displayed in the displaying unit 42 is moved along the X-axis. Also, when the operator rotates the dial 62b, the picture or the object is moved along the Y-axis.

Figure 25:
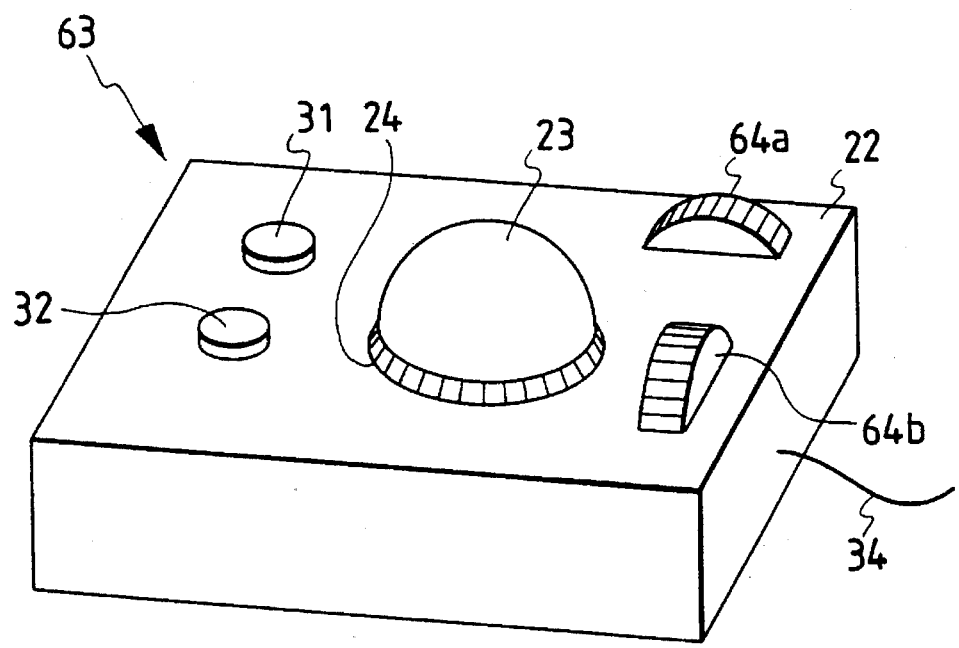
FIG. 25 is a diagonal view of a three-dimensional movement specifying apparatus according to a seventh modification of the first embodiment.

FIG. 25 is a diagonal view of a three-dimensional movement specifying apparatus according to a seventh modification of the first embodiment.

As shown in FIG. 25, a three-dimensional movement specifying apparatus 63 is manufactured by arranging a pair of sliders 64a, 64b in place of the secondary ball member 28 arranged in the apparatus 21. When the operator slides the slider 64a, a picture or an object displayed in the displaying unit 42 is moved along the Y-axis. Also, when the operator slides the slider 64b, the picture or the object is moved along the X-axis.

Also, it is applicable that a three-dimensional movement specifying apparatus be manufactured by arranging a mouse in place of the secondary ball member 28 arranged in the apparatus 21.

Figure 26:
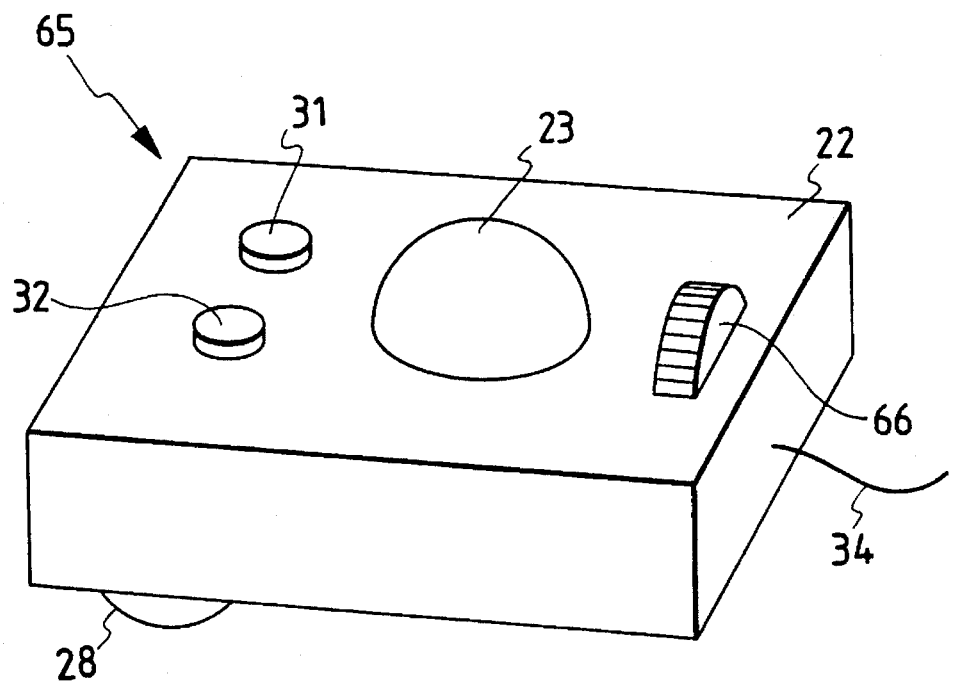
FIG. 26 is a diagonal view of a three-dimensional movement specifying apparatus according to an eighth modification of the first embodiment.

FIG. 26 is a diagonal view of a three-dimensional movement specifying apparatus according to an eighth modification of the first embodiment.

As shown in FIG. 26, a three-dimensional movement specifying apparatus 65 is manufactured by arranging a slider 66 in place of the annular ring 24 arranged in the apparatus 21. When the operator slides the slider 66 in one direction, a picture or an object displayed in the displaying unit 42 is clockwisely rotated about the Z-axis. Also, when the operator slides the slider 66 in the opposite direction, the picture or the object is counterclockwisely rotated about the Z-axis.

Figure 27:
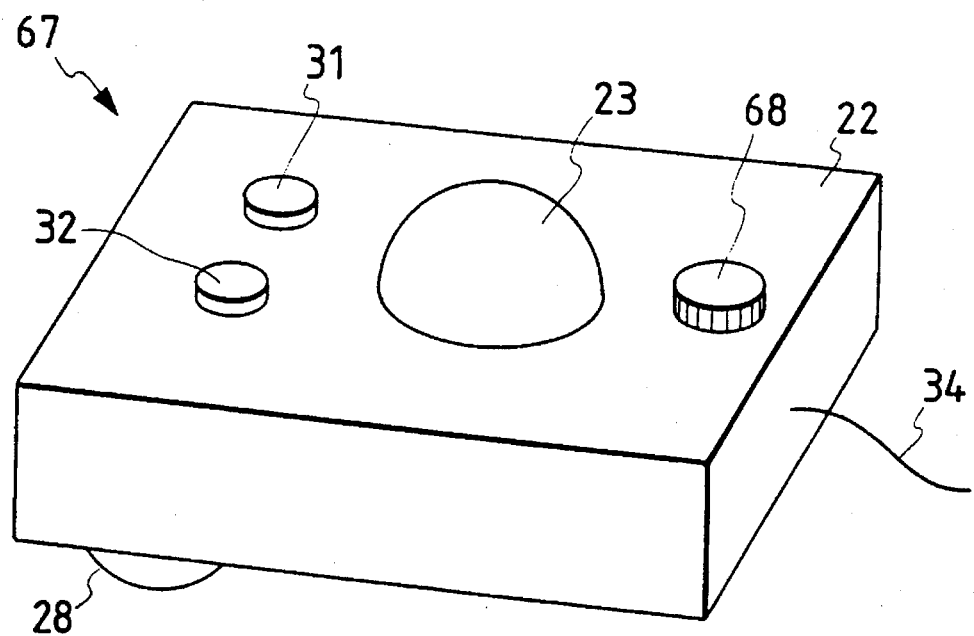
FIG. 27 is a diagonal view of a three-dimensional movement specifying apparatus according to a ninth modification of the first embodiment.

FIG. 27 is a diagonal view of a three-dimensional movement specifying apparatus according to a ninth modification of the first embodiment.

As shown in FIG. 27, a three-dimensional movement specifying apparatus 67 is manufactured by arranging a dial 66 in place of the annular ring 24 arranged in the apparatus 21. When the operator rotates the dial 66 in one direction, a picture or an object displayed in the displaying unit 42 is clockwisely rotated about the Z-axis. Also, when the operator rotates the dial 66 in the opposite direction, the picture or the object is counterclockwisely rotated about the Z-axis.

Figure 28:
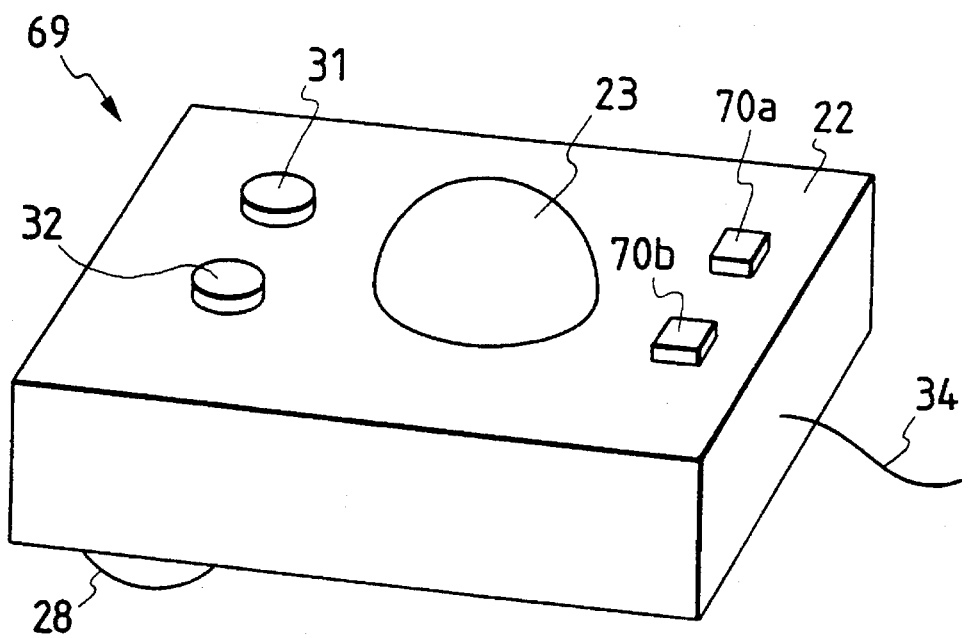
FIG. 28 is a diagonal view of a three-dimensional movement specifying apparatus according to a tenth modification of the first embodiment.

FIG. 28 is a diagonal view of a three-dimensional movement specifying apparatus according to a tenth modification of the first embodiment.

As shown in FIG. 28, a three-dimensional movement specifying apparatus 69 is manufactured by arranging a pair of buttons 70a, 70b in place of the annular ring 24 arranged in the apparatus 21. When the operator pushes the button 70a, a picture or an object displayed in the displaying unit 42 is clockwisely rotated about the Z-axis. Also, when the operator pushes the button 70b, the picture or the object is counterclockwise rotated about the Z-axis.

Figure 29:
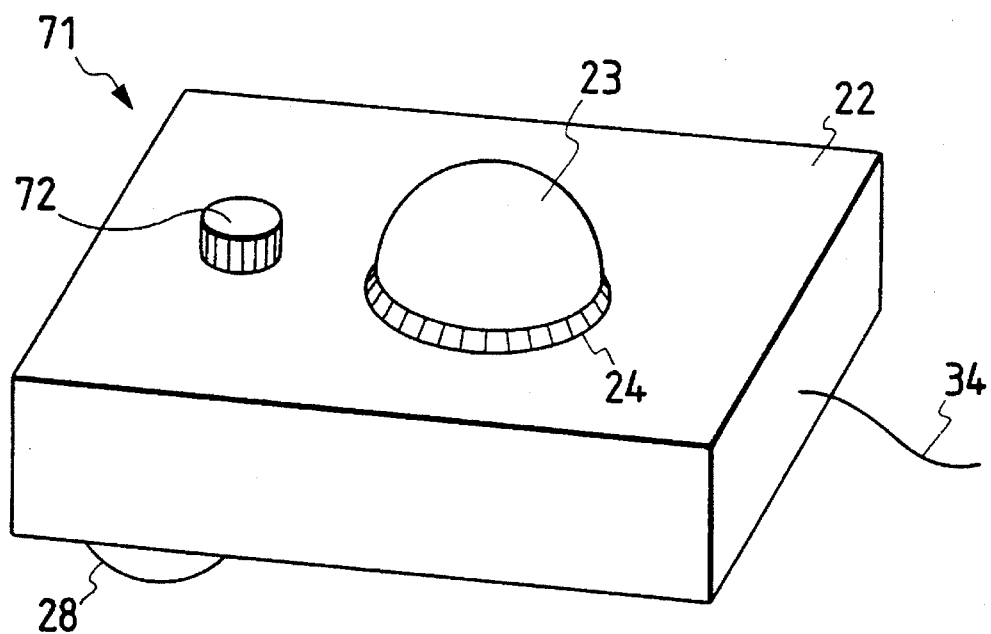
FIG. 29 is a diagonal view of a three-dimensional movement specifying apparatus according to an eleventh modification of the first embodiment.

FIG. 29 is a diagonal view of a three-dimensional movement specifying apparatus according to an eleventh modification of the first embodiment.

As shown in FIG. 29, a three-dimensional movement specifying apparatus 71 is manufactured by arranging a dial 72 in place of the buttons 31, 32 arranged in the apparatus 21. When the operator rotates the dial 72 in one direction, a picture or an object displayed in the displaying unit 42 is moved in the +Z-axis direction. Also, when the operator rotates the dial 72 in the opposite direction, the picture or the object is moved in the −Z-axis direction.

Figure 30:
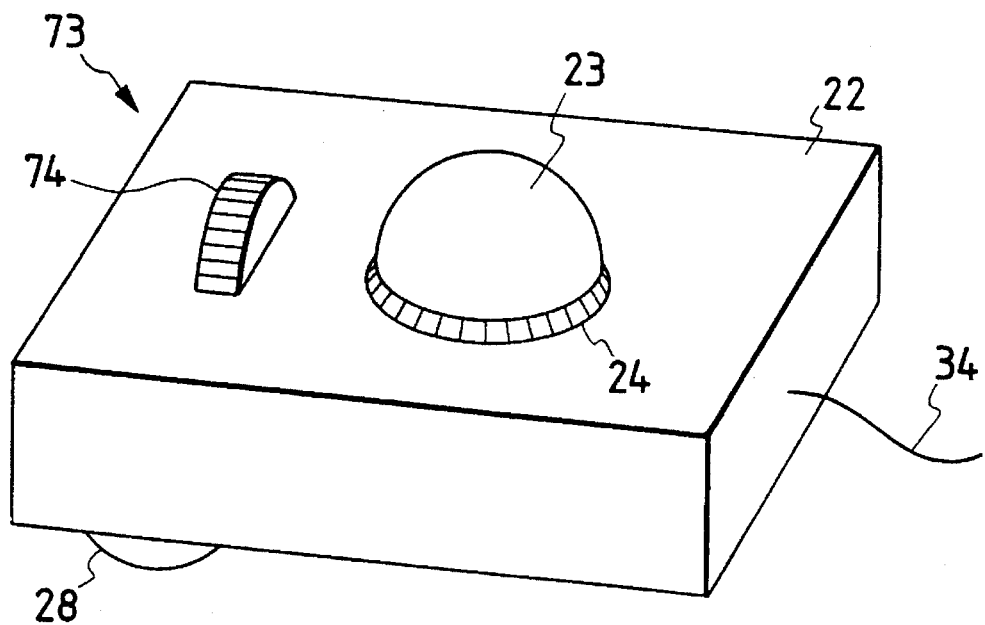
FIG. 30 is a diagonal view of a three-dimensional movement specifying apparatus according to a twelfth modification of the first embodiment.

FIG. 30 is a diagonal view of a three-dimensional movement specifying apparatus according to a twelfth modification of the first embodiment.

As shown in FIG. 30, a three-dimensional movement specifying apparatus 73 is manufactured by arranging a slider 74 in place of the buttons 31, 32 arranged in the apparatus 21. When the operator slides the slider 74 in one direction, a picture or an object displayed in the displaying unit 42 is moved in the +Z-axis direction. Also, when the operator slides the slider 74 in the opposite direction, the picture or the object is moved in the −Z-axis direction.

(Second embodiment)

Next, an observational position and orientation changing apparatus according to a second embodiment of the present invention is described.

Movement of an observational eye is initially described on condition that a relative position and orientation between an object and the observational eye is fixed.

Figure 31A:
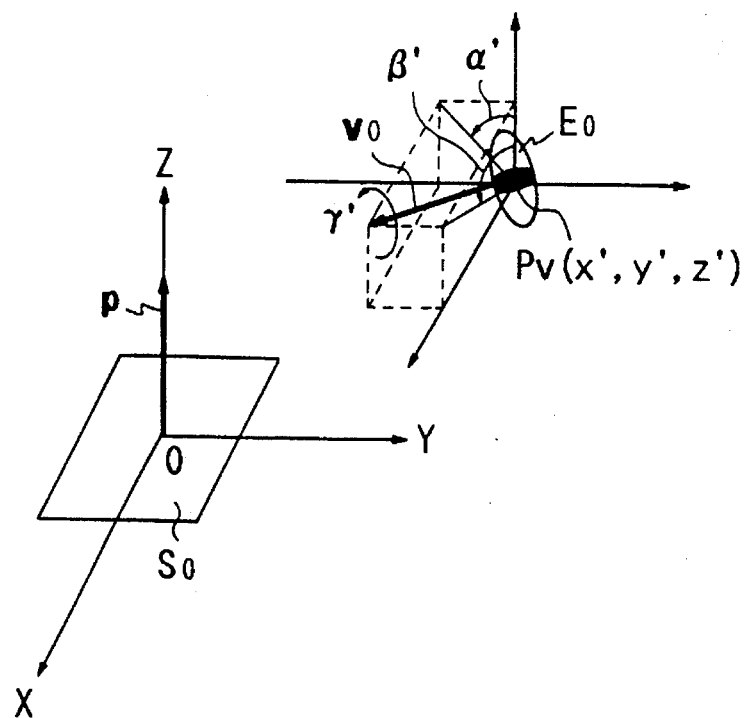
FIG. 31A shows a relative position and orientation between an object and an observational eye in a three-dimensional space before the movement of the object.
Figure 31B:
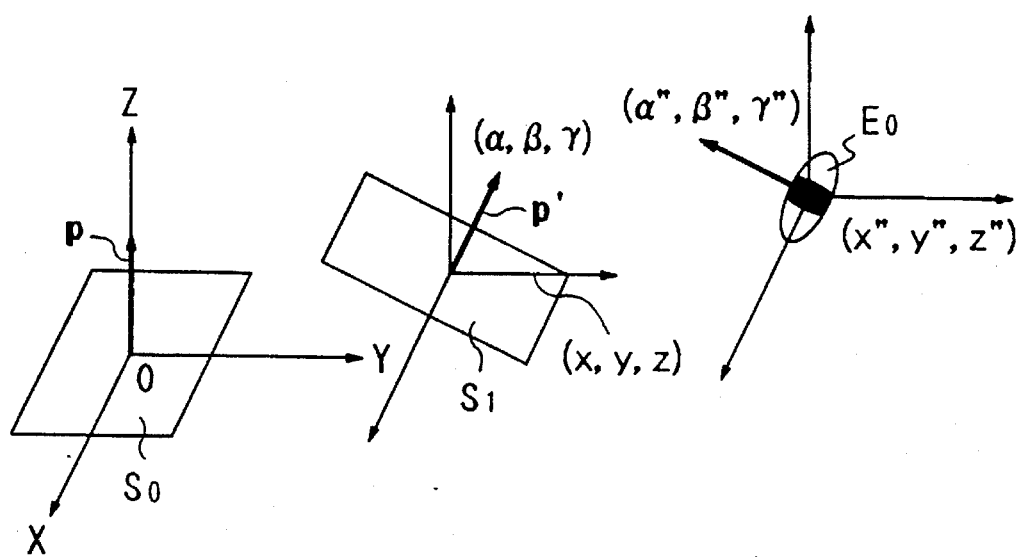
FIG. 31B shows an absolute position and orientation of the observational eye shown in FIG. 31A after the movement of the object shown in FIG. 31A.

FIG. 31A shows a relative position and orientation between an object and an observational eye in a three-dimensional space before the movement of the object. FIG. 31B shows an absolute position and orientation of the observational eye shown in FIG. 31A after the movement of the object shown in FIG. 31A.

As shown in FIG. 31A, the orientation of a plane $S_0$ representing an object (or a picture) is designated by a normal line of the plane $S_0$ in a three-dimensional orthogonal coordinate system O-XYZ, and the plane $S_0$ is oriented in a +Z-axis direction before the plane $S_0$ is moved. The orientation of the plane $S_0$ is indicated by a directional vector p. Also, the position of the plane $S_0$ is represented by a reference point positioned at an original point 0(0, 0, 0).

A position and an orientation of an observational eye $E_0$ are predetermined to fix an relationship between the plane $S_0$ and the observational eye $E_0$. In detail, the observational eye $E_0$ is positioned at a visual point Pv (x',y',z'), and the orientation of the observational eye $E_0$ is indicated by an observational vector $v_0$ of which a starting point is positioned at the visual point Pv. The observational vector $v_0$ is obtained by rotating the directional vector p by an angle $\gamma'$ about the Z-axis, rotating the directional vector p by an angle $\beta'$ about the Y-axis, and rotating the directional vector p by an angle $\alpha'$ about the X-axis.

In the above fixed relationship between the plane $S_0$ and the observational eye $E_0$, the position and orientation of the observational eye $E_0$ is formulated by an equation (17).

$$Eye = Tx'*Ty'*Tz'*T\alpha'*T\beta'*T\gamma'*p \qquad (17)$$

Where the symbol Eye denotes the position and orientation of the observational eye $E_0$.

In cases where the plane $S_0$ is rotated by an angle $\gamma$ about the Z-axis, is rotated by an angle $\beta$ about the Y-axis, is rotated by an angle $\alpha$ about the X-axis, is moved along the Z-axis by a distance z, is moved along the Y-axis by a distance y, and is moved along the X-axis by a distance x, the plane $S_0$ is moved to a new reference point (x, y, z) to form a new plane $S_1$ as shown in FIG. 31B. Also, the directional vector p is changed to a moved directional vector p' having a starting point at a new reference point (x, y, z). In this case, the position and orientation of the moved directional vector p' denoting those of the new plane $S_1$ is formulated by an equation (18).

$$p' = Tx*Ty*Tz*T\alpha*T\beta*T\gamma*p \qquad (18)$$

Because the relationship between the plane $S_0$ and the observational eye $E_0$ is fixed, the position and orientation of the observational eye $E_0$ is also moved. The position and orientation of the observational eye $E_0$ moved is formulated by an equation (19).

$$Eye' = Tx*Ty*Tz*T\alpha*T\beta*T\gamma*Tx'*Ty'*Tz'*T\alpha'*T\beta'*T\gamma'*p \qquad (19)$$

Where the symbol Eye' denotes the position and orientation of the observational eye $E_0$ moved.

The position of the observational eye $E_0$ moved is indicated by coordinates (x", y", z"), and the orientation of the observational eye $E_0$ moved is indicated by observational angles ($\alpha$", $\beta$", $\gamma$"). Where relational equations x"=x+x', y"=y+y', z"=z+z', $\alpha$"=$\alpha$+$\alpha$', $\beta$"=$\beta$+$\beta$', and $\gamma$"=$\gamma$+$\gamma$' are satisfied. Therefore, the equation (19) can be rewritten by an equation (20).

$$Eye' = Tx''*Ty''*Tz''*T\alpha''*T\beta''*T\gamma''*p \qquad (20)$$

Where Tx"=Tx+Tx', Ty"=Ty+Ty', Tz"=Tz+Tz', Tz"=Tz+Tz', T$\alpha$"=T$\alpha$+T$\alpha$', T$\beta$"=T$\beta$+T$\beta$' and T$\gamma$"=T$\gamma$+T$\gamma$' are satisfied.

Figure 32:
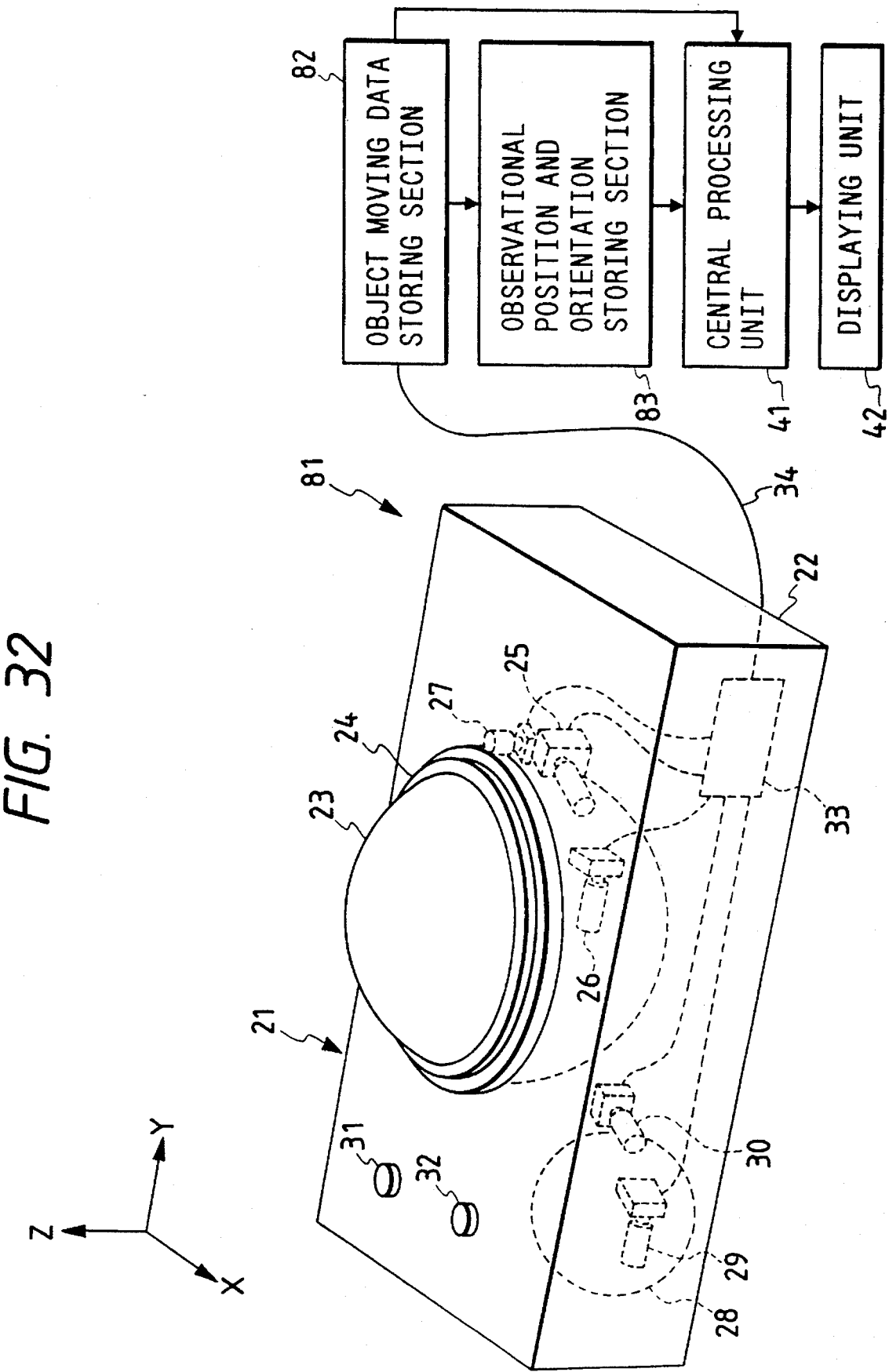
FIG. 32 is a constitutional view of an observational position and orientation changing apparatus according to a second embodiment of the present invention.

FIG. 32 is a constitutional view of an observational position and orientation changing apparatus according to a second embodiment of the present invention.

As shown in FIG. 32, an observational position and orientation changing apparatus 81 comprises the apparatus 21 formed of the casing 22, the track ball member 23, the annular ring 24, the first rotary sensor 25, the second rotary sensor 26, the third rotary sensor 27, the secondary ball member 28, the fourth rotary sensor 29, the fifth rotary sensor 30, the first specifying button 31, the second specifying button 32, and the control unit 33, the data transferring code 34, an object moving data storing section 82 for storing pieces of moving data consisting of the rotational angles $\alpha$, $\beta$, $\gamma$ and the moving distance x, y, z obtained in the control unit 33, and an observational position and orientation storing section 83 for storing a relationship between the object and an observational eye and storing position and orientation of the observational eye moved with the object which is moved according to the moving data.

Figure 33:
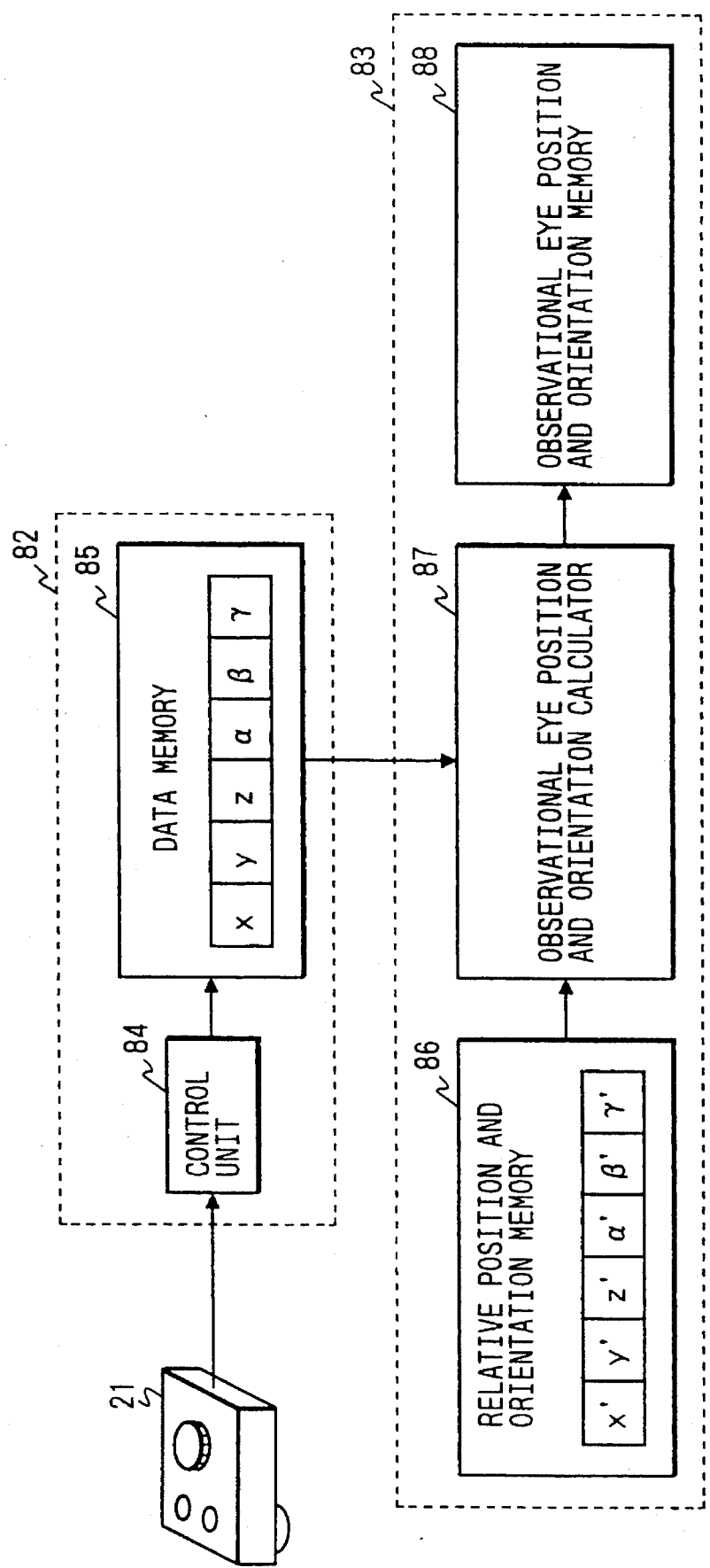
FIG. 33 is a block diagram of storing sections shown in FIG. 32.

FIG. 33 is a block diagram of the storing sections 82, 83 shown in FIG. 32.

As shown in FIG. 33, the storing section 82 comprises control unit 84 for distinguishing the rotational angles $\alpha$, $\beta$, $\gamma$ and the moving distance x, y, z transferred from the control unit 33, and a data memory 85 for storing the rotational angles $\alpha$, $\beta$, $\gamma$ and the moving distance x, y, z distinguished. The storing section 83 comprises a relative position and orientation memory 86 for storing a relative position and orientation between the object and the observational eye, an observational eye position and orientation calculator 87 for calculating moved position and orientation of the observational eye moved with the object, and an observational eye position and orientation memory 88 for storing the moved position and orientation of the observational eye calculated in the calculator 87.

In the above configuration, pieces of relative data consisting of the rotational angles $\alpha$', $\beta$', $\gamma$' and the moving distance x', y', z' shown in FIG. 31A are stored in advance in the relative position and orientation memory 86 to determine relative position and orientation between the object and the observational eye. In other words, the relationship between the object and an observational eye is fixed.

When pieces of moving data consisting of the rotational angles $\alpha$, $\beta$, $\gamma$ and the moving distance x, y, z to designate the movement of an object (or a picture) are transferred from the control unit 33 to the storing section 82, the moving data are distinguished in the control unit 84. Thereafter, each of the moving data is stored in a corresponding block of the data memory 85. Therefore, the moving data stored in the memory 85 are transferred to the central processing unit 41 to calculate the transformation affine matrices Tx, Ty, Tz, T$\alpha$, T$\beta$ and T$\gamma$ and the vector p' formulated by the equation (18), and the object of which the position and orientation are designated by the vector p is moved and changed to a moved object of which the position and orientation are designated by the vector p'.

Also, the moving data stored in the memory 85 are transferred to the observational eye position and orientation calculator 87. In the calculator 87, the relative data stored in the memory 86 and the moving data are added to calculate pieces of observational data consisting of the rotational angles $\alpha$", $\beta$", $\gamma$" and the moving distance x", y", z" shown in FIG. 31B. The observational data designate position and orientation of the observational eye moved with the object. Thereafter, the observational data are stored in the memory 88. Thereafter, the observational data stored in the memory 88 are transferred to the central processing unit 41 to calculate the transformation affine matrices Tx", Ty", Tz", T$\alpha$", T$\beta$" and T$\gamma$". Therefore, the vector Eye' is calculated according to the equation (20), so that the observational eye of which the position and orientation are designated by the vector Eye is moved in the displaying unit 42 and changed to a moved observational eye of which the position and orientation are designated by the vector Eye'.

Figure 34A:
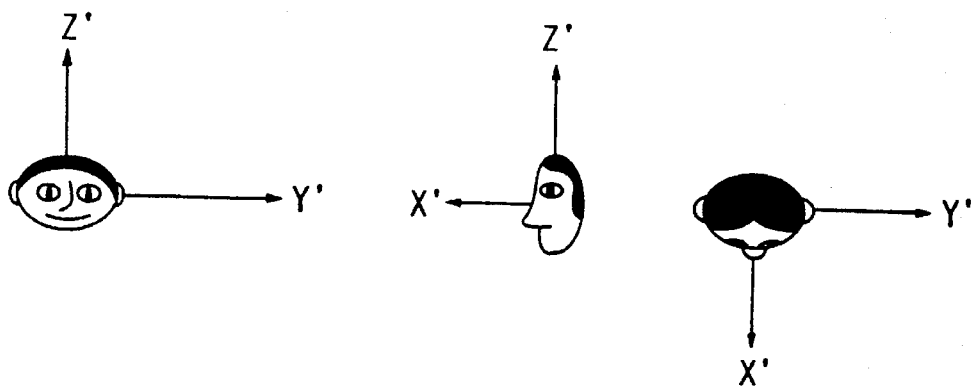
FIG. 34A shows the position and/or orientation of an observational eye before the movement of a plane $S_0$.

FIG. 34A shows the position and/or orientation of the observational eye before the movement of the plane $S_0$. FIGS. 34B to 34F respectively show the change of the position and/or orientation of the observational eye.

As shown in FIG. 34A, the observational eye $E_0$ is positioned at an original point O' in an observational coordinate system O'-X'Y'Z' for convenience. The observational coordinate system O'-X'Y'Z' is positioned by moving the coordinate system O-XYZ by the distance x' along the X-axis, the distance y' along the Y-axis and the distance z' along the Z-axis in parallel to each of the axes X, Y and Z. Also, the observational eye $E_0$ is initially oriented in the +X-axis direction (or the +X'-axis direction).

Figure 34B:
FIGS. 34B to 34F respectively show the change of the position and/or orientation of the observational eye.

When the track ball member 23 is rotated by the angle of $\alpha$ about the X-axis, the rotational angle $\alpha$ is stored in the memory 85. Therefore, the observational angle $\alpha$"=$\alpha$+$\alpha$' is calculated in the calculator 87, and the observational angle $\alpha$" is stored in the memory 88. Thereafter, as shown in FIG. 34B, the observational eye $E_0$ is rotated by the angle of $\alpha$ about the X-axis in the displaying unit 42.

Figure 34C:
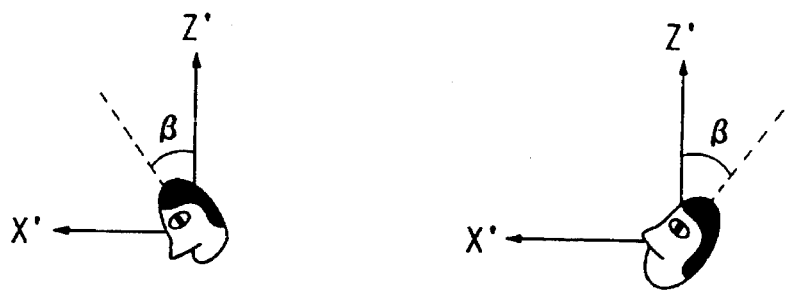

When the track ball member 23 is rotated by the angle of $\beta$ about the Y-axis, the rotational angle $\beta$ is stored in the memory 85. Therefore, the observational angle $\beta''=\beta+\beta'$ is calculated in the calculator 87, and the observational angle $\beta''$ is stored in the memory 88. Thereafter, as shown in FIG. 34C, the observational eye $E_0$ is rotated by the angle of $\beta$ about the Y-axis in the displaying unit 42.

Figure 34D:
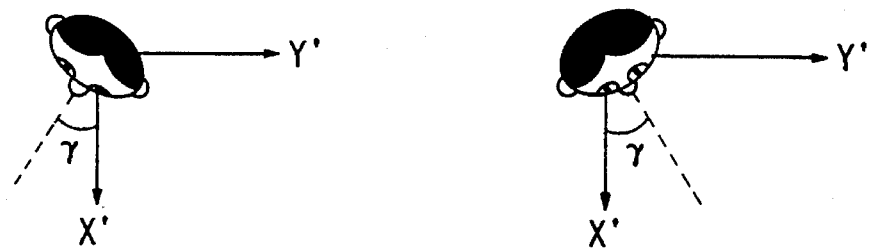

When the annular ring 24 is rotated by the angle of $\gamma$ about the Z-axis, the rotational angle $\gamma$ is stored in the memory 85. Therefore, the observational angle $\gamma''=\gamma+\gamma'$ is calculated in the calculator 87, and the observational angle $\gamma''$ is stored in the memory 88. Thereafter, as shown in FIG. 34D, the observational eye $E_0$ is rotated by the angle of $\gamma$ about the Z-axis in the displaying unit 42.

Figures 34E, 34F:
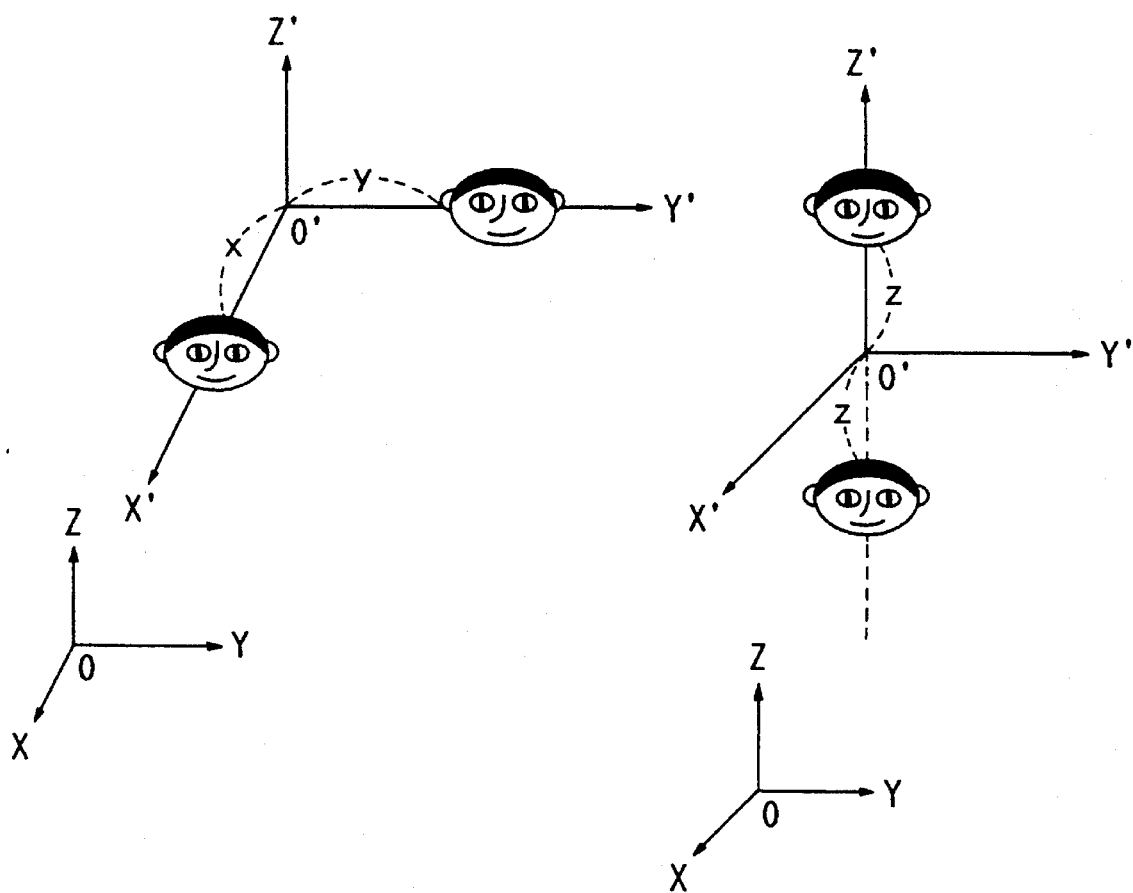

When the casing 22 is slid on a desk to roll the secondary ball member 28 by the distance x along the X-axis, the distance x is stored in the memory 85. Therefore, the position x"=x+x' is calculated in the calculator 87, and the position x" is stored in the memory 88. Thereafter, as shown in FIG. 34E, the observational eye $E_0$ displayed in the displaying unit 42 is moved to a new position (x", y', z') in the coordinate system O-XYZ.

When the casing 22 is slid on a desk to roll the secondary ball member 28 by the distance y along the Y-axis, the distance y is stored in the memory 85. Therefore, the position y"=y+y' is calculated in the calculator 87, and the position y" is stored in the memory 88. Thereafter, as shown in FIG. 34E, the observational eye $E_0$ displayed in the displaying unit 42 is moved to a new position (x', y", z') in the coordinate system O-XYZ.

When the first or second specifying button 31 or 32 is pushed, the distance z is stored in the memory 85. Therefore, the position z"=z+z' is calculated in the calculator 87, and the position z" is stored in the memory 88. Thereafter, as shown in FIG. 34F, the observational eye $E_0$ displayed in the displaying unit 42 is moved to a new position (x', y', z") in the coordinate system O-XYZ.

Accordingly, even though the object is moved in the displaying unit 42, the object can be always observed from a relatively fixed position and orientation because the relative relationship between the object and the observational eye $E_0$ is fixed.

Next, various modifications of the observational position and orientation changing apparatus 81 according to the second embodiment are described with reference to FIGS. 35 to 46.

Figure 35:
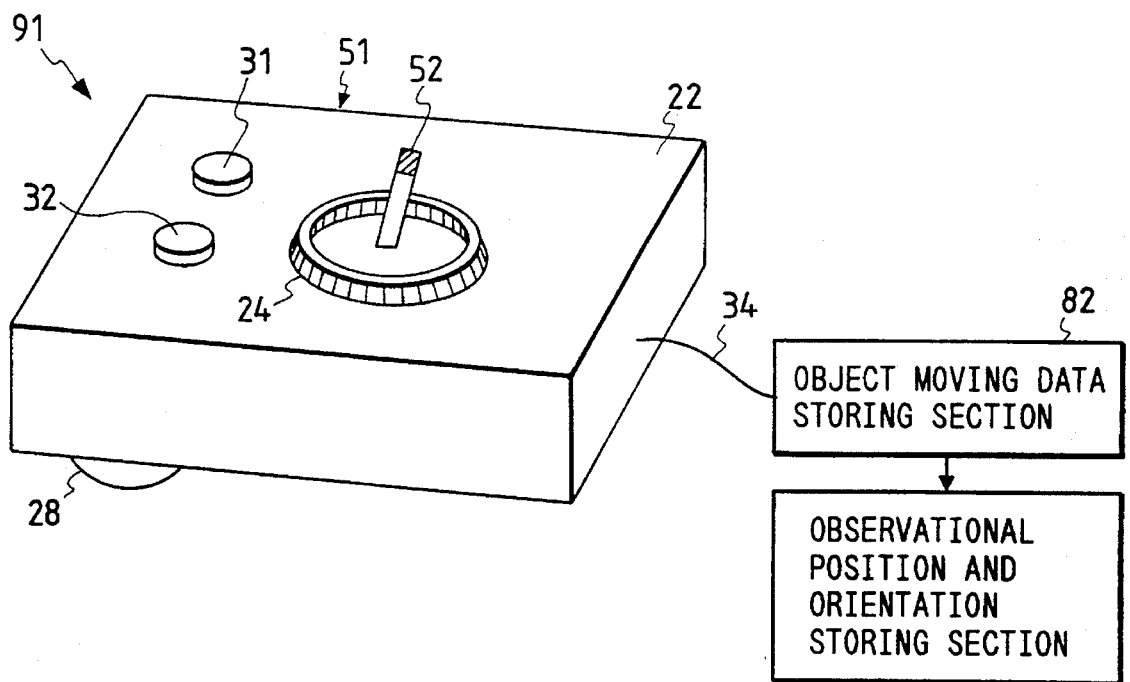
FIG. 35 is a diagonal view of an observational position and orientation changing apparatus according to a first modification of the second embodiment.

FIG. 35 is a diagonal view of an observational position and orientation changing apparatus according to a first modification of the second embodiment.

As shown in FIG. 35, an observational position and orientation changing apparatus 91 is manufactured by utilizing the three-dimensional movement specifying apparatus 51 with the joy stick 52 in place of the three-dimensional movement specifying apparatus 21. In the above configuration, the object can be always observed from a relatively fixed position and orientation in the same manner as in the second embodiment.

Figure 36:
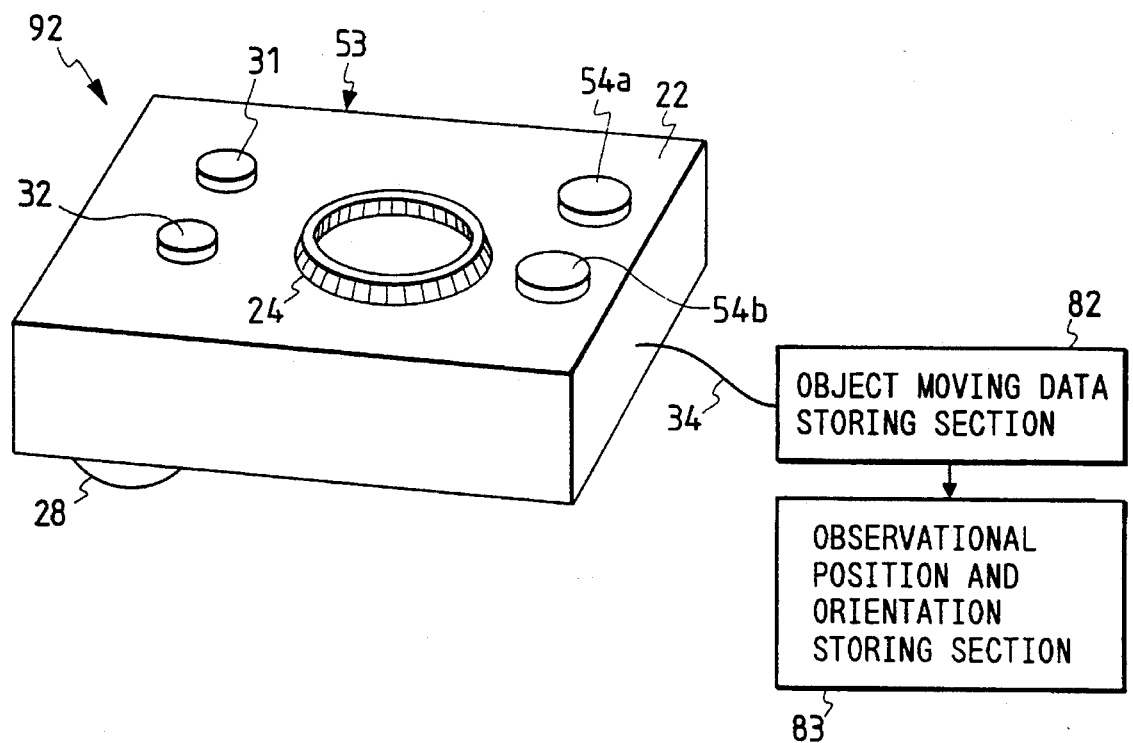
FIG. 36 is a diagonal view of an observational position and orientation changing apparatus according to a second modification of the second embodiment.

FIG. 36 is a diagonal view of an observational position and orientation changing apparatus according to a second modification of the second embodiment.

As shown in FIG. 36, an observational position and orientation changing apparatus 92 is manufactured by utilizing the three-dimensional movement specifying apparatus 53 with the dials 54a, 54b in place of the three-dimensional movement specifying apparatus 21. In the above configuration, the object can be always observed from a relatively fixed position and orientation in the same manner as in the second embodiment.

Figure 37:
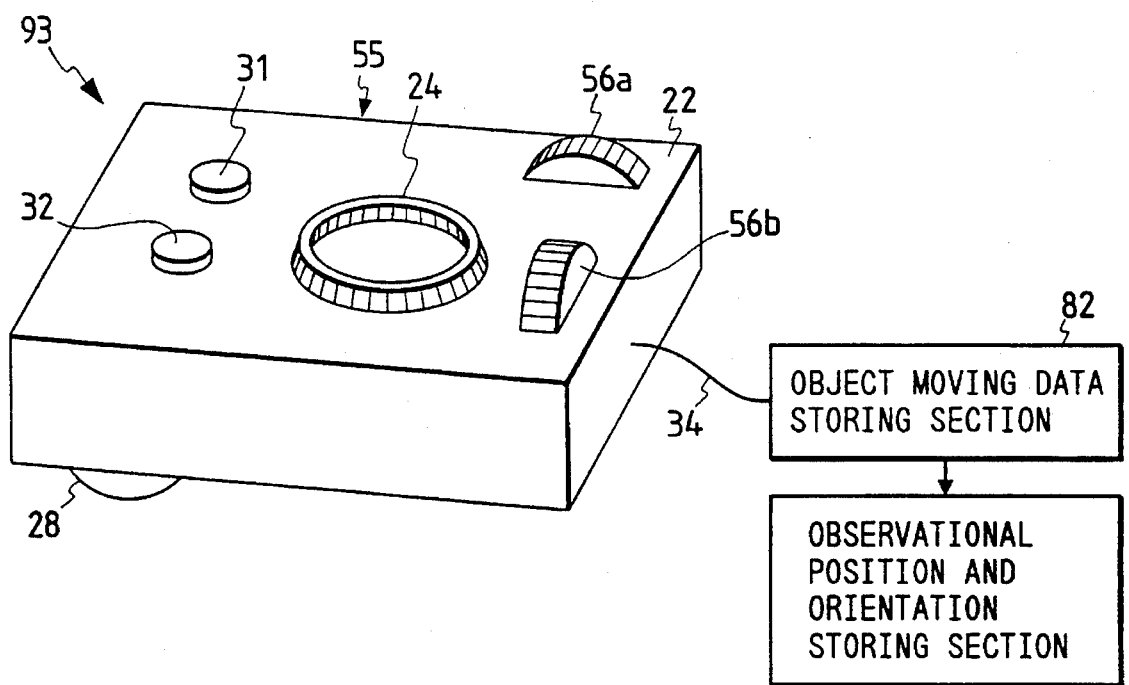
FIG. 37 is a diagonal view of an observational position and orientation changing apparatus according to a third modification of the second embodiment.

FIG. 37 is a diagonal view of an observational position and orientation changing apparatus according to a third modification of the second embodiment.

As shown in FIG. 37, an observational position and orientation changing apparatus 93 is manufactured by utilizing the three-dimensional movement specifying apparatus 55 with the sliders 56a, 56b in place of the three-dimensional movement specifying apparatus 21. In the above configuration, the object can be always observed from a relatively fixed position and orientation in the same manner as in the second embodiment.

Figure 38:
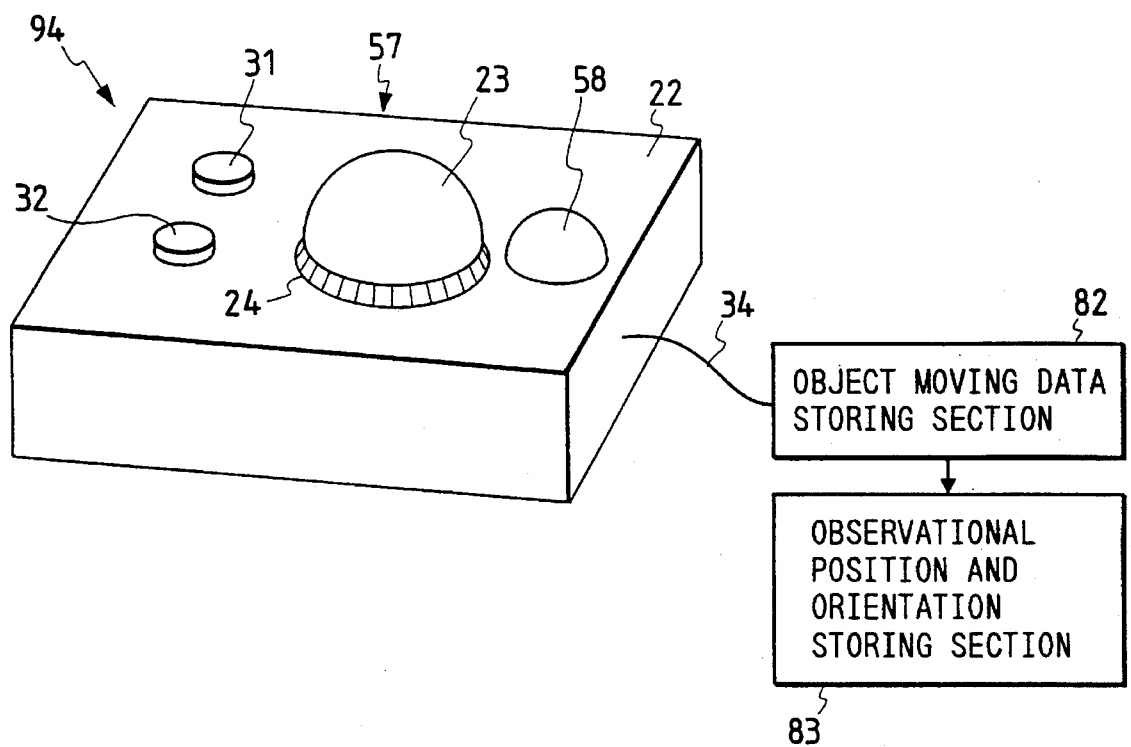
FIG. 38 is a diagonal view of an observational position and orientation changing apparatus according to a fourth modification of the second embodiment.

FIG. 38 is a diagonal view of an observational position and orientation changing apparatus according to a fourth modification of the second embodiment.

As shown in FIG. 38, an observational position and orientation changing apparatus 94 is manufactured by utilizing the three-dimensional movement specifying apparatus 57 with the track ball 58 in place of the three-dimensional movement specifying apparatus 21. In the above configuration, the object can be always observed from a relatively fixed position and orientation in the same manner as in the second embodiment.

Figure 39:
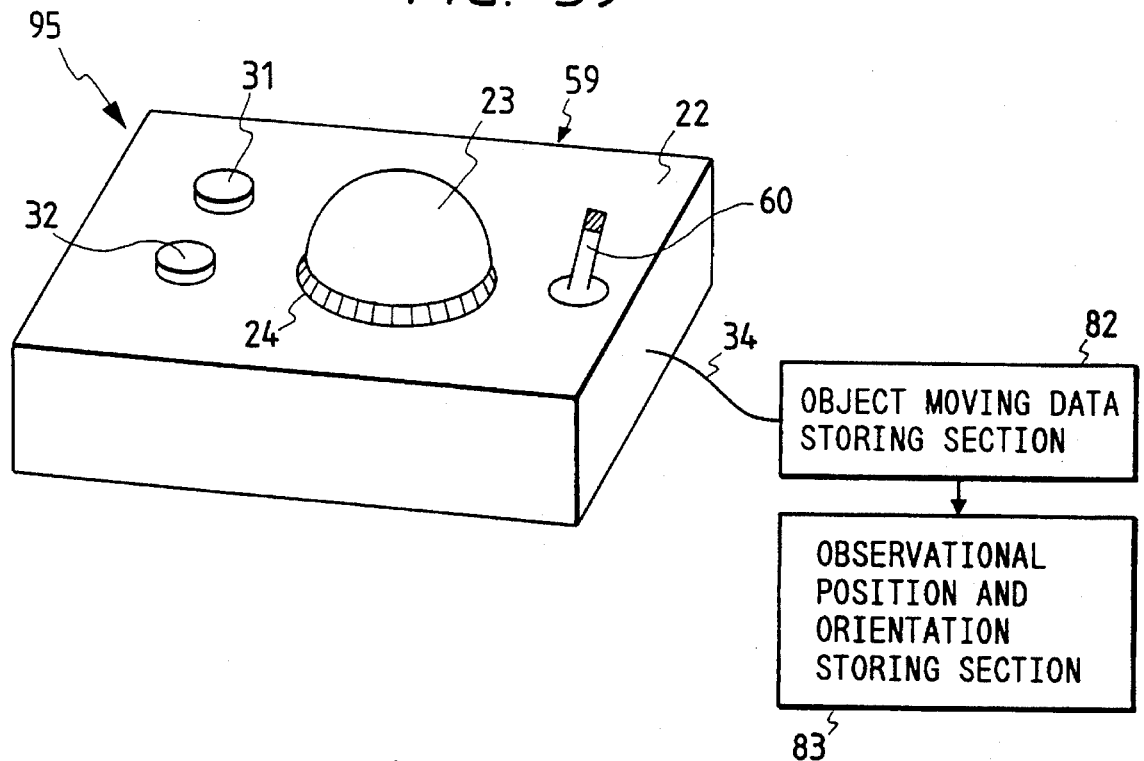
FIG. 39 is a diagonal view of an observational position and orientation changing apparatus according to a fifth modification of the second embodiment.

FIG. 39 is a diagonal view of an observational position and orientation changing apparatus according to a fifth modification of the second embodiment.

As shown in FIG. 39, an observational position and orientation changing apparatus 95 is manufactured by utilizing the three-dimensional movement specifying apparatus 59 with the joy stick 60 in place of the three-dimensional movement specifying apparatus 21. In the above configuration, the object can be always observed from a relatively fixed position and orientation in the same manner as in the second embodiment.

Figure 40:
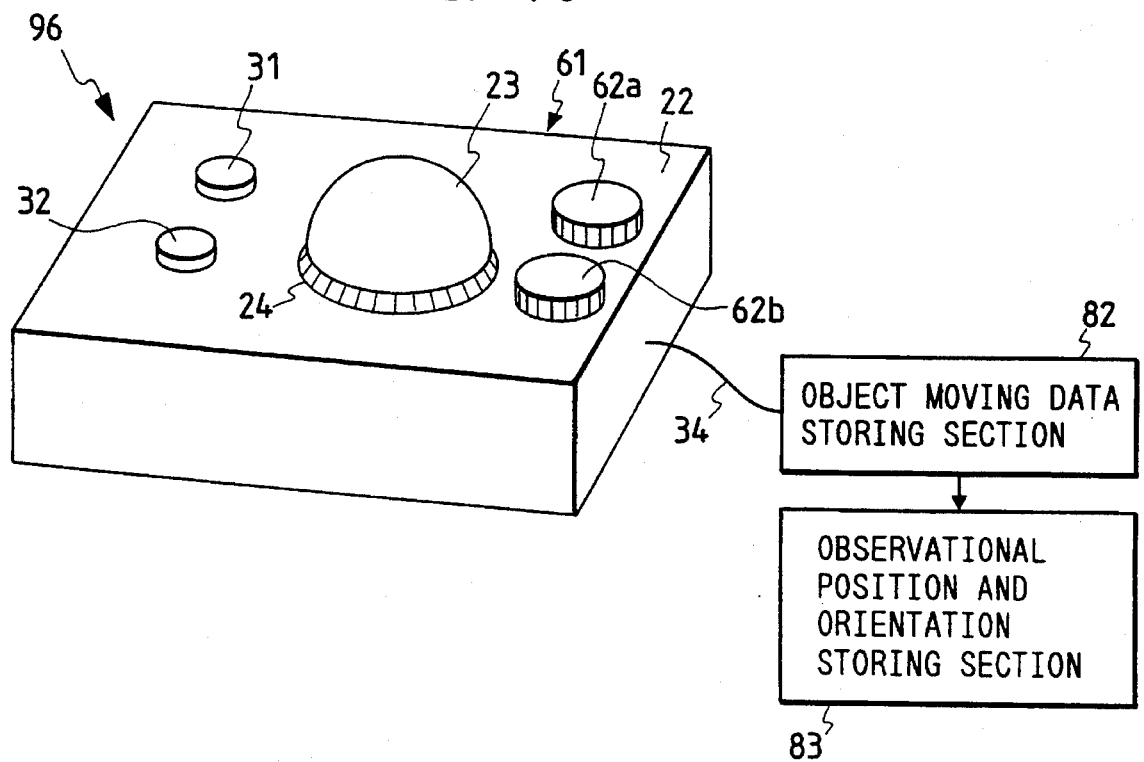
FIG. 40 is a diagonal view of an observational position and orientation changing apparatus according to a sixth modification of the second embodiment.

FIG. 40 is a diagonal view of an observational position and orientation changing apparatus according to a sixth modification of the second embodiment.

As shown in FIG. 40, an observational position and orientation changing apparatus 96 is manufactured by utilizing the three-dimensional movement specifying apparatus 61 with the dials 62a, 62b in place of the three-dimensional movement specifying apparatus 21. In the above configuration, the object can be always observed from a relatively fixed position and orientation in the same manner as in the second embodiment.

Figure 41:
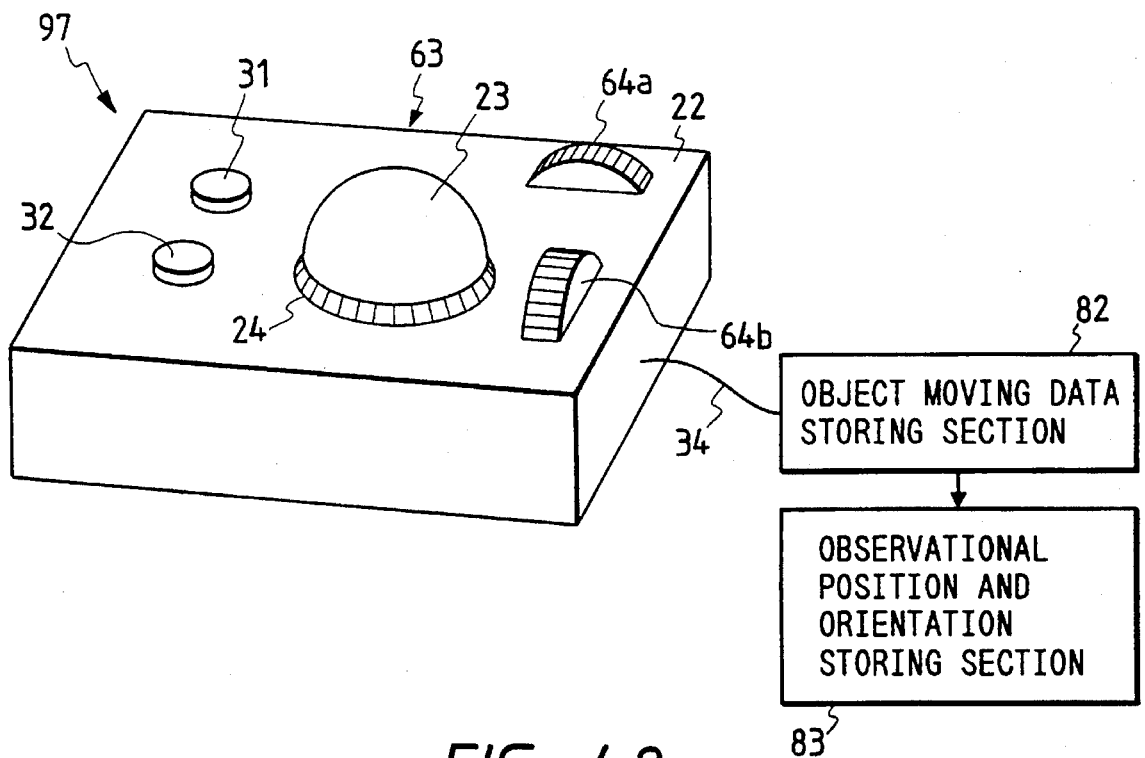
FIG. 41 is a diagonal view of an observational position and orientation changing apparatus according to a seventh modification of the second embodiment.

FIG. 41 is a diagonal view of an observational position and orientation changing apparatus according to a seventh modification of the second embodiment.

As shown in FIG. 41, an observational position and orientation changing apparatus 97 is manufactured by utilizing the three-dimensional movement specifying apparatus 63 with the sliders 64a, 64b in place of the three-dimensional movement specifying apparatus 21. In the above configuration, the object can be always observed from a relatively fixed position and orientation in the same manner as in the second embodiment.

Figure 42:
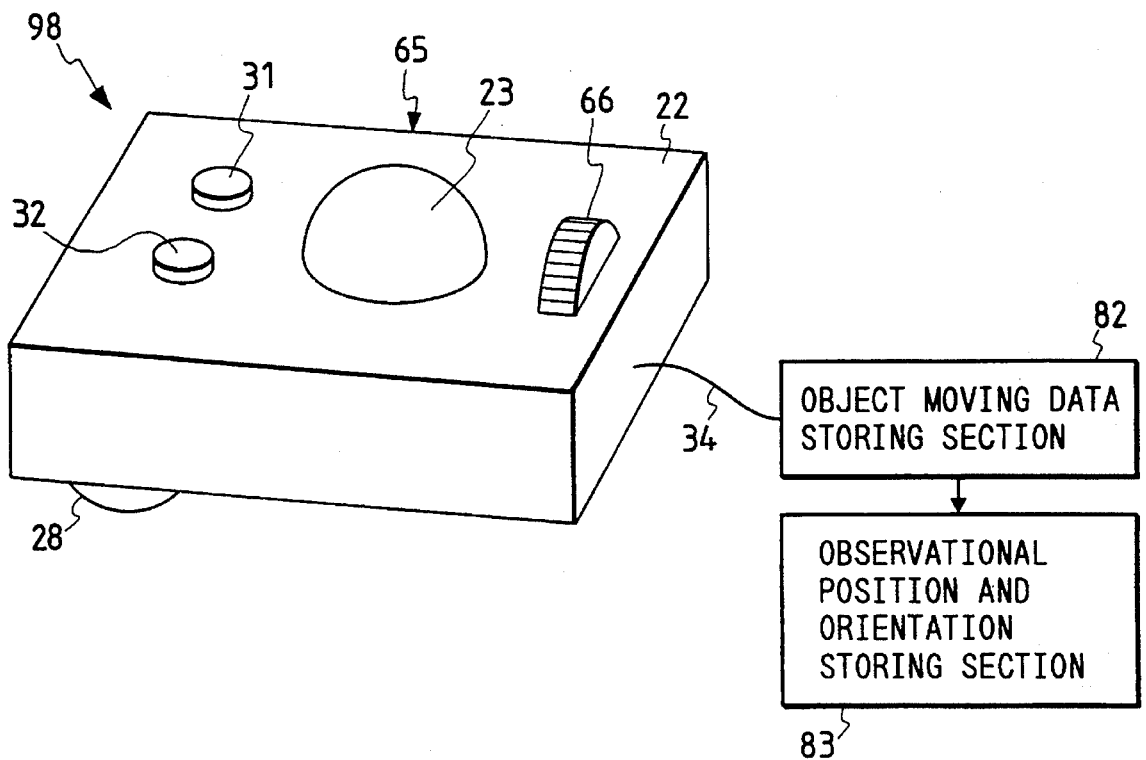
FIG. 42 is a diagonal view of an observational position and orientation changing apparatus according to an eighth modification of the second embodiment.

FIG. 42 is a diagonal view of an observational position and orientation changing apparatus according to an eighth modification of the second embodiment.

As shown in FIG. 42, an observational position and orientation changing apparatus 98 is manufactured by utilizing the three-dimensional movement specifying apparatus 65 with the slider 66 in place of the three-dimensional movement specifying apparatus 21. In the above configuration, the object can be always observed from a relatively fixed position and orientation in the same manner as in the second embodiment.

Figure 43:
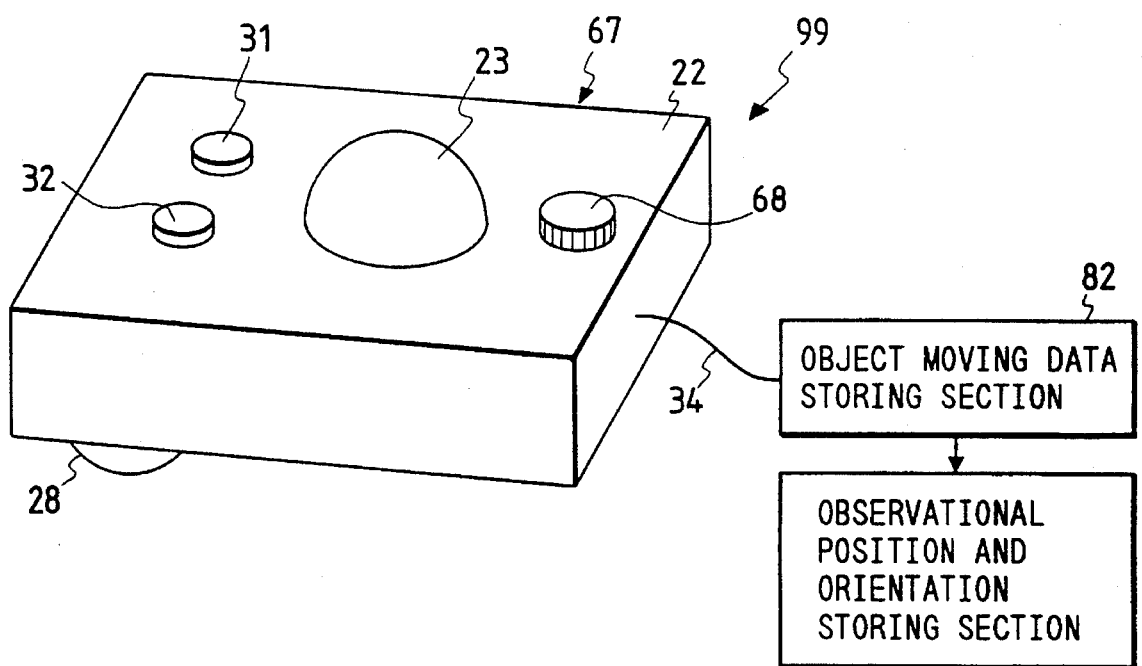
FIG. 43 is a diagonal view of an observational position and orientation changing apparatus according to a ninth modification of the second embodiment.

FIG. 43 is a diagonal view of an observational position and orientation changing apparatus according to a ninth modification of the second embodiment.

As shown in FIG. 43, an observational position and orientation changing apparatus 99 is manufactured by utilizing the three-dimensional movement specifying apparatus 67 with the dial 68 in place of the three-dimensional movement specifying apparatus 21. In the above configuration, the object can be always observed from a relatively fixed position and orientation in the same manner as in the second embodiment.

Figure 44:
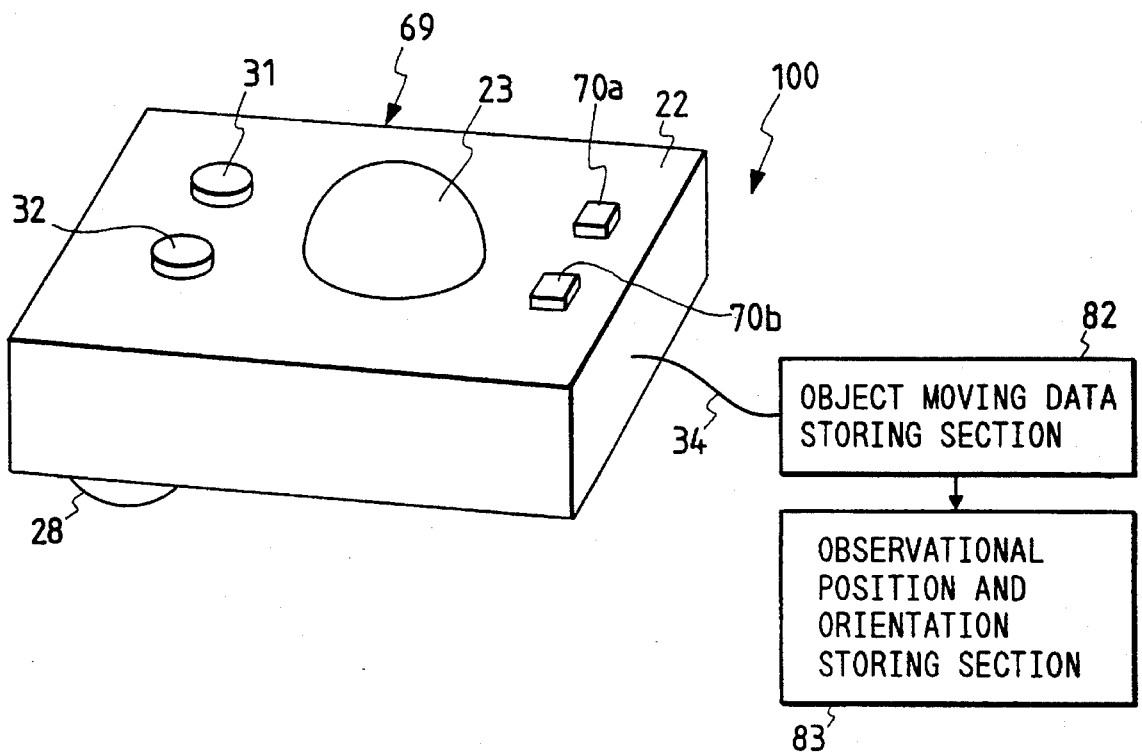
FIG. 44 is a diagonal view of an observational position and orientation changing apparatus according to a tenth modification of the second embodiment.

FIG. 44 is a diagonal view of an observational position and orientation changing apparatus according to a tenth modification of the second embodiment.

As shown in FIG. 44, an observational position and orientation changing apparatus 100 is manufactured by utilizing the three-dimensional movement specifying apparatus 69 with the buttons 70a, 70b in place of the three-dimensional movement specifying apparatus 21. In the above configuration, the object can be always observed from a relatively fixed position and orientation in the same manner as in the second embodiment.

Figure 45:
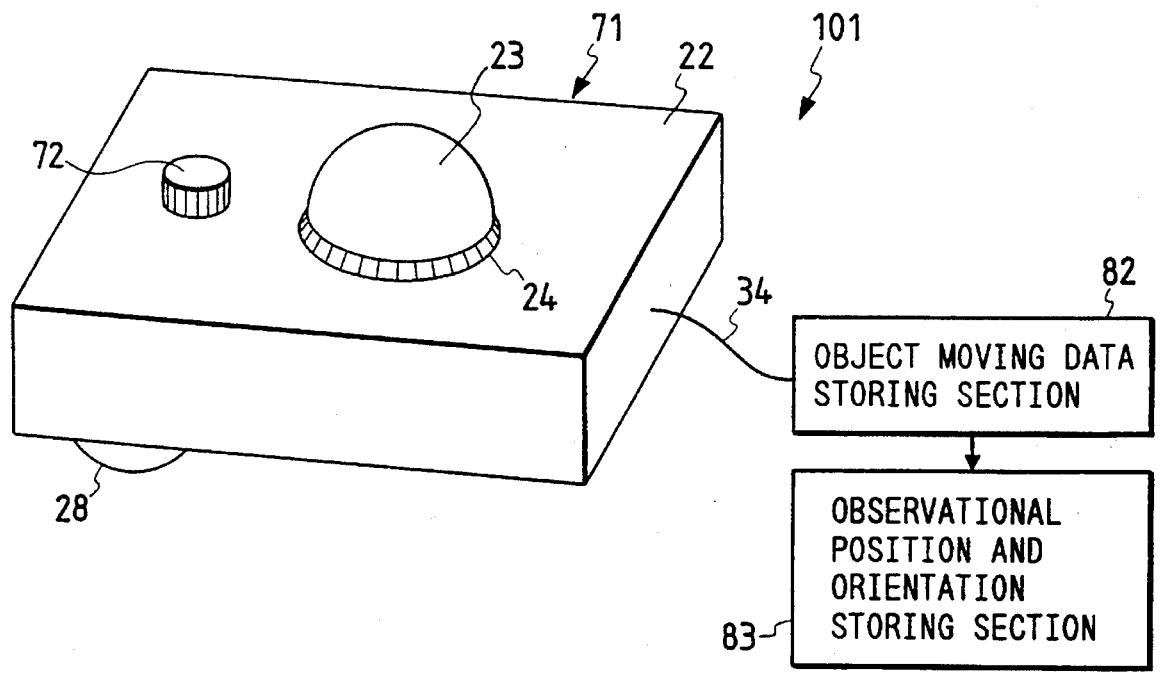
FIG. 45 is a diagonal view of an observational position and orientation changing apparatus according to an eleventh modification of the second embodiment.

FIG. 45 is a diagonal view of an observational position and orientation changing apparatus according to an eleventh modification of the second embodiment.

As shown in FIG. 45, an observational position and orientation changing apparatus 101 is manufactured by utilizing the three-dimensional movement specifying apparatus 71 with the dial 72 in place of the three-dimensional movement specifying apparatus 21. In the above configuration, the object can be always observed from a relatively fixed position and orientation in the same manner as in the second embodiment.

Figure 46:
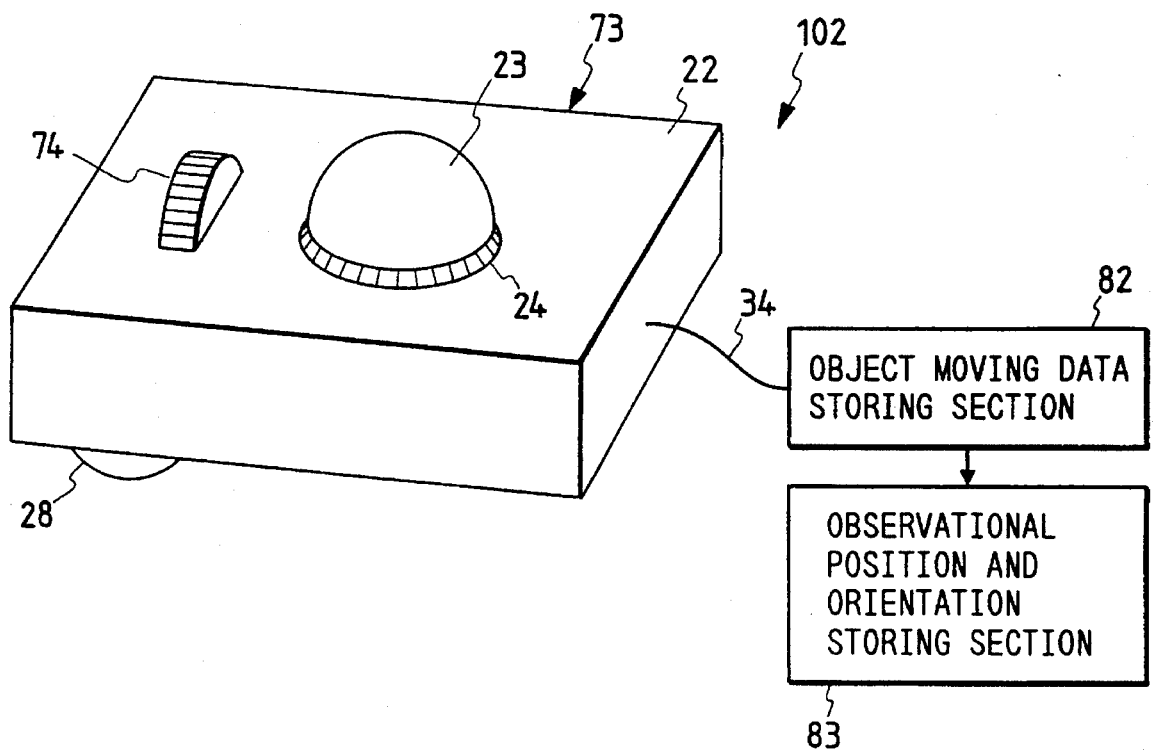
FIG. 46 is a diagonal view of an observational position and orientation changing apparatus according to a twelfth modification of the second embodiment.

FIG. 46 is a diagonal view of an observational position and orientation changing apparatus according to a twelfth modification of the second embodiment.

As shown in FIG. 46, an observational position and orientation changing apparatus 102 is manufactured by utilizing the three-dimensional movement specifying apparatus 73 with the slider 74 in place of the three-dimensional movement specifying apparatus 21. In the above configuration, the object can be always observed from a relatively fixed position and orientation in the same manner as in the second embodiment.

(Third Embodiment)

Figure 47:
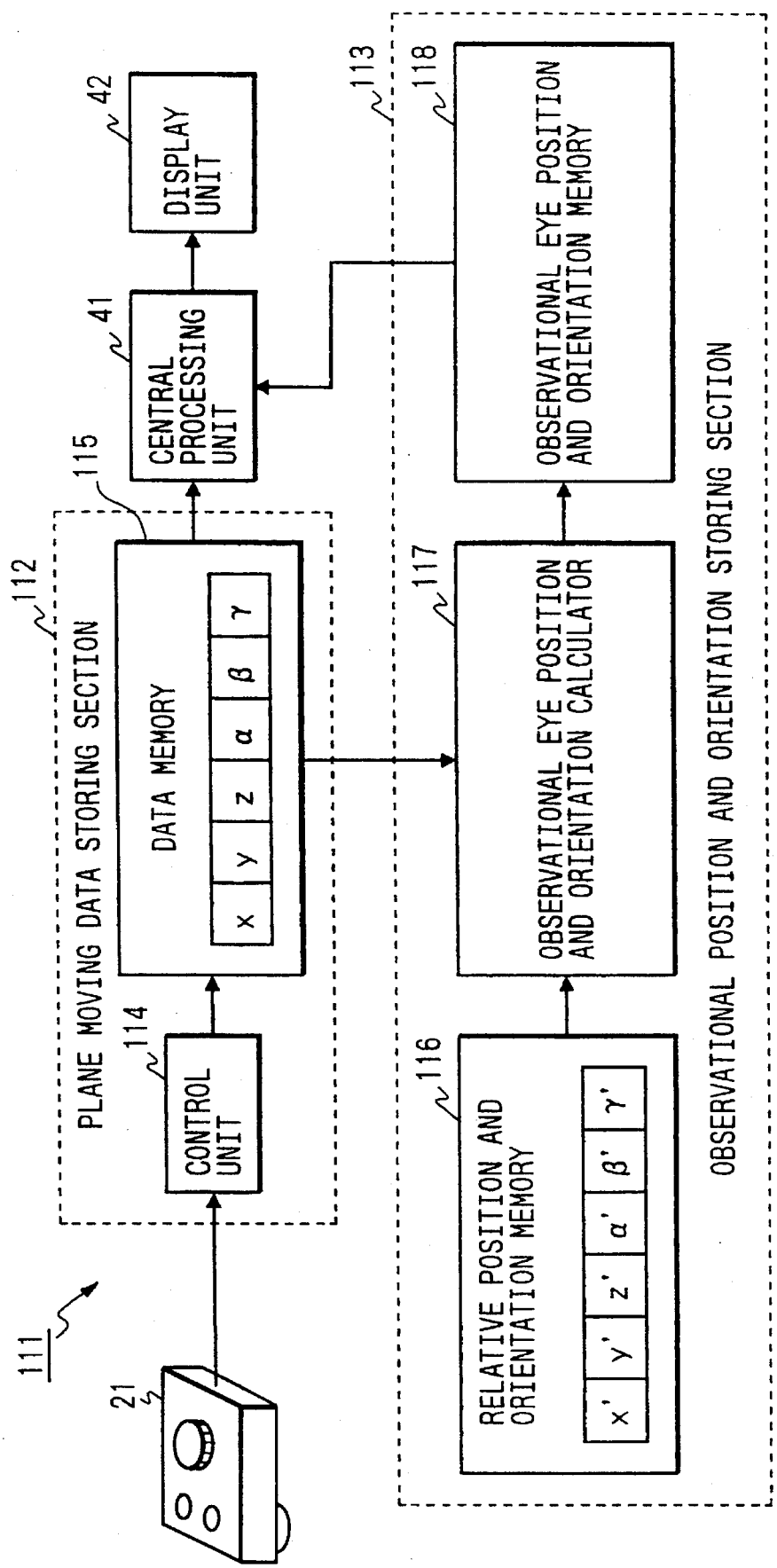
FIG. 47 is a block diagram of an observational position and orientation changing apparatus according to a third embodiment of the present invention.

FIG. 47 is a block diagram of an observational position and orientation changing apparatus according to a third embodiment of the present invention.

As shown in FIG. 47, an observational position and orientation changing apparatus 111 comprises the apparatus 21, the data transferring code 34, a plane moving data storing section 112 for storing pieces of moving data of a reference plane Sr consisting of the rotational angles $\alpha$, $\beta$, $\gamma$ and the moving distance x, y, z obtained in the control unit 33 of the apparatus 21, and an observational position and orientation storing section 113 for storing a relationship between the reference plane Sr and an observational eye and storing position and orientation of the observational eye moved with the reference plane Sr.

The storing section 112 comprises a control unit 114 for distinguishing the rotational angles $\alpha$, $\beta$, $\gamma$ and the moving distance x, y, z transferred from the control unit 33, and a data memory 115 for storing the rotational angles $\alpha$, $\beta$, $\gamma$ and the moving distance x, y, z distinguished. The storing section 113 comprises a relative position and orientation memory 116 for storing a relative position and orientation between the reference plane Sr and the observational eye, an observational eye position and orientation calculator 117 for calculating moved position and orientation of the observational eye moved with the reference plane Sr, and an observational eye position and orientation memory 118 for storing the moved position and orientation of the observational eye calculated in the calculator 117

In the above configuration, translation movement and/or rotational movement are performed for a reference plane Sr independently of an object (or a picture) displayed in the displaying unit 42. Also, a relative position and orientation between the reference plane Sr and an observational eye $E_0$ is fixed. Therefore, as shown in FIG. 31B, when the reference plane Sr is moved according to the data transferred from the apparatus 21, the observational eye $E_0$ is also moved in the same manner to maintain the relative position and orientation between the reference plane Sr and the observational eye $E_0$. As a result, the object positioned at a fixed position is observed by the observational eye $E_0$ moved to various positions and orientations.

In detail, pieces of relative data consisting of the rotational angles $\alpha'$, $\beta'$, $\gamma$ and the moving distance x', y', z' shown in FIG. 31A are stored in advance in the relative position and orientation memory 116 to determine a relative position and orientation between the reference plane Sr and the observational eye $E_0$. In other words, the relationship between the reference plane Sr and the observational eye $E_0$ is fixed.

When pieces of moving data of the reference plane Sr consisting of the rotational angles $\alpha$, $\beta$, $\gamma$ and the moving distance x, y, z are transferred from the control unit 33 to the storing section 112, the moving data are distinguished in the control unit 114. The moving data designate the movement of the reference plane Sr. Thereafter, each of the moving data is stored in a corresponding block of the data memory 115. Thereafter, the moving data stored in the memory 115 are transferred to the central processing unit 41 to calculate the transformation affine matrices Tx, Ty, Tz, T$\alpha$, T$\beta$ and T$\gamma$ and the moved directional vector p' formulated by the equation (18), and the reference plane Sr of which the position and orientation are designated by the directional vector p is moved and changed to a moved reference plane $S_1$ of which the position and orientation are designated by the moved directional vector p'.

Also, the moving data stored in the memory 115 are transferred to the observational eye position and orientation calculator 117. In the calculator 117, the relative data stored in the memory 116 and the moving data are added to calculate pieces of observational data consisting of the rotational angles $\alpha''$, $\beta''$, $\gamma''$ and the moving distance x'', y'', z'' shown in FIG. 31B. The observational data designate the moved position and orientation of the observational eye $E_0$ moved with the reference plane St. Thereafter, the observational data are stored in the memory 118. Thereafter, the observational data stored in the memory 118 are transferred to the central processing unit 41 to calculate the transformation affine matrices Tx'', Ty'', Tz'', T$\alpha$'', T$\beta$'' and T$\gamma$''. Therefore, the vector Eye' designating the moved position and orientation of the observational eye $E_0$ moved is calculated according to the equation (20), so that the observational eye $E_0$ of which the position and orientation are designated by the vector Eye is moved in the displaying unit 42 and changed to a moved observational eye $E_0$ of which the moved position and orientation are designated by the vector Eye'.

FIG. 48 shows the movement of the observational eye $E_0$ on condition that the position and orientation of the object are fixed.

As shown in FIG. 48, the reference plane Sr is initially rotated about the X-axis by rotating the track ball member 23 about the X-axis, so that the observational eye $E_0$ is oriented toward the object. Thereafter, the reference plane Sr is moved along the X and Z-axes by rolling the secondary ball member 28 along the X-axis and pushing the first specifying button 31, so that the observational eye $E_0$ is also moved along the X and Z-axes to observe the object from various positions and orientations.

Accordingly, the observational eye $E_0$ can be arbitrarily moved to observe the entire surfaces of the object from various positions and orientations.

(Fourth Embodiment)

FIG. 49 is a constitutional view of a three-dimensional movement specifying apparatus according to a fourth embodiment of the present invention.

As shown in FIG. 49, a three-dimensional movement specifying apparatus 121 comprises the apparatus 21, the data transferring code 34, a plane moving data storing section 122 for storing pieces of moving data consisting of the rotational angles $\alpha$, $\beta$, $\gamma$ and the moving distance x, y, z which are utilized to perform rotational movement and translation movement for an instructing plane, and an object position and orientation storing section 123 for storing a relationship between the instructing plane and an object and storing a position and orientation of the object moved with the instructing plane.

FIG. 50 is a block diagram of the storing sections 122, 123 shown in FIG. 49.

As shown in FIG. 50, the storing section 122 comprises a control unit 124 for distinguishing the rotational angles $\alpha$, $\beta$, $\gamma$ and the moving distance x, y, z transferred from the control unit 33, and a moving data memory 125 for storing the moving data consisting of rotational angles $\alpha$, $\beta$, $\gamma$ and the moving distance x, y, z distinguished. The storing section 123 comprises a relative position and orientation memory 126 for storing a relative position and orientation between the instructing plane and the object, an object position and orientation calculator 127 for calculating a position and orientation of the object on condition that the relationship between the instructing plane and the object is maintained even though the instructing plane is moved, and an object position and orientation memory 128 for storing the position and orientation of the object calculated in the calculator 127.

In the above configuration, as shown in FIG. 51, the orientation of a plane $S_0$ representing an object Ob1 (or a picture) is indicated by a normal line vector p in a three-dimensional orthogonal coordinate system O-XYZ, and the position of the plane $S_0$ is represented by a reference point Pr. Also, an instructing plane Si is defined, and a relative position and orientation between the instructing plane Si and the plane $S_0$ is fixed. Therefore, when translation movement and/or rotational movement are performed for the instructing plane Si according to the moving data transferred from the apparatus 21, the plane $S_0$ is also moved in the same manner as the instructing plane Si.

In detail, pieces of relative data consisting of rotational angles $\alpha'$, $\beta'$, $\gamma'$ and moving distance x', y', z' are stored in advance in the relative position and orientation memory 86 to determine a relative position and orientation between the instructing plane Si and the oberct Ob1. When pieces of moving data consisting of the rotational angles $\alpha$, $\beta$, $\gamma$ and the moving distance x, y, z are transferred from the apparatus 21 to the storing section 122, the moving data are distinguished in the control unit 124. Thereafter, each of the moving data is stored in a corresponding block of the data memory 125. Thereafter, the moving data stored in the memory 95 are transferred to the central processing unit 41 to calculate the transformation affine matrices Tx, Ty, Tz, T$\alpha$, T$\beta$ and T$\gamma$. Therefore, the instructing plane Si displayed in the displaying unit 42 is moved to a new position and orientation according to the moving data.

Also, the moving data stored in the memory 125 are transferred to the object position and orientation calculator 127. In the calculator 127, the relative data stored in the memory 126 and the moving data are added to calculate pieces of object data consisting of rotational angles $\alpha''$, $\beta''$, $\gamma''$ and moving distance x'', y'', z''. Where relational equations x''=x+x', y''=y+y', z''=z+z', $\alpha''=\alpha+\alpha'$, $\beta''=\beta+\beta'$, and $\gamma''=\gamma+\gamma'$ are satisfied. The object data designate the position and orientation of the object moved with the instructing plane Si. Thereafter, the object data are stored in the memory 128. Thereafter, the object data stored in the memory 128 are transferred to the central processing unit 41 to calculate the transformation affine matrices Tx'', Ty'', Tz'', T$\alpha''$, T$\beta''$ and T$\gamma''$. Therefore, the object displayed in the displaying unit 42 is moved to a new position and a new orientation according to the object data to maintain the relationship between the instructing plane Si and the object.

Accordingly, a degree of movement of the object can be directly ascertained because the degree of movement is indicated by the movement of the instructing plane Si. Therefore, the movement of the object can be more intuitively specified with the apparatus 121.

Having illustrated and described the principles of our invention in a preferred embodiment thereof, it should be readily apparent to those skilled in the art that the invention can be modified in arrangement and detail without departing from such principles.

What is claimed is:

1. A three-dimensional movement specifying apparatus for specifying translation movement and/or rotational movement of an object in a three-dimensional space to virtually move the object from a starting position and orientation (x0,y0,z0, $\alpha$0,$\beta$0,$\gamma$0) to a target position and orientation (x1,y1,z1, $\alpha$1,$\beta$1,$\gamma$1), comprising:

displaying means for displaying a plane representing a three-dimensional position (x,y,z) and an orientation ($\alpha,\beta,\gamma$) of the object and the object placed at the three-dimensional position and orientation (x,y,z, $\alpha,\beta,\gamma$), an X-Y-Z coordinate system in which the plane is placed on an X-Y plane specified by Z coordinates Z=0 and the object is placed at an original point being defined, a value $\alpha$ denoting a rotational angle about an X-axis of the coordinate system, a value $\beta$ denoting a rotational angle about a Y-axis of the coordinate system, a value $\gamma$ denoting a rotational angle about a Z-axis of the coordinate system, and the object and the coordinate system being moved with the plane to place a fixed position of the plane at the original point of the X-Y-Z coordinate system;

first orientation specifying means having a track ball member for specifying a first rotational movement of the plane displayed by the displaying means about the X-axis and a second rotational movement of the plane about the Y-axis at one time by rotating the track ball member, the plane which represents a three-dimensional starting position (x0,y0,z0) and a starting orientation ($\alpha$0,$\beta$0,$\gamma$0) of the object being moved according to the first and second rotational movements to place both the three-dimensional starting position (x0,y0,z0) and a three-dimensional target position (x1,y1,z1) on the plane and being changed to the plane which represents the three-dimensional starting position (x0,y0,z0) and an intermediate orientation ($\alpha$2,$\beta$2,$\gamma$0) of the object, and an orientation ($\alpha$2,$\beta$2) represented by the plane being further changed according to the first and second rotational movements to an orientation ($\alpha$1,$\beta$1) represented by the plane by rotating the track ball member by angle of $\alpha$1–$\alpha$2 and $\beta$1–$\beta$2 about the X-axis and Y-axis;

position specifying means having a secondary ball member for specifying a first translation movement of the plane displayed by the displaying means along the X-axis and a second translation movement of the plane along the Y-axis at one time by rotating the secondary ball member straight, the plane which is determined by the first orientation specifying means and represents the three-dimensional starting position (x0,y0,z0) and the intermediate orientation ($\alpha 2,\beta 2,\gamma 2$) of the object being moved according to the first and second translation movements and changed to the plane which represent the three-dimensional target position (x1,y1,z1) and the intermediate orientation ($\alpha 2,\beta 2,\gamma 0$) of the object;

second orientation specifying means for specifying a third rotational movement of the plane displayed by the displaying means about the Z-axis, an orientation $\gamma 0$ represented by the plane being changed to an orientation $\gamma 1$ represented by the plane to change the plane which is determined by the position specifying means and represents the three-dimensional target position (x1,y1,z1) and the intermediate orientation ($\alpha 2,\beta 2,\gamma 0$) of the object to the plane which represents the three-dimensional target position (x1,y1,z1) and a target orientation ($\alpha 1,\beta 1,\gamma 1$) of the object in cooperation with the first orientation specifying means; and control means for controlling the object and the plane displayed by the displaying means to place the object at the fixed position of the plane for the purpose of placing the object at the original point of the X-Y-Z coordinate system and controlling movement of the object to virtually move the object which is placed at the three-dimensional starting position (x0,y0,z0) and the starting orientation ($\alpha 0,\beta 0,\gamma 0$) represented by the plane to the three-dimensional target position (x1,y1,z1) and the target orientation ($\alpha 1,\beta 1,\gamma 1$) represented by the plane which is determined by specifying the first and second rotational movement, the first and second translation movements and the third rotational movement by the first orientation specifying means, the position specifying means and the second orientation specifying means.

2. An apparatus according to claim 1 in which the second orientation specifying means specifies the third rotational movement of the object by rotating a ring by an angle $\gamma_1-\gamma_0$ about the Z-axis, the object being rotated by the angle $\gamma_1-\gamma_0$ about the Z-axis under the control of the control means.

3. An apparatus according to claim 1 in which the first orientation specifying means additionally includes a first sensor rotating with the rotation of the track ball member about the X-axis to detect the degree of the first rotational movement specified in the first orientation specifying means, and a second sensor rotating with the rotation of the track ball member about the Y-axis to detect the degree of the second rotational movement specified in the first orientation specifying means.

4. An apparatus according to claim 2 in which the second orientation specifying means additionally includes a sensor rotating with the rotation of the ring about the Z-axis to detect the degree of the third rotational movement specified in the second orientation specifying means.

5. An apparatus according to claim 4 in which the position specifying means further includes a first sensor rotating with the roll of the ball member along the X-axis to detect the degree of the first translation movement specified in the position specifying means, and a second sensor rotating with the roll of the ball member along the Y-axis to detect the degree of the second translation movement specified in the position specifying means.

6. An apparatus according to claim 1 in which the second orientation specifying means is composed of first and second buttons, the object being clockwisely rotated on its axis by pushing the first button under the control of the control means, and the object being counterclockwisely rotated on its axis by pushing the second button under the control of the control means.

7. An apparatus according to claim 1, additionally including:

relative position and orientation storing means for storing relative position and orientation between an instructing plane and the object;

plane moving data storing means for storing pieces of moving data of the instructing plane consisting of degrees of the first, second and third rotational movements of the object specified in the first orientation specifying means and the second orientation specifying means and degrees of the first and second translation movements specified in the position specifying means, the moving data designating movements of the instructing plane;

object position and orientation calculating means for calculating the target position and orientation of the object to which the object is moved on condition that the relative position and orientation stored in the relative position and orientation storing means is maintained even though the instructing plane is moved according to the moving data stored in the plane moving data storing means, the target position and orientation of the object being obtained by adding the relative position and orientation stored in the relative position and orientation storing means and the moving data stored in the plane position and orientation storing means; and object position and orientation storing means for storing the target position and orientation of the object calculated in the object position and orientation calculating means, the object being moved to the target position and orientation of the object stored in the object position and orientation storing means.

8. An observational position and orientation changing apparatus for changing position and orientation of an observational eye observing an object in a three-dimensional space, comprising:

displaying means for displaying a plane representing a three-dimensional position (x,y,z) of the object and the object placed at the three-dimensional position and orientation (x,y,z,$\alpha,\beta,\gamma$), an X-Y-Z coordinate system in which the plane is placed on an X-Y plane specified by Z coordinates Z=0 and the object is placed at an original point being defined, a value $\alpha$ denoting a rotational angle about an X-axis of the coordinate system, a value $\beta$ denoting a rotational angle about a Y-axis of the coordinate system, a value $\gamma$ denoting a rotational angle about a Z-axis of the coordinate system, and the object and the coordinate system being moved with the plane to place a fixed position of the plane at the original point of the X-Y-Z coordinate system;

first orientation specifying means having a track ball member for specifying a first rotational movement of the plane displayed by the displaying means about the X-axis and a second rotational movement of the plane about the Y-axis at one time by rotating the track ball member, the plane which represents a three-dimensional starting position (x0,y0,z0) and a starting orientation ($\alpha 0, \beta 0, \gamma 0$) of the object being moved according to the first and second rotational movements to place both the three-dimensional starting position (x0,y0,z0) and a three-dimensional target position (x1,y1,z1) on the plane and being changed to the plane which represents the three-dimensional starting position (x0,y0,z0) and an intermediate orientation ($\alpha 2, \beta 2, \gamma 0$) of the object, and an orientation ($\alpha 2, \beta 2$) represented by the plane being further changed according to the first and second rotational movements to an orientation ($\alpha 1, \beta 1$) represented by the plane by rotating the track ball member by angle of $\alpha 1-\alpha 2$ and $\beta 1-\beta 2$ about the X-axis and Y-axis;

position specifying means having a secondary ball member for specifying a first translation movement of the plane displayed by the displaying means along the X-axis and a second translation movement of the plane along the Y-axis at one time by rotating the secondary ball member straight, the plane which is determined by the first orientation specifying means and represents the three-dimensional starting position (x0,y0,z0) and the intermediate orientation ($\alpha 2, \beta 2, \gamma 0$) of the object being moved according to the first and second translation movements and changed to the plane which represent the three-dimensional target position (x1,y1,z1) and the intermediate orientation ($\alpha 2, \beta 2, \gamma 0$) of the object;

second orientation specifying means for specifying a third rotational movement of the plane displayed by the displaying means about the Z-axis, an orientation $\gamma 0$ represented by the plane being changed to an orientation $\gamma 1$ represented by the plane to change the plane which is determined by the position specifying means and represents the three-dimensional target position (x1,y1,z1) and the intermediate orientation of the object to the plane which represents the three-dimensional target position (x1,y1,z1) and a target orientation ($\alpha 1, \beta 1, \gamma 1$) of the object in cooperation with the first orientation specifying means;

control means for controlling the object and the plane displayed by the displaying means to place the object at the fixed position of the plane for the purpose of placing the object at the original point of the X-Y-Z coordinate system and controlling movement of the object to virtually move the object which is placed at the three-dimensional starting position (x0,y0,z0) and the starting orientation ($\alpha 1, \beta 1, \gamma 1$) represented by the plane which is determined by specifying the first and second rotational movements, the first and second translation movements and the third rotational movement by the first orientation specifying means, the position specifying means and the second orientation specifying means;

object moving data storing means for storing pieces of moving data of the object consisting of degrees of the first, second and third rotational movements of the object specified by the first orientation specifying means and the second orientation specifying means and degrees of the first and second translation movements specified by the position specifying means, the moving data designating movements of the object;

relative position and orientation storing means for storing relative position and orientation between the object and the observational eye;

observational eye position and orientation calculating means for calculating a moved position and orientation of the observational eye moved with the object on condition that the relative position and orientation stored in the relative position and orientation storing means is maintained even though the object is moved according to the moving data stored in the object moving data storing means, the moved position and orientation of the observational eye being obtained by adding the relative position and orientation stored in the relative position and orientation storing means and the moving data stored in the object moving data storing means; and observational eye position and orientation storing means for storing the moved position and orientation of the observational eye calculated in the observational eye position and orientation calculating means, the observational eye being moved to the moved position and orientation stored in the observational eye position and orientation storing means.

9. A method for specifying translation movement and/or rotational movement of an object in a three-dimensional space to virtually move the object from a starting position and orientation (x0,y0,z0, $\alpha 0, \beta 0, \gamma 0$) to a target position and orientation (x1,y1,z1,$\alpha 1, \beta 1, \gamma 1$), comprising the steps of:

displaying a plane representing a three-dimensional starting position (x0,y0,z0) and a starting orientation of ($\alpha 0, \beta 0, \gamma 0$) of the object and the object placed at the starting position and orientation (x0,y0,z0,$\alpha 0, \beta 0, \gamma 0$) on a displaying unit under control of a central processing unit of a three-dimensional movement specifying apparatus, the value $\alpha 0$ denoting a rotational angle about an X-axis of a starting coordinate system in which the plane is placed on an X-Y plane specified by Z coordinates Z=0, the value $\beta 0$ denoting a rotational angle about a Y-axis of the starting coordinate system, the value $\gamma 0$ denoting a rotational angle about a Z-axis of the starting coordinate system, the three-dimensional starting position of the object being placed at an original point of the starting coordinate system on the plane, the starting orientation of the object agreeing with an orientation of the plane defined by an orientation of a line perpendicular to the plane, and the object being moved with the plane to place the object at a fixed position of the plane;

moving the plane about the X-axis and Y-axis at one time in rotational movement by rotating a track ball member of the three-dimensional movement specifying apparatus to place the three-dimensional starting position (x0,y0,z0) and a three dimensional target position (x1, y1,z1) on the plane, the plane representing the three-dimensional starting position (x0,y0,z0) and the intermediate orientation ($\alpha 2, \beta 2, \gamma 0$) of the object, the value $\alpha 2$ denoting a rotational angle about an X-axis of a first intermediate coordinate system in which the plane is placed on an X-Y plane specified by Z coordinates Z=0, the value $\beta 2$ denoting a rotational angle about a Y-axis of the first intermediate coordinate system, the three-dimensional starting position (x0,y0,z0) of the object being placed at an original point of the first intermediate coordinate system on the plane, and the intermediate orientation ($\alpha 2, \beta 2, \gamma 0$) of the object agreeing with an orientation of the plane;

displaying the plane representing the three-dimensional starting position (x0,y0,z0) and the intermediate orientation ($\alpha 2, \beta 2, \gamma 0$) of the object and the object placed at a first intermediate position and orientation x0,y0,z0, $\alpha 2, \beta 2, \gamma 0$ on the displaying unit under control of the central processing unit;

moving straight the plane along the X-axis and the Y-axis of the first intermediate coordinate system at one time in translation movement by rotating a secondary ball member of the three-dimensional movement specifying apparatus to place the object moved with the plane at the three-dimensional target position (x1,y1,z1), the plane representing the three-dimensional target position (x1,y1,z1) and the intermediate orientation ($\alpha 2, \beta 2, \gamma 0$) of the object, the three-dimensional target position (x1,y1,z1) of the object being placed at an original point of a second intermediate coordinate system in which the plane is placed on an X-Y plane specified by Z coordinates Z=0;

displaying the plane representing the three-dimensional target position (x1,y1,z1) and the intermediate orientation ($\alpha 2,\beta 2,\gamma 0$) of the object and the object placed at a second intermediate position and orientation (x1,y1,z1, $\alpha 2,\beta 2,\gamma 0$) on the displaying unit under control of the central processing unit;

moving the plane about an X-axis, a Y-axis and a Z-axis of the second intermediate coordinate system in rotational movement by rotating the track ball member and a ring of the three-dimensional movement specifying apparatus to change the intermediate orientation ($\alpha 2, \beta 2,\gamma 0$); and displaying the plane representing the three-dimensional target position (x1,y1,z1) and the target orientation ($\alpha 1,\beta 1,\gamma 1$) of the object and the object placed at the target position and orientation (x1,y1,z1,$\alpha 1,\beta 1,\gamma 1$) on the displaying unit under control of the central processing unit.

* * * * *